US012744933B2

(12) United States Patent
Xu

(10) Patent No.: US 12,744,933 B2

(45) Date of Patent: Sep. 22, 2026

(54) METHOD FOR INTRA PREDICTION FUSION AND NON-TRANSITORY COMPUTER-READABLE STORAGE MEDIUM

(71) Applicant: GUANGDONG OPPO MOBILE TELECOMMUNICATIONS CORP., LTD., Dongguan (CN)

(72) Inventor: Luhang Xu, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 18/990,493

(22) Filed: Dec. 20, 2024

(65) Prior Publication Data

US 2025/0126291 A1 Apr. 17, 2025

Related U.S. Application Data

(63) Continuation of application No. PCT/CN2022/106337, filed on Jul. 18, 2022.

(30) Foreign Application Priority Data

Jul. 8, 2022 (CN) ........................ 202210806435.X

(51) Int. Cl.

| | |
|---|---|
| ***H04N 19/593*** | (2014.01) |
| ***H04N 19/11*** | (2014.01) |
| ***H04N 19/136*** | (2014.01) |
| ***H04N 19/176*** | (2014.01) |
| ***H04N 19/184*** | (2014.01) |

(Continued)

(52) U.S. Cl.

CPC ........... *H04N 19/593* (2014.11); *H04N 19/11* (2014.11); *H04N 19/136* (2014.11); *H04N 19/176* (2014.11); *H04N 19/184* (2014.11)

(58) Field of Classification Search

CPC .... H04N 19/593; H04N 19/11; H04N 19/136; H04N 19/176; H04N 19/184; H04N 19/103; H04N 19/159

See application file for complete search history.

(56) References Cited

U.S. PATENT DOCUMENTS

2019/0215521 A1 7/2019 Chuang et al.
2019/0379891 A1 12/2019 Moon et al.

(Continued)

FOREIGN PATENT DOCUMENTS

CN 11129588 A 6/2020
CN 111295881 A 6/2020

(Continued)

OTHER PUBLICATIONS

Office Action issued in corresponding RU application No. 2025102480 dated Sep. 22, 2025. 18 pages (with English translation).

(Continued)

*Primary Examiner* — Jared Walker

(74) *Attorney, Agent, or Firm* — Sheppard, Mullin, Richter & Hampton LLP

(57) ABSTRACT

An intra prediction fusion (IPF) method is provided. Whether a restriction condition for use of IPF for a current block is satisfied is determined when an intra prediction mode selected for the current block includes an angular mode. The use of IPF for intra prediction on the current block is restricted, when at least one of the restriction condition is satisfied.

16 Claims, 18 Drawing Sheets

(56) References Cited

U.S. PATENT DOCUMENTS

2020/0244956 A1* 7/2020 Lee ...................... H04N 19/103
2020/0396444 A1* 12/2020 Tsai ..................... H04N 19/132
2021/0377564 A1* 12/2021 Filippov ................ H04N 19/11
2022/0007029 A1* 1/2022 Deng ........................ G06F 7/78
2022/0201306 A1* 6/2022 Kato ...................... H04N 19/13
2022/0217332 A1* 7/2022 Filippov .............. H04N 19/176
2022/0217337 A1* 7/2022 Jiang ...................... H04N 19/11
2022/0394269 A1* 12/2022 Cao ...................... H04N 19/159

FOREIGN PATENT DOCUMENTS

CN 112956192 A 6/2021
CN 113170126 A 7/2021
WO 2022116317 A1 6/2022

OTHER PUBLICATIONS

WIPO, International Search Report and Written Opinion for International Application No. PCT/CN2022/106337, Dec. 16, 2022. 17 pages (with English translation).

Cao, et al., “Non-EE2: Intra Prediction Fusion” Joint Video Experts Team (JVET) of ITU-T SG 16 WP 3 and ISO/IEC JTC 1/SC 29 JVET-AA0137-v1, dated Jul. 13-22, 2022, Qualcomm Incorporated, 3 pages.

Notice of Reasons for Refusal issued in corresponding JP application No. 2024-577022 dated Feb. 6, 2026, 8 pages (with English translation).

* cited by examiner

METHOD FOR INTRA PREDICTION FUSION AND NON-TRANSITORY COMPUTER-READABLE STORAGE MEDIUM

CROSS-REFERENCE TO RELATED APPLICATION(S)

This application is a continuation of International Application No. PCT/CN2022/106337, filed Jul. 18, 2022, which claims priority to and the benefit of Chinese Patent Application No. 202210806435.X, filed Jul. 8, 2022, the entire disclosures of which are hereby incorporated by reference.

TECHNICAL FIELD

The embodiments of the present disclosure relate to but are not limited to video technology, and more specifically, to a method for intra prediction fusion and a non-transitory computer-readable storage medium.

BACKGROUND

Digital video compression technology is to mainly compress large digital video data to facilitate transmission and storage and so on. Current universal video coding standards, such as H.266/Versatile Video Coding (VVC), adopt a block-based hybrid coding framework. Each picture in a video is partitioned into equally sized (such as 128×128 or 64×64) square largest coding units (LCUs). Each LCU may be further partitioned into rectangular coding units (CUs) according to certain rules. Each CU may be partitioned into a prediction unit (PU), a transform unit (TU), and so on. The hybrid coding framework includes modules like a prediction module, a transform module, a quantization module, an entropy coding module, and an in-loop filter. The prediction module includes an intra prediction unit and an inter prediction unit configured to reduce or remove inherent redundancy of a video. Prediction on an intra block is performed by taking neighbouring samples of the block as references, and prediction on an inter block is performed by taking information of neighbouring blocks and reference information from other pictures in space as references. Compared with a prediction signal, residual information is encoded into a bitstream by means of block-based transform, quantization, and entropy coding. These techniques are described in standards and implemented in various fields related to video compression.

With the surge of internet videos and increasing demands for video clarity, despite existing digital video compression standards saving significant amounts of video data, there is still a need to pursue better digital video compression technologies to reduce bandwidth and traffic pressure in digital video transmission.

SUMMARY

The following is a summary of the subject matter described in detail herein. This summary is not intended to limit the scope of the claims.

In a first aspect, embodiments of the present disclosure provides an intra prediction fusion (IPF) method. The method is applied to a decoder and includes the following. Whether a restriction condition for use of IPF for a current block is satisfied is determined when an intra prediction mode selected for the current block includes an angular mode. The use of IPF for intra prediction on the current block is restricted, when at least one of the restriction condition is satisfied.

In a second aspect, embodiments of the present disclosure provide an IPF method. The method is applied to an encoder and includes the following. Whether a restriction condition for use of IPF for a current block is satisfied is determined when an intra prediction mode selected for the current block includes an angular mode. The use of IPF for intra prediction on the current block is restricted, when at least one of the restriction condition is satisfied.

In a third aspect, embodiments of the present disclosure provide a non-transitory computer-readable storage medium. The storage medium stores a bitstream, where the bitstream is generated according to the method in the second aspect.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiment described herein.

BRIEF DESCRIPTION OF THE DRAWINGS

The accompanying drawings are intended to aid in understanding the embodiments of the present disclosure and form part of the specification. Together with the embodiments of the present disclosure, the accompanying drawings are used to explain the technical solutions of the present disclosure and do not constitute a limitation to the technical solutions of the present disclosure.

DETAILED DESCRIPTION

The present disclosure illustrates multiple embodiments, but the illustration is exemplary rather than restrictive, and it is obvious to those skilled in the art that there may be more embodiments and implementations within the scope of the embodiments described in the present disclosure.

In the illustration of the present disclosure, terms such as "exemplary" or "for example" are used to indicate examples, illustrations, or explanations. Any embodiment described as "exemplary" or "for example" in the present disclosure should not be interpreted as being more preferred or advantageous than other embodiments. "And/or" in the text is an illustration of an association relationship of associated objects, indicating that three relationships may exist. For example, A and/or B can represent: A exists alone, A and B exist at the same time, and B exists alone. "Multiple" or "a plurality of" means two or more than two. In addition, in order to facilitate clear illustration of the technical solutions of the embodiments of the present disclosure, terms such as "first" and "second" are used to distinguish between identical or similar items with substantially the same functions and effects. Those skilled in the art can understand that the terms such as "first" and "second" do not limit the quantity and execution order, and the terms such as "first" and "second" do not limit them to be necessarily different.

When describing representative exemplary embodiments, the specification may have presented the method and/or process as a specific sequence of steps. However, to the extent that the method or process does not rely on the specific order of steps described herein, the method or process should not be limited to the steps of the specific order described. As will be understood by those of ordinary skill in the art, other sequences of steps are also possible. Therefore, the specific sequence of steps set forth in the specification should not be interpreted as a limitation to the claims. In addition, the claims for the method and/or process should not be limited to the steps of performing them in the order written, and those of ordinary skill in the art can easily understand that these sequences can be changed and these changes still remain within the spirit and scope of the embodiments of the present disclosure.

An intra prediction fusion (IPF) method, a video encoding method, and a video decoding method proposed in the embodiments of the present disclosure can be applied to various video coding standards, such as H.264/Advanced Video Coding (AVC), H.265/High Efficiency Video Coding (HEVC), H.266/Versatile Video Coding (VVC), AVS (Audio Video Coding Standard), and other standards developed by Moving Picture Experts Group (MPEC), Alliance for Open Media (AOM), Joint Video Experts Team (JVET) and extensions of these standards, or any other customized standards.

Figure 1A:
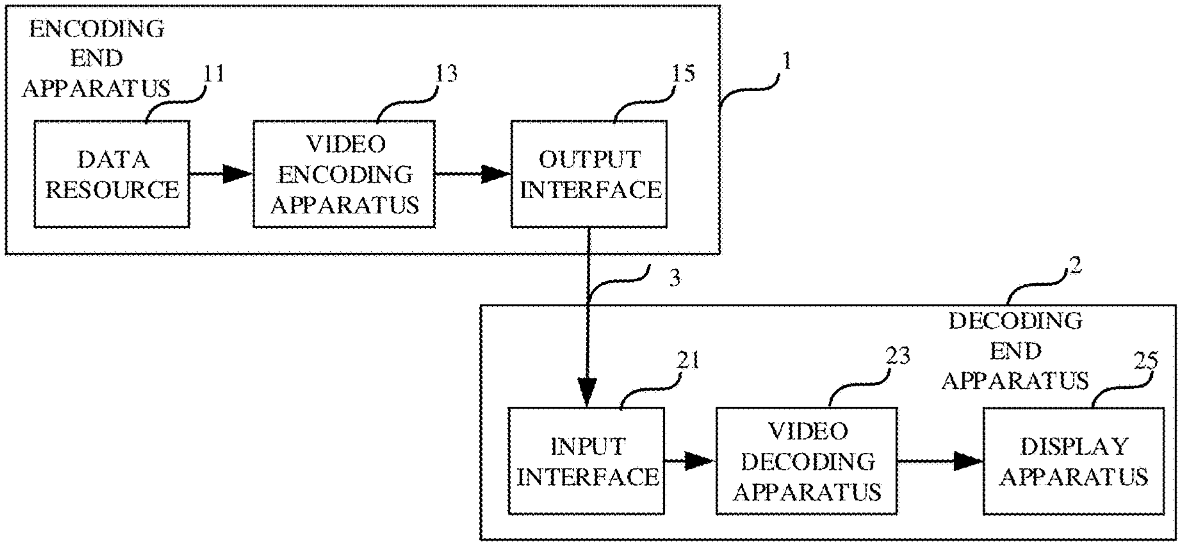
FIG. 1A is a schematic diagram of an encoding and decoding system according to an embodiment of the present disclosure.

FIG. 1A is a block diagram of a video encoding and decoding system that can be used in the embodiments of the present disclosure. As illustrated in the figure, the system is divided into an encoding end apparatus 1 and a decoding end apparatus 2. The encoding end apparatus 1 is configured to generate a bitstream. The decoding end apparatus 2 can decode the bitstream. The decoding end apparatus 2 can receive the bitstream from the encoding end apparatus 1 via a link 3. The link 3 includes one or more media or devices that can transfer the bitstream from the encoding end apparatus 1 to the decoding end apparatus 2. In one example, the link 3 includes one or more communication media that enable the encoding end apparatus 1 to send the bitstream directly to the decoding end apparatus 2. The encoding end apparatus 1 modulates the bitstream according to a communication standard (such as a wireless communication protocol) and sends the modulated bitstream to the decoding end apparatus 2. The one or more communication media may include wireless and/or wired communication media, and may form part of a packet network. In another example, the bitstream can also be output from an output interface 15 to a storage device, and the decoding end apparatus 2 can read stored data from the storage device via streaming or downloading.

As illustrated in the figure, the encoding end apparatus 1 includes a data source 11, a video encoding apparatus 13, and the output interface 15. The data source 11 includes a video capturing apparatus (such as a camera), an archive containing previously captured data, a feed interface for receiving data from a content provider, a computer graphics system for generating data, or a combination of these sources. The video encoding apparatus 13 encodes data from the data source 11 and outputs encoded data to the output interface 15. The output interface 15 may include at least one of a regulator, a modem, or a transmitter. The decoding end apparatus 2 includes an input interface 21, a video decoding apparatus 23, and a display apparatus 25. The input interface 21 includes at least one of a receiver or a modem. The input interface 21 can receive a bitstream via the link 3 or from the storage device. The video decoding apparatus 23 decodes the received bitstream. The display apparatus 25 is configured to display decoded data. The display apparatus 25 can be integrated with other devices of the decoding end apparatus 2 or arranged separately. The display apparatus 25 is optional for the decoding end. In other examples, the decoding end may include other devices or equipment for the decoded data.

Based on the video encoding and decoding system as illustrated in FIG. 1A, various video encoding and decoding methods may be used to implement video compression and decompression.

Figure 1B:
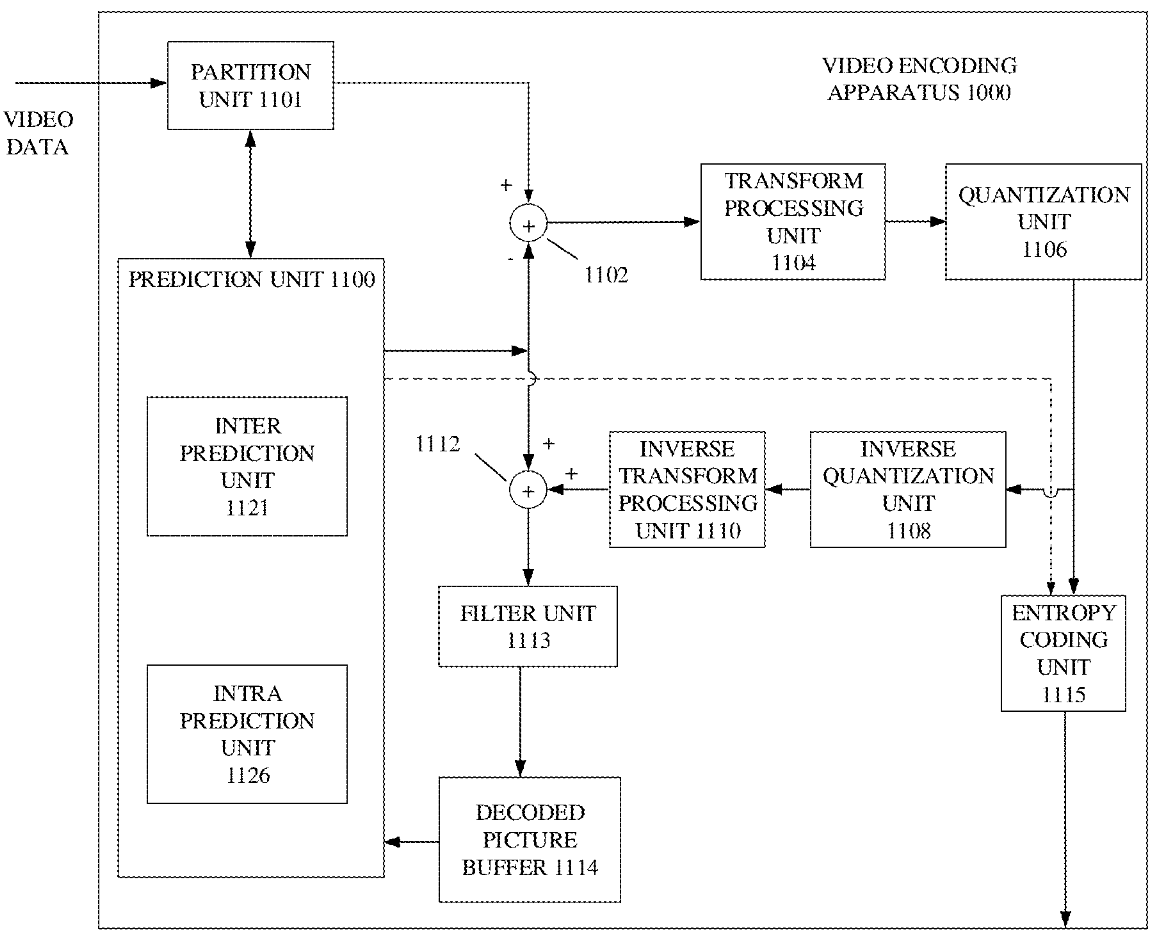
FIG. 1B is a framework diagram of an encoding end according to an embodiment of the present disclosure.

FIG. 1B is a block diagram of an exemplary video encoding apparatus that can be used in the embodiments of the present disclosure. As illustrated in the figure, the video encoding apparatus 1000 includes a prediction unit 1100, a partition unit 1101, a residual generation unit 1102 (indicated by a circle with a plus sign after the partition unit 1101 in the figure), a transform processing unit 1104, a quantization unit 1106, an inverse quantization unit 1108, an inverse transform processing unit 1110, a reconstruction unit 1112 (indicated by a circle with a plus sign after the inverse transform processing unit 1110 in the figure), a filter unit 1113, a decoded picture buffer 1114, and an entropy coding unit 1115. The prediction unit 1100 includes an inter prediction unit 1121 and an intra prediction unit 1126. The decoded picture buffer 1114 may also be called a picture buffer of decoded images, a buffer of being decoded pictures, a buffer of decoded pictures, etc. The video encoding apparatus 1000 may also include more, less, or different functional components than the example, such as the transform processing unit 1104, the inverse transform processing unit 1110, etc. can be omitted in some cases.

The partition unit 1101 cooperates with the prediction unit 1100 to partition received video data into slices, coding tree units (CTUs), or other relatively large units. The video data received by the partition unit 1101 may be a video sequence including video frames such as I-frames, P-frames, or B-frames.

The prediction unit 1100 can partition the CTU into coding units (CUs), and perform intra prediction encoding or inter prediction encoding on the CU. For performing intra prediction and inter prediction on the CU, the CU can be partitioned into one or more prediction units (PUs).

The inter prediction unit 1121 can perform inter prediction on the PU and generate prediction data for the PU. The prediction data includes a prediction block for the PU, motion information for the PU, and various syntax elements for the PU. The inter prediction unit 1121 may include a motion estimation (ME) unit and a motion compensation (MC) unit. The motion estimation unit can be configured for motion estimation to generate a motion vector. The motion compensation unit can be configured to obtain or generate a prediction block according to the motion vector.

The intra prediction unit 1126 may perform intra prediction on the PU and generate prediction data for the PU. The prediction data for the PU may include a prediction block and various syntax elements for the PU.

The residual generation unit 1102 may generate a residual block for the CU by subtracting, from the original block for the CU, the prediction blocks for the PUs into which the CU is partitioned.

The transform processing unit 1104 can partition the CU into one or more transform units (TUs), and the partition for the prediction unit and the partition for the transform unit may be different. A residual block associated with the TU is a sub-block obtained by partitioning the residual block for the CU. A coefficient block associated with the TU is generated by applying one or more transforms to the residual block associated with the TU.

The quantization unit 1106 can quantize a coefficient(s) in a coefficient block based on a selected quantization parameter(s) (QP(s)). The quantization degree of the coefficient block can be adjusted by adjusting the QP(s).

The inverse quantization unit 1108 and the inverse transform processing unit 1110 can apply inverse quantization and inverse transform to the coefficient block, respectively, to obtain a reconstructed residual block associated with the TU.

The reconstruction unit 1112 can add the reconstructed residual block and the prediction block generated by the prediction unit 1100 to generate a reconstructed picture.

The filter unit 1113 is configured to perform in loop filtering on the reconstructed picture, and store the filtered reconstructed picture in the decoded picture buffer 1114 as a reference picture. The intra prediction unit 1126 can extract a reference picture for a neighbouring block for the PU from the decoded picture buffer 1114 to perform intra prediction. The inter prediction unit 1121 can use a pervious reference picture buffered in the decoded picture buffer 1114 to perform inter prediction on the PU of the current picture.

The entropy coding unit 1115 can perform entropy coding on received data (e.g., syntax elements, quantized coefficient blocks, motion information, etc.).

Figure 1C:
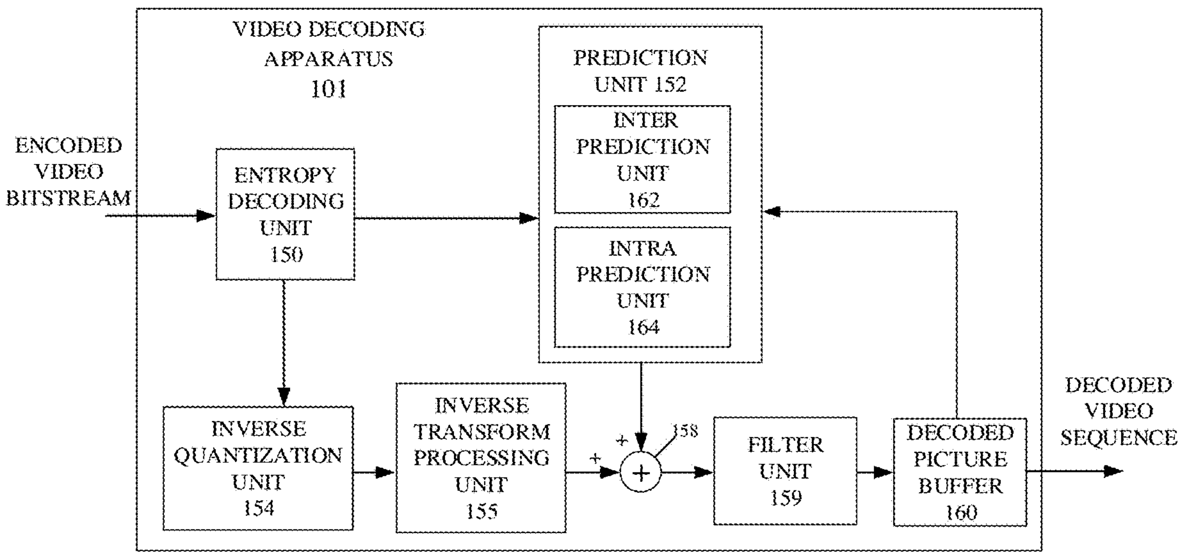
FIG. 1C is a framework diagram of a decoding end according to an embodiment of the present disclosure.

FIG. 1C is a block diagram of an exemplary video decoding apparatus that can be used in the embodiments of the present disclosure. As illustrated in the figure, the video decoding apparatus 101 includes an entropy decoding unit 150, a prediction unit 152, an inverse quantization unit 154, an inverse transform processing unit 155, a reconstruction unit 158 (indicated by a circle with a plus sign after the inverse transform processing unit 155 in the figure), a filter unit 159, and a decoded picture buffer 160. In other embodiments, the video decoding apparatus 101 may include more, fewer or different functional components, such as the inverse transform processing unit 155 may be omitted in some cases.

The entropy decoding unit 150 can perform entropy decoding on received bitstream, and extract syntax elements, quantized coefficient blocks, motion information for the PU, etc. The prediction unit 152, the inverse quantization unit 154, the inverse transform processing unit 155, the reconstruction unit 158, and the filter unit 159 can all perform corresponding operations based on the syntax elements extracted from the bitstream.

The inverse quantization unit 154 can perform inverse quantization on a coefficient block associated with a quantized TU.

The inverse transform processing unit 156 can apply one or more inverse transforms to an inverse quantized coefficient block to generate a reconstructed residual block for the TU.

The prediction unit 152 includes an inter prediction unit 162 and an intra prediction unit 164. If the PU is encoded using intra prediction, the intra prediction unit 164 can determine an intra prediction mode for the PU based on syntax elements decoded from the bitstream, perform intra prediction according to the determined intra prediction mode and reconstructed reference information adjacent to the PU obtained from the decoded picture buffer 160 to generate a prediction block for the PU. If the PU is encoded using inter prediction, the inter prediction unit 162 can determine one or more reference blocks for the PU based on motion information for the PU and corresponding syntax elements for the PU, and generate a prediction block for the PU based on the reference block(s) obtained from the decoded picture buffer 160.

The reconstruction unit 158 can obtain a reconstructed picture based on the reconstructed residual block associated with the TU and the prediction block for the PU generated by the prediction unit 152.

The filter unit 159 can perform in loop filtering on the reconstructed picture, and the filtered reconstructed picture is stored in the decoded picture buffer 160. The decoded picture buffer 160 can provide a reference image for subsequent motion compensation, intra prediction, inter prediction, etc., and can also output the filtered reconstructed picture as decoded video data for presentation on the display apparatus.

Based on the above-mentioned video encoding apparatus and video decoding apparatus, the following basic encoding and decoding processes can be performed. At the encoding end, a picture is partitioned into blocks, intra prediction or inter prediction or other algorithms are performed on the current block to generate a prediction block for the current block, the prediction block is subtracted from the original block for the current block to obtain a residual block, the residual block is transformed and quantized to obtain a quantization coefficient, and entropy coding is performed on the quantization coefficient to generate a bitstream. At the decoding end, intra prediction or inter prediction is performed on the current block to generate a prediction block for the current block, and on the other hand, the quantization coefficient obtained by decoding the bitstream is inversely quantized and inversely transformed to obtain the residual block, the prediction block and the residual block are added to obtain a reconstructed block, the reconstructed block constitutes a reconstructed picture, and in loop filtering is performed on the reconstructed picture based on the picture or block to obtain a decoded picture. The encoding end also obtains a decoded picture through operations similar to those of the decoding end, and the decoded picture obtained by the encoding end is usually also called a reconstructed picture. The decoded picture can be used as a reference picture for inter prediction for subsequent pictures. Information determined by the encoding end, such as block partition information, mode information and parameter information such as prediction, transformation, quantization, entropy coding, in loop filtering, etc. can be written into the bitstream if necessary. The decoding end determines the same block partition information, the mode information and parameter information such as prediction, transformation, quantization, entropy coding, in loop filtering, etc. as the encoding end by decoding the bitstream or analyzing existing information, thereby ensuring that the decoded picture obtained by the encoding end is the same as the decoded picture obtained by the decoding end.

Although the above is an example of a block-based hybrid coding framework, the embodiments of the present disclosure are not limited thereto. With the development of technology, one or more modules in the framework and one or more steps in the process may be replaced or optimized.

In the text, the current block may be a block-level coding unit such as a current CU or a current PU in the current picture.

When the encoding end performs intra prediction, the encoding end usually performs prediction on the current block using various angular modes and non-angular modes to obtain a prediction block; selects an optimal intra prediction mode for the current block according to rate-distortion information calculated based on the prediction block and the original block, and encodes the intra prediction mode and transmit the encoded intra prediction mode to the decoding code via the bitstream. The decoding end obtains, through decoding, the intra prediction mode selected for the current block, and performs intra prediction on the current block according to the intra prediction mode. In the text, a reference line and an intra prediction mode selected for the current block is also expressed as a reference line and an intra prediction mode selected by the current block.

Figure 2:
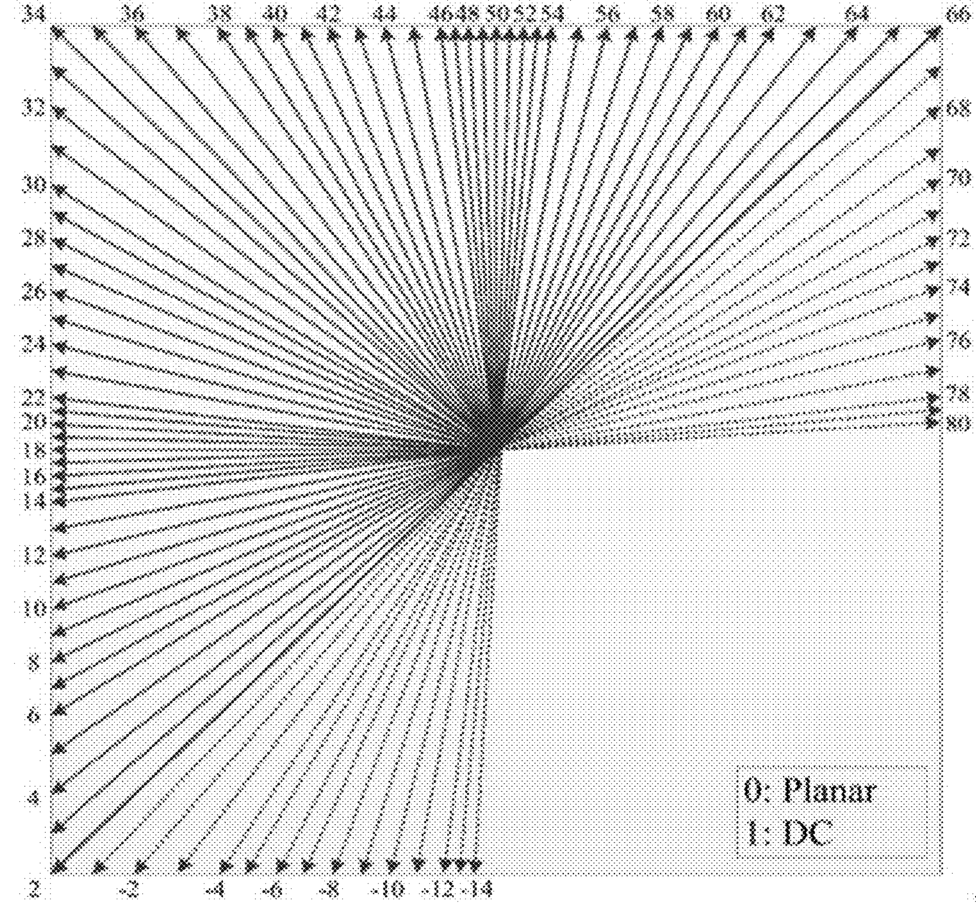
FIG. 2 is a schematic diagram illustrating intra prediction modes according to an embodiment of the present disclosure.

In VCC and ECM, for multiple traditional intra prediction modes, reconstructed information around the current block is used to predict the current block. The traditional intra modes include a planar mode with an index of 0, a direct current (DC) mode with an index of 1, and 65 angular prediction modes with indexes of 2~66. FIG. 2 illustrates angular direction of angular modes with indexes of 2~66. In the text, an angular prediction mode is also referred as an angular mode for short.

Rectangular prediction blocks have been introduced in VVC. For the rectangular prediction block, angular directions of some of the angular modes with indexes of 2~66 may be replaced with wider angular directions. As illustrated in the figure, angular modes with indexes of −14 ~−1 and 67~80 are obtained through wide-angle replacement, where no flag is needed to indicate selection of these angular modes, and these angular modes are determined through a correspondence between the shape of the current block and indexes (2~66) of prediction modes selected for the current block.

In VCC standards, wide-angle replacement is as follows. Variable whRatio equals Abs(Log2(blockWidth)−Log2(blockHeight)).

For the non-square block, whether to perform wide-angle replacement on the angular prediction modes predModeIntra (2~66) is determined according to whether the following conditions are satisfied, where preModeIntra is expressed by an index. preModeIntra=(predModeIntra+65) If all three conditions in the following are satisfied: the width of the current block is greater than the height of the current block; angular mode index>=2; angular mode index<(whRatio>1)?(8+2*whRatio):8. Otherwise, preModeIntra=(predModeIntra−67) if all three conditions in the following are satisfied: the height of the current block is greater than the width of the current block; angular mode index<=66; angular mode index>(whRatio>1)?(60−2*whRatio):60. After wide-angle mode matching, each angular intra mode predModeIntra (−14~80) has an angle value intraPredAngle.

TABLE 1 illustrates a correspondence between preModeIntra and intraPredAngle.

| | | | | | | | | | | | | | | | | | |
|---|---|---|---|---|---|---|---|---|---|---|---|---|---|---|---|---|---|
| predModeIntra | −14 | −13 | −12 | −11 | −10 | −9 | −8 | −7 | −6 | −5 | −4 | −3 | −2 | −1 | 2 | 3 | 4 |
| intraPredAngle | 512 | 341 | 256 | 171 | 128 | 102 | 86 | 73 | 64 | 57 | 51 | 45 | 39 | 35 | 32 | 29 | 26 |
| predModeIntra | 5 | 6 | 7 | 8 | 9 | 10 | 11 | 12 | 13 | 14 | 15 | 16 | 17 | 18 | 19 | 20 | 21 |
| intraPredAngle | 23 | 20 | 18 | 16 | 14 | 12 | 10 | 8 | 6 | 4 | 3 | 2 | 1 | 0 | −1 | −2 | −3 |
| predModeIntra | 22 | 23 | 24 | 25 | 26 | 27 | 28 | 29 | 30 | 31 | 32 | 33 | 34 | 35 | 36 | 37 | 38 |
| intraPredAngle | −4 | −6 | −8 | −10 | −12 | −14 | −16 | −18 | −20 | −23 | −26 | −29 | −32 | −29 | −26 | −23 | −20 |
| predModeIntra | 39 | 40 | 41 | 42 | 43 | 44 | 45 | 46 | 47 | 48 | 49 | 50 | 51 | 52 | 53 | 54 | 55 |
| intraPredAngle | −18 | −16 | −14 | −12 | −10 | −8 | −6 | −4 | −3 | −2 | −1 | 0 | 1 | 2 | 3 | 4 | 6 |
| predModeIntra | 56 | 57 | 58 | 59 | 60 | 61 | 62 | 63 | 64 | 65 | 66 | 67 | 68 | 69 | 70 | 71 | 72 |
| intraPredAngle | 8 | 10 | 12 | 14 | 16 | 18 | 20 | 23 | 26 | 29 | 32 | 35 | 39 | 45 | 51 | 57 | 64 |

TABLE 1-continued

| illustrates a correspondence between preModeIntra and intraPredAngle. | | | | | | | | |
|---|---|---|---|---|---|---|---|---|
| predModeIntra | 73 | 74 | 75 | 76 | 77 | 78 | 79 | 80 |
| intraPredAngle | 73 | 86 | 102 | 128 | 171 | 256 | 341 | 512 |

An intraPredAngle of a preModeIntra is used for subsequent angular prediction.

In the text, each predModeIntra corresponds to an intraPredAngle. The angle of each angular prediction model is an angle of a line segment corresponding to the angular prediction model in FIG. 1 in the rectangular coordinate system. For example, for the angular mode with an index of 34, intraPredAngle is −32, but the angle is −45°, or 45°, or 135°, which is related to the direction of 0° defined in the rectangular coordinate system.

The intra prediction modes in the text refer to tradition angular modes including the planar mode, the DC mode, and angular modes, if there is no other limitation.

If the intra prediction mode for the current block is directly encoded, 7 bits are required to encode 67 modes, and thus the amount of data is very large. According to statistical characteristics, it is easy to select the same intra prediction mode for the current block and a sample region close to the current block. Based on this characteristic, the most probable mode (MPM) technology is adopted in HEVC, VVC, and the enhanced compression model (ECM). The ECM is a reference software based on a VTM-10.0-based reference software and integrated with various new tools to further explore coding performance.

For MPM, an MPM list is first constructed, and the MPM list is filled with 6 intra prediction modes that are most likely to be selected for the current block. If an intra prediction mode selected for the current block is in the MPM list, only an index of the intra prediction mode needs to be encoded (only 3 bits are needed). If the intra prediction mode selected for the current block is not in the MPM list but in 61 non-MPM modes, the intra prediction mode is encoded using truncated binary code (TBC) coding in the stage of entropy coding.

In VVC, regardless of whether multiple reference line (MRL) and intra sub-partitions (ISP) are applied, the MPM list includes 6 prediction modes. MPMs in ECM are classified into MPMs and secondary MPMs, where the MPM list has a length of 6, and a secondary MPM list has a length of 16. Among 6 modes in the MPM list, the planar mode is always filled in the first position in the MPM list, and the remaining 5 positions are filled through the following three steps in sequence until all 5 positions are filled. Extra modes will be automatically taken as secondary MPMs.

Figure 3:
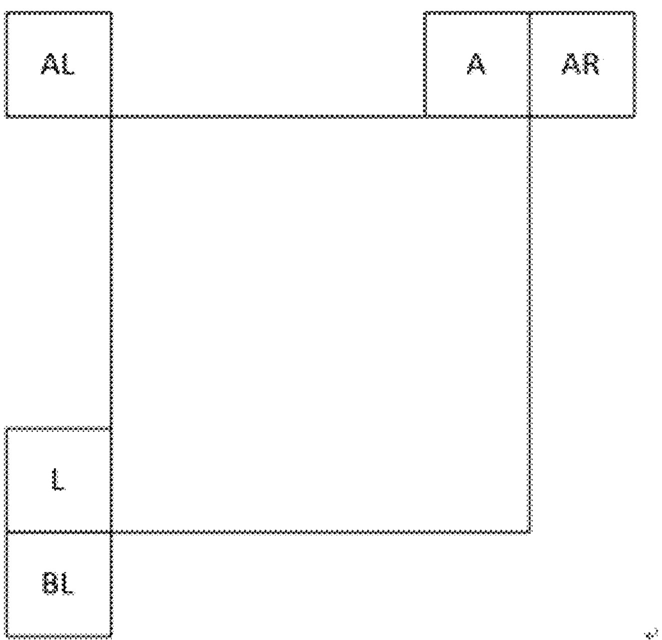
FIG. 3 is a schematic diagram illustrating neighbouring intra prediction blocks for a current block according to an embodiment of the present disclosure.

In step 1, intra prediction modes used for prediction blocks at 5 neighbouring positions around the current block are filled in sequence. As illustrated in FIG. 3, the 5 positions include upper left (AL), upper (A), upper right (AR), left (L), and bottom left (BL) positions of the current block in sequence.

In step 2, a mode derived based on reconstructed samples around the current block using a gradient histogram is filled.

In step 3, an angular mode that is close in angle to the angular mode selected in step 1 is filled.

The secondary MPM list may consist of some main angular modes except the intra prediction modes in the MPMs.

Since an MPM flag (mpm_flag) is encoded and decoded after an MRL mode, the encoding and decoding of the MPM in the ECM depends on an MRL flag. When the MRL mode is not used for the current block, the MPM flag needs to be decoded to determine whether the MPM is used for the current block. When the MRL mode is used for the current block, there is no need to decode the MPM flag, and the MPM is used for the current block by default.

Template-based intra mode derivation (TIMD) and decoder-side intra mode derivation (DIMD) are two intra prediction technologies that are not included in VCC but are introduced into ECM. By means of the two technologies, the decoding end can derive an intra prediction mode for the current block according to reconstructed sample values around the current block, and thus encoding an index of the intra prediction mode can be omitted, thereby saving bits.

Figure 4:
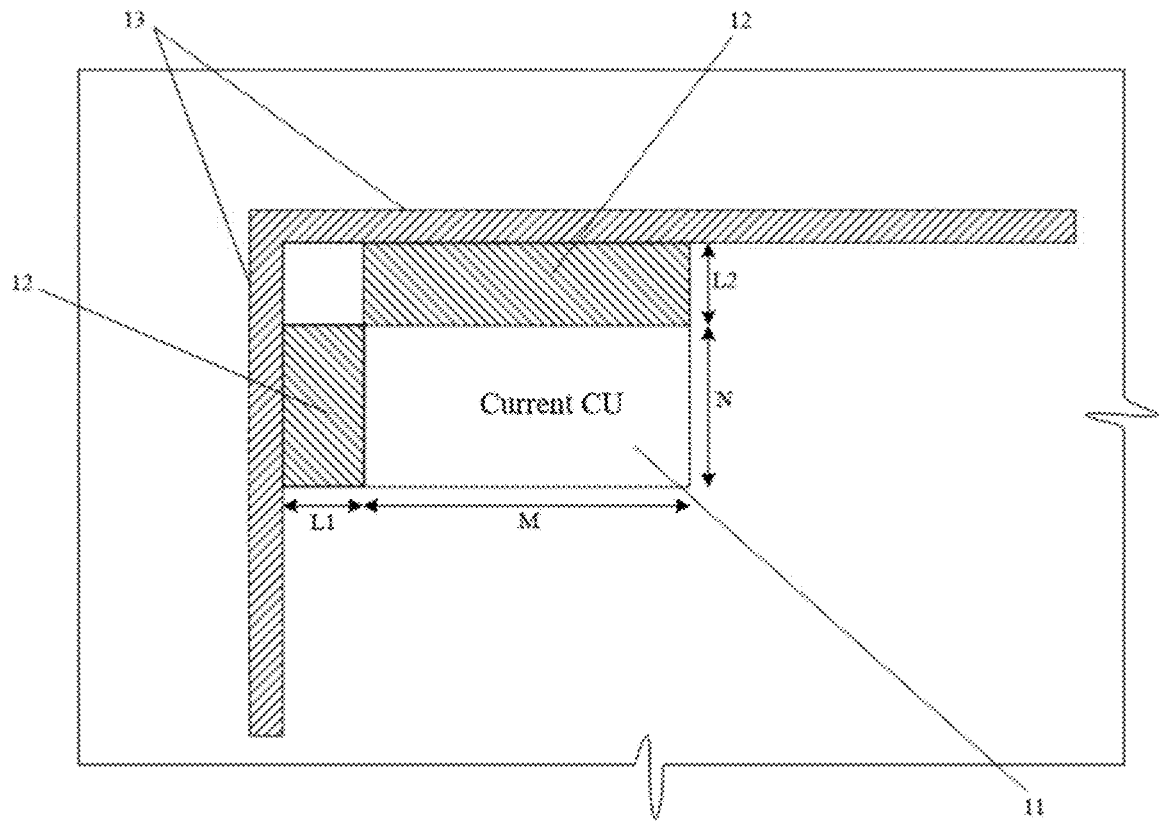
FIG. 4 is a schematic diagram illustrating a template and a reference template region for a current block according to an embodiment of the present disclosure.

TIMD is an intra prediction mode for luma pictures. The TIMD mode is generated based on a candidate intra prediction mode in the MPM list and a template region ("template" for short). In the ECM, as illustrated in FIG. 4, a left neighbouring region and an upper neighbouring region for the current block (such as the current CU) 11 constitute a template region 12 for the current block. The left neighbouring region is called a left template region (referred to as a left template), and the upper neighbouring region is called an upper template region (referred to as an upper template).

A reference template region 13 is located at outside (referring to left and upper sides) of the template region 12, and exemplary sizes and positions of each region are illustrated in the figure. In one example, the width L1 of the left template and the height L2 of the upper template are both 4. The reference template region 13 may be a row adjacent to the upper side of the template region or a column adjacent to the left side of the template region.

For TIMD, it is assumed that the distribution characteristics of the current block and the template region for the current block are consistent, and by taking a reconstructed value of the reference template region as a reconstructed value of a reference line, all intra prediction modes in MPMs and secondary MPMs are traversed to predict the template region and obtain a prediction result. Then the difference between the reconstructed value of the template region and the prediction result for each mode is calculated and expressed as the sum of absolute transformed differences (SATD). The intra prediction mode with the lowest SATD is selected as the optimal intra prediction mode and used as the TIMD mode for the current block. The decoding end can derive the TIMD mode in the same way. If TIMD is allowed for a sequence, a flag is needed to indicate whether TIMD is used for each current block. If the intra prediction mode selected for the current block is the TIMD mode, prediction on the current block is performed using the TIMD mode, and decoding of remaining syntax elements related to intra prediction, such as ISP and MPM, can be skipped, thereby greatly reducing bits for encoding a mode.

After the SATD between the reconstructed value of the template region and the prediction result for each mode (the prediction value of the template region) is calculated, the final TIMD mode to be used can be determined according to the following manner.

Assuming that mode1 and mode2 are two angular modes for intra prediction in MPMs, mode1 is the angular mode with the lowest SATD which is expressed as cost1, and mode2 is the angular mode with the second lowest SATD which is expressed as cost2, when cost1×2≤cost2, mode1 is used as the TIMD mode for the current block, and when cost1×2>cost2, a prediction mode for weighting prediction results for mode 1 and mode 2 is used as the TMID mode for the current block, also known as a TIMD fusion mode.

The weighting manner and weights are illustrated in the following formula:

$$Pred = Pred_{mode1} \times w1 + Pred_{mode2} \times w2$$

$$w1 = \frac{cost2}{cost1 + cost2},\ w2 = \frac{cost1}{cost1 + cost2}$$

Pred is the prediction result of the current block using the TIMD fusion mode, $Pred_{mode1}$ is the prediction result of the current block using model, $Pred_{mode2}$ is the prediction result of the current block using mode2, and w1 and w2 are weighting factors calculated according to cost1 and cost2.

For DIMD, a reconstructed sample value around the current block is taken as a template, each 3×3 region of the template is scanned using the Sobel operator to calculate the gradients in the horizontal and vertical directions. Based on the gradients Dx and Dy obtained in the horizontal and vertical directions, the amplitude value at each position is calculated as Amp=abs(Dx)+abs(Dy), and the angle value at each position is calculated as angular=arctan(Dy/Dx). The angle value at each position in the template corresponds to a traditional angular mode, and the amplitude values of the same angular modes are accumulated to create a histogram for amplitude values and angular modes. In the case where there are two angular modes with the highest and second-highest amplitude values, the prediction values for these two angular modes, as well as for the planar mode, are weighted to yield the final prediction result of the current block using DIMD. In this case, 3 intra prediction modes are fused as a prediction mode, which include: the planar mode and the two angular modes with the highest and second-highest amplitude values. In the text, the prediction mode is referred to as a DIMD fusion mode. When there are no angle modes with the highest and second-highest amplitude values, the prediction using DIMD is equivalent to the prediction using the planar mode.

In HEVC, intra prediction is performed by taking the upper row and left column closest to the current block as references. If differences between reconstructed values and original pixel values of this row and column are relatively large, the quality of prediction for the current block may also be greatly affected. To solve this problem, VVC adopts the MRL technology. In VVC, in addition to a reference line with an index of 0 (reference line0), a reference line with an index of 1 (reference line1) and a reference line with an index of 2(reference line2) can also be used as extended reference lines for intra prediction. To reduce complexity of encoding, MRL is only used for a non-planar mode in MPMs. When the encoding end performs prediction using each angular mode, the encoding end needs to try all the three reference lines, and through rate-distortion optimization, selects a reference line with the lowest rate-distortion cost (RD cost) for the current block. An index of the selected reference line is encoded and transmitted to the decoding end. The decoding end obtains the index of the reference line through decoding, and then determines the reference line selected for the current block based on the index of the reference line, to perform prediction on the current block.

Figure 5:
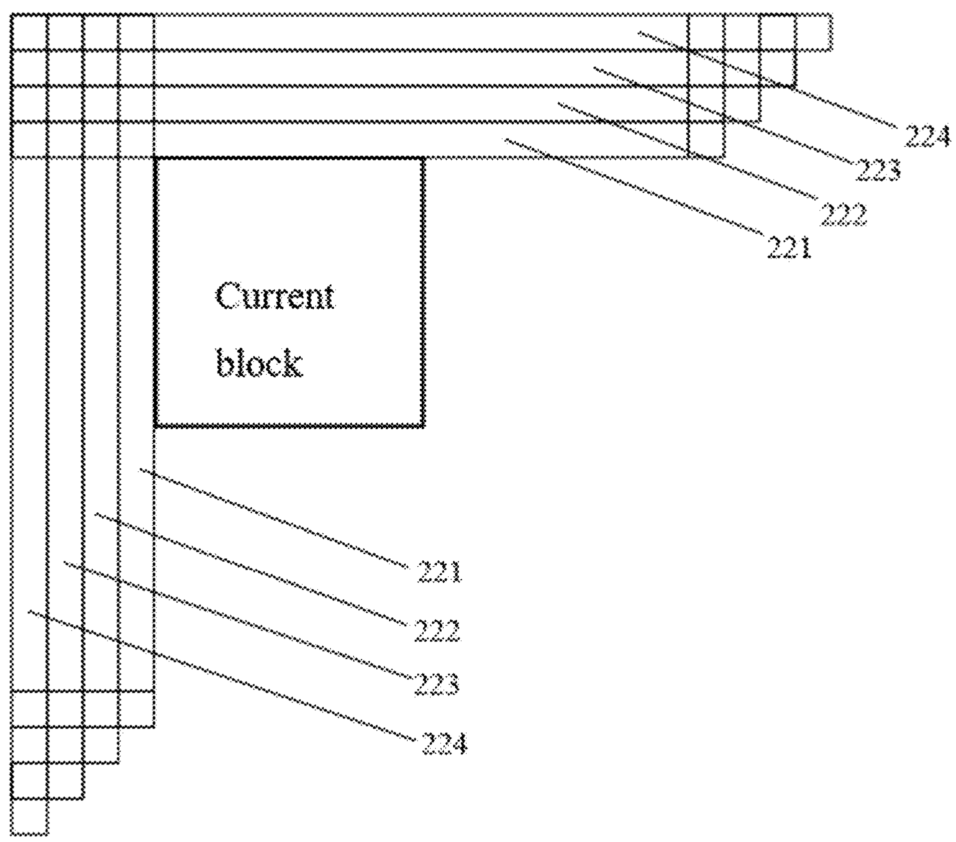
FIG. 5 is a schematic diagram illustrating multiple reference lines (MRLs) around a current block according to an embodiment of the present disclosure.

In an example as illustrated in FIG. 5, 4 reference lines for the current block are illustrated, including reference line0 221 adjacent to the current block, i.e., a reference line with an index of 0, reference line1 222 with an interval of 1 line from the current block, i.e., a reference line with an index of 1, reference line2 223 with an interval of 2 lines from the current block, i.e., a reference line with an index of 2, and reference line3 224 with an interval of 3 lines from the current block, i.e., a reference line with an index of 3. There may be more reference lines for the current block, i.e., there may be a reference line with an index greater than 4 for the current block. Only reconstructed values of some of the reference lines may be used for prediction. In the text, the indexes of reference lines are numbered as illustrated in FIG. 5.

In the text, a reference line is called a "line" for the convenience of expression. A reference line actually includes a row and a column. Generally, the reconstructed value of a reference line used for prediction also includes reconstructed values of a row and a column, which is the same as the usual description method in the industry.

In the ECM, for the MRL mode, more reference lines can be used. In order to encode the reference line selected for the current block, indexes of multiple candidate reference lines are filled into a list. The list is called a multiple reference line index list, abbreviated as MRL index list, and the list can also be called an MRL list, a candidate reference line list, a reference line index list, etc. When TIMD is not used for the current block, the length of the MRL index list is 6, that is, there are 6 positions in total, which can be filled with indexes of 6 reference lines. The indexes of 6 reference lines and their order are fixed, which are 0, 1, 3, 5, 7, 12, respectively, and can be expressed as follows: MULTI_REF_LINE_IDX [6]={0, 1, 3, 5, 7, 12}. In the MRL index list, the first position is filled with an index of 0, which is the index of the reference line closest to the current block. The second to sixth positions are filled with indexes of 1, 3, 5, 7, and 12, which are the indexes of 5 extended reference lines arranged in ascending order of distances from the current block to the extended reference lines.

When the reference line selected for the current block is in the MRL index list, multiRefIdx is used to indicate the position of the reference line selected for the current block in the MRL index list, and the selected reference line can be indicated by encoding multiRefIdx. The MRL index list {0, 1, 3, 5, 7, 12} is taken as an example, where the indexes at the first to sixth positions are 0 to 5, respectively. Assuming that the reference line with an index of 0 is selected for the current block, multiRefIdx is 0. Assuming that the reference line with an index of 7 is selected for the current block, multiRefIdx is 4, and so on for other cases. multiRefIdx can be encoded using context model-based truncated unary code coding or the like, and after encoding multiple context-based bins can be obtained, where the bin can also be referred to as a binary flag, a binary symbol, and a binary bit. The smaller the value of multiRefIdx, the shorter the code length and the faster the decoding.

The MRL mode can also be used together with the TIMD mode. When TIMD is used, the length of the MRL index list is 3, which means that the MRL index list can be filled with indexes of 3 reference lines and the order of the indexes in the MRL index list is fixed, expressed as MULTI REF_LINE_IDX [3]={0, 1, 3}.

It may be noted that, in different standards, the same technologies may have the same names. For example, MPM, i.e., the technology of deriving an MPM list using neighbouring blocks for the current block may have different names, for example, called adaptive intra mode coding (AIMC) in AV2 (AVM), and called, in AVS3, frequency-based intra mode coding (FIMC) in the case of screen content coding. In the case of non-screen content coding, technologies similar to MPM are always used. Such as MRL, the technology of using MRL for intra prediction is called multiple reference line selection (MRLS) for intra prediction in AV2 (AVM). But this is just a difference in names. In the case where the terms such as MPM and MRL are used in the embodiment, the technologies essentially the same in other standards should also be covered.

An embodiment of the present disclosure provides a template-based multiple reference line intra prediction mode, abbreviated as TMRL mode, which is a prediction mode for constructing a candidate list according to combinations of extended reference lines and intra prediction modes, and encoding and decoding a combination of an extended reference line and an intra prediction mode.

Figure 6:
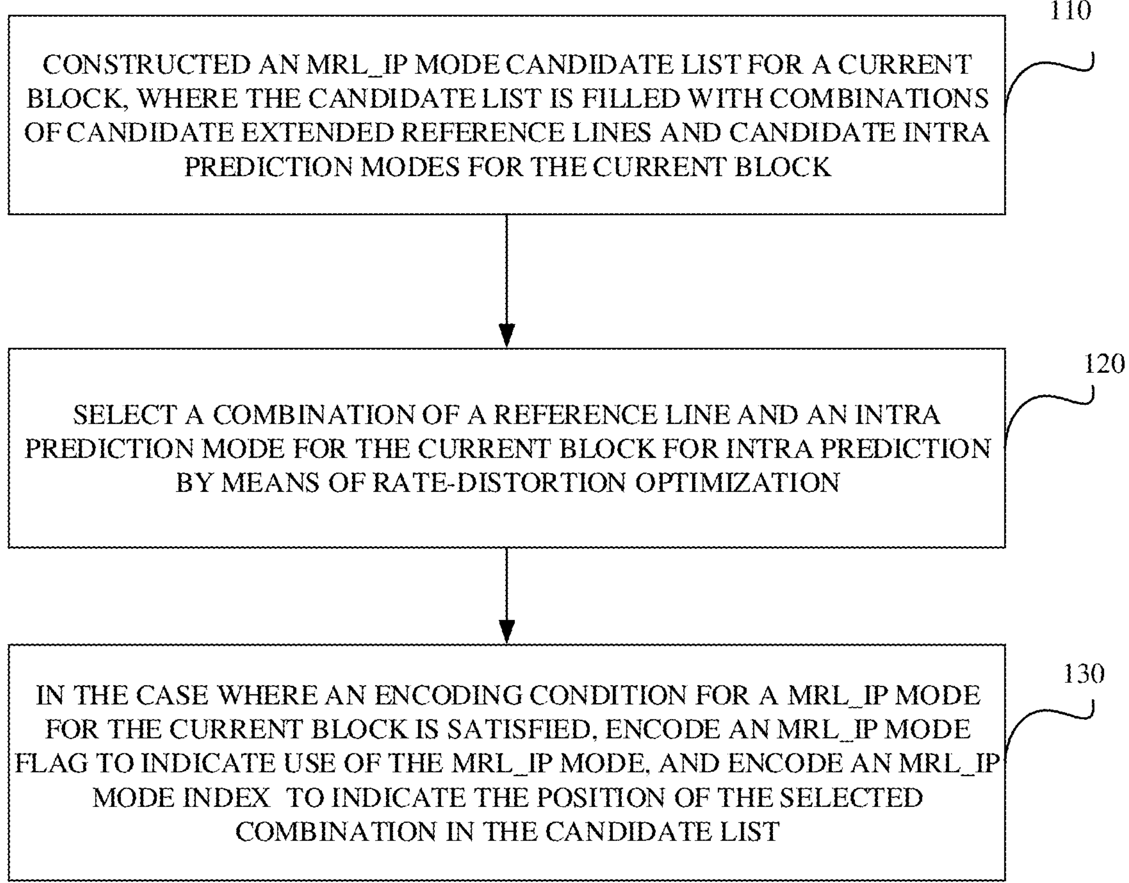
FIG. 6 is a flow chart of a video encoding method according to an embodiment of the present disclosure.

A video encoding method of the embodiment is applied to an encoder and includes the following as illustrated in FIG. 6.

Step 110, a TMRL mode candidate list for a current block is constructed, where the candidate list is filled with combinations of candidate extended reference lines and candidate intra prediction modes for the current block.

Step 120, a combination of a reference line and an intra prediction mode is selected for the current block for intra prediction by means of rate-distortion optimization.

In the text, reference lines include a reference line with an index of 0 and extended reference lines. A combination of a reference line and an intra prediction mode selected for the current block may be a combination of a reference line with an index of 0 and an intra prediction mode, or a combination of an extended reference line and an intra prediction mode.

Step 130, in the case where an encoding condition for a TMRL mode for the current block is satisfied, a TMRL mode flag for the current block is encoded to indicate that the TMRL mode is used for the current block, and a TMRL mode index for the current block is encoded to indicate the position of the selected combination in the candidate list. The encoding condition at least includes that: the selected combination is in the candidate list.

In the text, the candidate list filled with the combinations of candidate extended reference lines and candidate intra prediction modes for the current block may also be called as a TMRL mode candidate list.

In the text, the candidate list is filled with the combinations of candidate extended reference lines and candidate intra prediction modes for the current block, which means that the combinations in the candidate list needs to participate in rate-distortion optimization for the current block, that is, participate in the mode selection process of selecting a prediction mode for the current block through the rate-distortion cost, so that all the combinations in the candidate list have the possibility of being selected.

In the text, parameters N, M, and K representing the number are all positive integers, and no additional explanation is needed.

The TMRL mode candidate list constructed in the embodiments of the present disclosure is filled with the combinations of candidate extended reference lines and candidate intra prediction modes for the current block, and is not a list containing merely candidate extended reference lines or a list containing merely candidate intra prediction modes. In the case where a combination of a reference line and an intra prediction mode selected for the current block is in the candidate list (in this case, an extended reference line is selected for the current block), that is, when the coding condition such as the combination of a reference line and an intra prediction mode selected for the current block being in the candidate list is met, the TMRL mode flag for the current block is encoded to indicate that the TMRL mode is used for the current block, and the TMRL mode index for the current block is encoded to indicate the position of the selected combination in the candidate list. The decoding end can determine the extended reference line and the intra prediction mode selected for the current block based on the TMRL mode flag and the TMRL mode index. The method for encoding and decoding a combination in the embodiment can reduce the cost for coding and improve the performance of coding.

The TMRL mode is a mode in which prediction on the template region for the current block is performed based on each of N×M combinations obtained from N extended reference lines and M intra prediction modes for the current block, differences between a reconstructed value of the template region and prediction values obtained by prediction are calculated, and corresponding K combinations are filled into the TMRL mode candidate list for the current block in ascending order of the differences, where $1 \le K \le N \times M$.

In an example, prediction on the template region is performed based on each of 25 combinations of extended reference lines and intra prediction modes in the ECM, the 25 combinations are sorted in ascending order of the differences, and 12 combinations with the lowest differences, that is, the most likely to be selected 12 combinations, are filled into the TMRL mode candidate list, so that the TMRL mode index can be encoded using fewer bits. Even if some (such as extended reference lines with indexes of 7 and 12) of extended reference lines {1, 3, 5, 7, 12} are located outside the boundary of the CTU, 12 combinations the most likely to be selected can still be added to the candidate list based on the order of the 15 combinations, and thus the bits for encoding the MRL mode index can still be fully and effectively utilized. Sorting in ascending order of the differences makes reference lines and prediction modes that are more likely to be selected for prediction remain in the candidate list, and the combinations more likely to be selected be ranked at the front of the list, so that the cost for coding is reduced. The method for constructing the TMRL mode candidate list will be illustrated in more detail in the following.

In an exemplary embodiment, the encoding condition further includes that: TIMD is not used for the current block. The method further includes the following. When TIMD is used for the current block, the encoding of the TMRL mode flag and the TMRL mode index for the current block is skipped. When TIMD is not used for the current block and the selected combination is not in the candidate list, the TMRL mode flag for the current block is encoded to indicate that the TMRL mode is not used for the current block, and the encoding of the TMRL mode index for the current block is skipped.

This embodiment is based on the case that the TIMD mode is encoded and decoded before the TMRL mode. If the TIMD mode is used for the current block, there is no need to use the TMRL mode, so that the encoding of the TMRL mode flag and the TMRL mode index is skipped. If the TIMD mode is not used for the current block, there are two cases: one is that the combination selected for the current block is in the TMRL mode candidate list, or one is that the combination selected for the current block is not in the TMRL mode candidate list. If the selected combination is not in the candidate list, the TMRL mode flag needs to be encoded to indicate that the TMRL mode is not used for the current block, and the encoding of the TMRL mode index is skipped. If the selected combination is in the candidate list, both the TMRL mode flag and the TMRL mode index need to be encoded.

When TIMD is not used for the current block, the TMRL mode flag and the TMRL mode index provided in the embodiment can replace the original multiple reference line index multiRefIdx. When TIMD is used for the current block, multiRefIdx can still be used to represent the selected reference line, and multiRefIdx is encoded.

In an example of the embodiment, constructing the TMRL mode candidate list for the current block includes the following. The candidate list is constructed only when all set conditions for allowing use of the TMRL mode for the current block are met, where the conditions for allowing use of the TMRL mode include any one or more of the following.

Condition 1: the current block is a block in a luma picture, that is, the TMRL mode is only used for luma pictures.

Condition 2: the current block is not located at the upper boundary of the CTU. If the current block is located at the upper boundary of the CTU, there is no available reference line on the upper side of the current block, so that in the embodiment the condition that the current block is not located at the upper boundary of the CTU is taken as a condition for allowing use of the TMRL mode.

Condition 3: MRL is allowed for the current block, that is, the TMRL mode is allowed only when the MRL mode is allowed.

Condition 4: the size of the current block is not greater than the maximum size of the current block for which the TMRL mode can be used, where the maximum size can be preset. Larger blocks are generally relatively flat and less likely to have angle details. The TMRL mode can be restricted to be used for such large blocks.

Condition 5: the aspect ratio of the current block meets the requirement for the aspect ratio of the current block for which the TMRL mode can be used. For example, the TMRL mode is allowed to be used only when the aspect ratio of the current block is not greater than a preset value.

In an example of the embodiment, the TMRL mode index is encoded using golomb-rice coding. Using golomb-rice coding can more reasonably classify candidate combinations into categories with different codeword lengths for encoding and decoding, thereby improving efficiency of coding.

In an example of the embodiment, when the encoding condition for the TMRL mode for the current block is met, the method further includes: skipping the encoding of syntax elements of any one or more of the following modes: the MPM mode, the ISP mode, a multiple transform selection (MTS) mode, a low-frequency non-separable transform (LFNST) mode, and the TIMD mode.

For example, when the TMRL mode is encoded and decoded before the TIMD mode, the encoding condition for the TMRL mode does not include that TIMD is not used for the current block. When the TMRL mode is used for the current block, TIMD is not allowed for the current block, and the encoding of syntax elements of the TIMD mode can be skipped.

For example, when the TMRL mode is used for the current block, the reference line and the intra prediction mode selected for the current block can be both indicated by the TMRL mode flag and the MRL_IP mode index. In this case, there is no need to encode and decode MPM-related syntax elements.

For example, in a specific transform mode, the TMRL mode may be restricted from being used simultaneously with the MTS mode and/or the LFNST mode.

Figure 7:
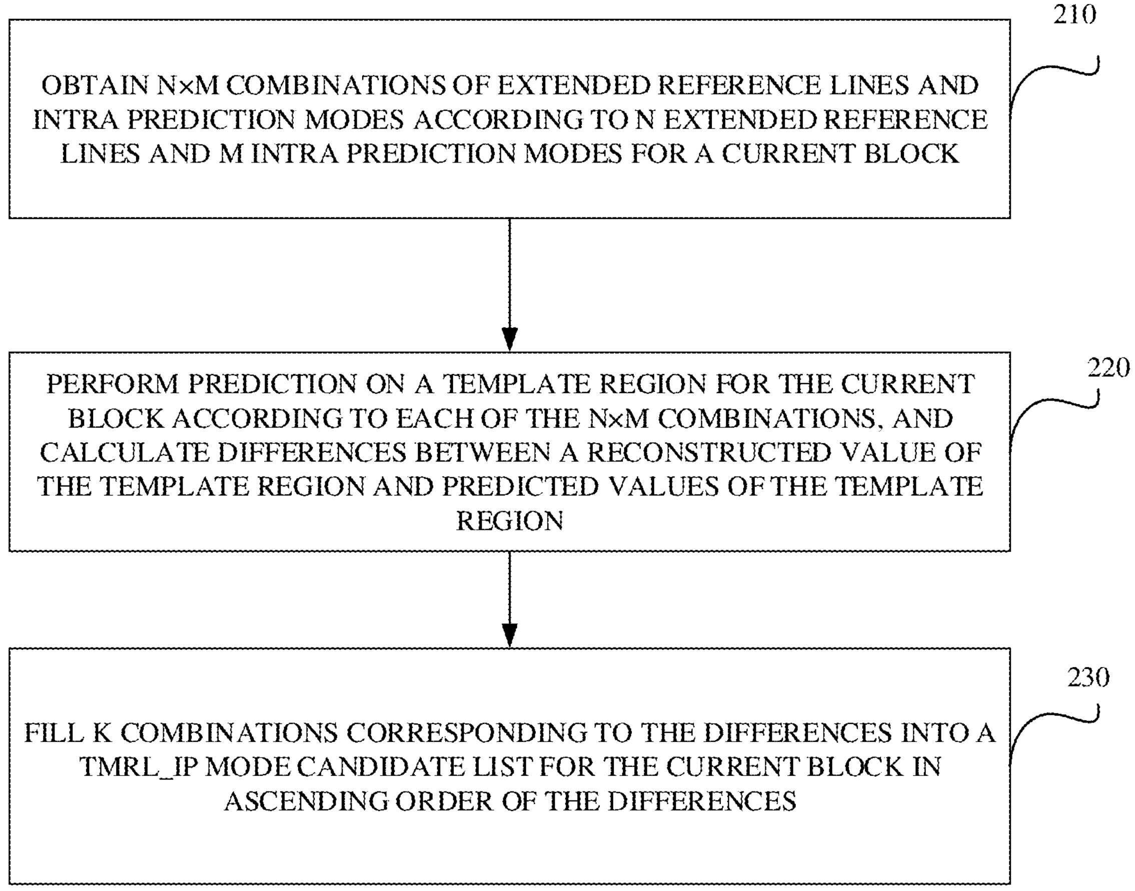
FIG. 7 a flow chart of a method for constructing a template-based multiple reference line (TMRL) mode candidate list according to an embodiment of the present disclosure.

An embodiment provides a method for constructing a TMRL mode candidate list. The method can be applied to an encoder, and can also be applied to a decoder. As illustrated in FIG. 7, the method includes the following.

Step 210, N×M combinations of extended reference lines and intra prediction modes are obtained according to N extended reference lines and M intra prediction modes for the current block, where N≥1, M≥1, and N×M≥2.

Step 220, prediction on a template region for the current block is performed according to each of the N×M combinations, and differences between a reconstructed value of the template region and prediction values obtained by prediction are calculated.

The difference in this step can be expressed by the sum of absolute differences (SAD) or the sum of absolute transformed differences (SATD), but is not limited to this. The difference of the step can also be expressed by the sum of squared differences (SSD), the mean absolute difference (MAD), the mean squared error (MSE), etc.

Step 230, K combinations corresponding to the differences are filled into a TMRL mode candidate list for the current block in ascending order of the differences, where 1≤K≤N×M.

By means of the candidate list constructed in the embodiment, encoding of a combination of an extended reference line and an intra prediction mode can be realized, thereby improving the efficiency of encoding. Moreover, by using different combinations to predict the template region and by sorting the differences, it is possible to select, based on the similarity in distribution characteristics between the current block and the template region for the current block, K combinations with a relatively great possibility of being selected from the N×M combinations, and the combinations with a relatively great possibility of being selected are placed at the top of the candidate list, so that the TMRL mode index for the selected combination to be encoded is relatively small, thereby reducing the actual cost for encoding.

Figure 8A:
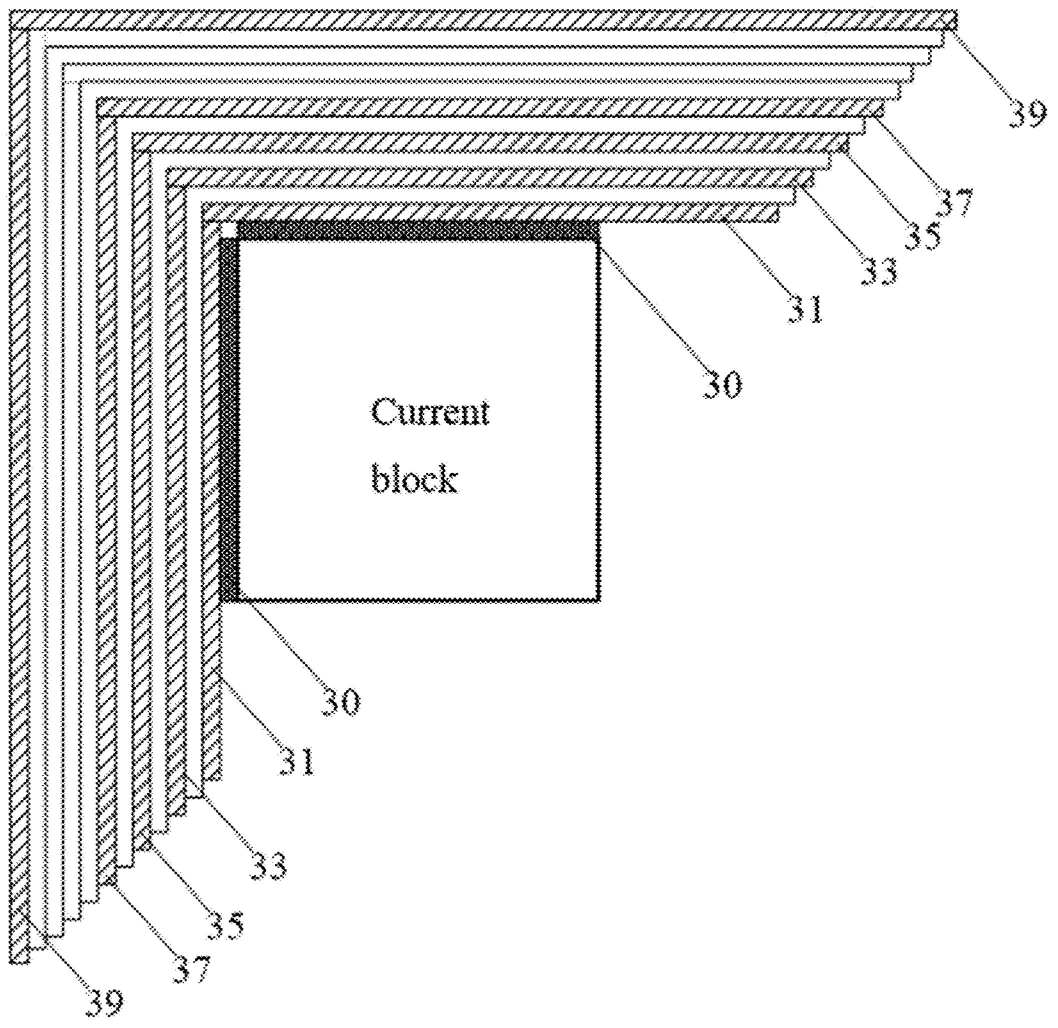
FIG. 8A is a schematic diagram illustrating a template region and extended reference lines around a current block according to an embodiment of the present disclosure.

In an example of the embodiment, the template region for the current block is located in a reference line closest to the current block, or, the template region for the current block is located in multiple reference lines closest to the current block, where N extended reference lines for participating in combination are extended reference lines located outside the template region. In FIG. 8A, the template region for the current block is located in a reference line 30 with an index of 0, and to construct the TMRLP mode candidate list, N extended reference lines that can be used are selected from predefined extended reference lines with indexes of {1, 3, 5, 7, 12}. If there are more than 13 reference lines between the upper side of the current block and the boundary of the CTU, 5 extended reference lines with indexes of {1, 3, 5, 7, 12} are selected to participate in combination. If there are 6 or 7 reference lines between the upper side of the current block and the boundary of the CTU, 3 extended reference lines with indexes of {1, 3, 5} are selected to participate in combination, and so on.

In the example, in the case where the template region for the current block is located in the reference line with an index of 0, the reference line with an index of 0 is referred to as a reference line where the template region is located, and reference lines with indexes of 1 to 3 are referred to as reference lines located outside the template region. In the case where the template region for the current block is located in reference lines with indexes of 0 and 1, the reference lines where the template region is located include an extended reference line, and the reference lines with indexes of 0 and 1 are reference lines where the template region is located, and reference lines with indexes of 2 and 3 are reference lines located outside (at the upper side and left side of) the template region.

Figure 8B:
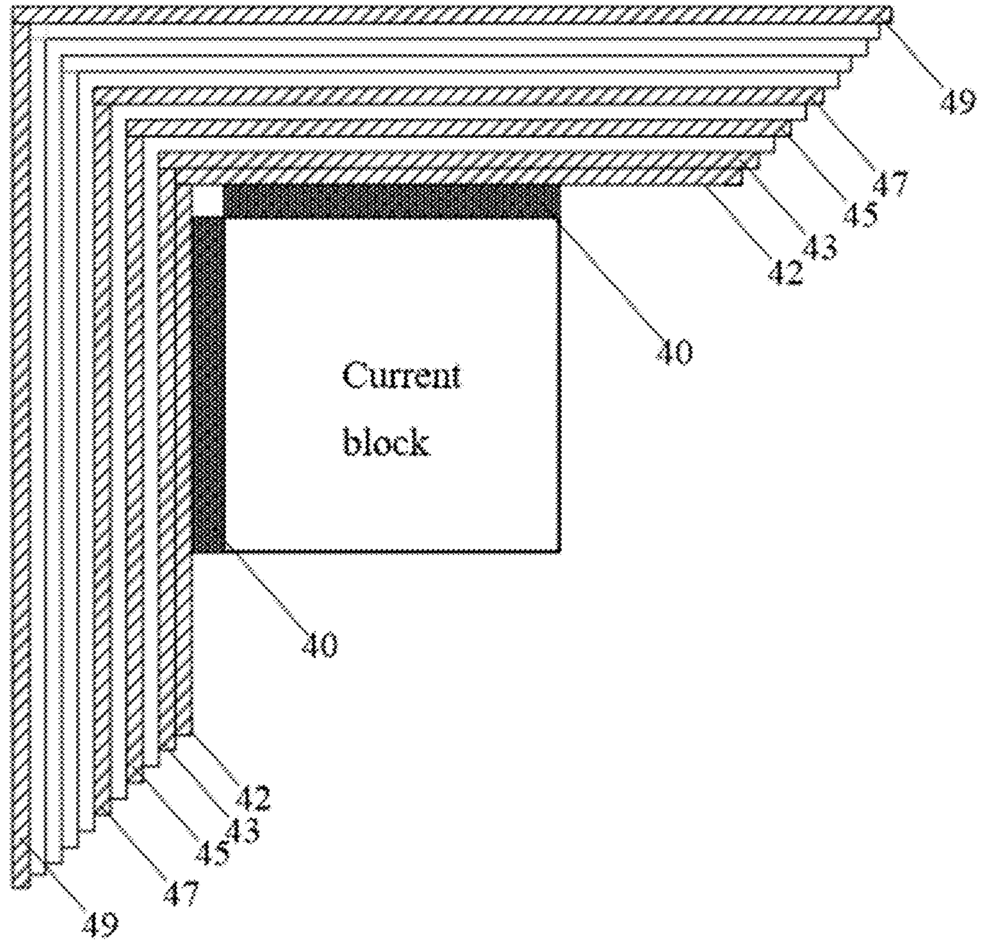
FIG. 8B is a schematic diagram illustrating a template region and extended reference lines around a current block according to another embodiment of the present disclosure.

FIG. 8A illustrates 5 extended reference lines involved in combination, including a reference line 31 with an index of 1, a reference line 33 with an index of 3, a reference line 35 with an index of 5, a reference line 37 with an index of 7, and a reference line 39 with an index of 12. Different from FIG. 8A, in the example illustrated in FIG. 8B, a template region 40 for the current block is located in two reference lines with indexes of 0 and 1, and extended reference lines involved in combination are 5 extended reference lines, namely a reference line 42 with an index of 2, a reference line 43 with an index of 3, a reference line 45 with an index of 5, a reference line 47 with an index of 7, and a reference line 49 with an index of 12. That is, in the example, N extended reference lines that can be used are selected from predefined extended reference lines with indexes of {2, 3, 5, 7, 12}. There are many other options for selection of the template region and extended reference lines, such as setting the template region for the current block to be in 3 reference lines with indexes of 0, 1, and 2, setting the template region for the current block to be in 4 reference lines with indexes of 0 to 3, and so on. When the template region is relatively wide, the prediction is relatively more accurate.

In an example of the embodiment, N extended reference lines for the current block are extended reference lines located outside the template region for the current block and not exceeding the boundary of the CTU among $N_{max}$ predefined extended reference lines, where $N_{max}$ is the maximum number of extended reference lines that can be used for the TMRL mode. In the embodiment, N extended reference lines used for combination are set to be located outside the template region for the current block and not exceeding the boundary of the CTU. However, if the hardware can provide support, extended reference lines exceeding the boundary of the CTU can also be selected to participate in combination.

In an example of the disclosure, $N_{max}$=5, and 5 predefined extended reference lines are reference lines with indexes of {1, 3, 5, 7, 12} or {2, 3, 5, 7, 12}. In another example, $N_{max}$ predefined extended reference lines are $N_{max}$ extended reference lines closest to the current block, with indexes starting from 1. Alternatively, $N_{max}$ predefined extended reference lines are $N_{max}$ extended reference lines closest to the current block, with odd indexes starting from 1. Alternatively, $N_{max}$ predefined extended reference lines are $N_{max}$ extended reference lines closest to the current block, with even indexes starting from 2. Selection of odd reference lines or even reference lines can simplify the operation.

In an example of the embodiment, the M intra prediction modes are only allowed to be selected from angular modes, or only allowed to be selected from angular modes and the DC mode, or allowed to be selected from angular modes, the DC mode, and the planar mode.

In an example, the M intra prediction modes are selected through the following manners, where M≥5.

Step 1: intra prediction modes used for prediction blocks at 5 neighbouring positions around the current block are determined, intra prediction modes that are allowed to be selected are selected in sequence, and repeated modes are removed, where the 5 neighbouring positions are upper left (AL), upper (A), upper right (AR), left (L), and bottom left (BL), as illustrated in FIG. 3. When the number of intra prediction modes selected in step 1 is equal to M, the process ends. When the number of the intra prediction modes selected in step 1 is less than M and the selected intra prediction modes include an angular mode, the process proceeds to step 2.

Step 2, starting from the first angular mode that has been selected, an extension operation is performed on angular modes in sequence to obtain extended angular modes, and extended angular modes that are different from all the selected angular modes are selected until the total number of selected intra prediction modes is equal to M.

In the embodiment, when no angular mode is selected in step 1, or the total number of selected intra prediction modes after step 2 is still less than M, step 3 is performed: intra prediction modes allowed to be selected from a predefined intra prediction mode set are determined, and intra prediction modes that are different from all the selected intra prediction modes are selected from the determined intra prediction modes allowed to be selected until the total number of selected intra prediction modes is equal to M.

In one example, in the process of selecting the M intra prediction modes, only angular modes are allowed to be selected. In another example, in the process of selecting the M intra prediction modes, only angular modes and the DC mode are allowed to be selected. In another example, in the process of selecting the M intra prediction modes, angular modes, the DC mode, and the planar mode are allowed to be selected. The effect is limited in the case where the planar mode is combined with extended reference lines, and thus the planar mode may not participate in combination. The situation of the DC mode is similar. However, if the increased computational complexity can be accepted, the planar mode and the DC mode can also be added to the candidate list for combination.

In an example, the extended operation on angular modes includes any one or more of the following operations: performing a +/−1 operation on angular modes; performing a +/−2 operation on angular modes; and performing a +/−3 operation on angular modes.

In an example of the embodiment, the M intra prediction modes include some or all of intra prediction modes except the planar mode in MPMs; or, include some or all of the intra prediction modes except the planar mode in the MPMs and secondary MPMs; or, include some or all of the intra prediction modes except the planar mode and the DC mode in the MPMs; or, include some or all of the intra prediction modes except the planar mode and the DC mode in the MPMs and the secondary MPMs; or, include some or all of the intra prediction modes except the planar mode, the DC mode, and the DIMD mode in the MPMs; or, include some or all of the intra prediction modes except the planar mode, the DC mode, and the DIMD mode in the MPMs and the secondary MPMs.

In the example, all intra prediction modes except the planar mode in the MPMs are used as predefined intra prediction modes, or all intra prediction modes except the planar mode in the MPMs and the secondary MPMs are used as predefined intra prediction modes. When reference lines for the current block include all predefined extended reference lines, all the predefined intra prediction modes are used. When the reference lines for the current block include only some of the predefined extended reference lines, some of the predefined intra prediction modes are used.

In an example of the embodiment, the M intra prediction modes are selected in the following manner. M' intra prediction modes are selected. According to each of reference lines for the current block located outside the template and the M' intra prediction modes, prediction on the template for the current block is performed and the difference between a reconstructed value of the template and each prediction value obtained by prediction is calculated to obtain M' differences. M intra prediction modes with the lowest differences are selected from the M' intra prediction modes as the M intra prediction modes for participating in combination, where M<M'.

In the example, the template for the current block is used to select the M intra prediction modes from the M' intra prediction modes, but the forgoing template region for the current block is used to select K combinations from N×M combinations. The two templates can be different, but can also occupy the same region.

In the example, various manners for selecting the M intra prediction modes in the above embodiments of the present disclosure can be used to select the M' intra prediction modes. For example, the M' intra prediction modes can be directly selected from the MPM list and the secondary MPM list, or selected through step 1 in the method of the above embodiment, or selected through step 1 and step 2 in the method of the above embodiment, or selected through step 1, step 2, and step 3 in the method of the above embodiment, and so on.

In the example, $N \le N_{max}$, $2 \le N_{max} \le 12$; $2 \le M \le 18$; $K \le K_{max}$, $6 \le K_{max} \le 36$, where $N_{max}$ is the maximum number of extended reference lines allowed to be used for the TMRL_IP mode, and $K_{max}$ is the maximum number of candidate combinations allowed to be used for the TMRL_IP mode. Although the value ranges of the relevant parameters of N, M and K are given here, this is only exemplary, and these value ranges should not be regarded as limitations to the present disclosure.

In an example of the embodiment, N, M and K have at least two sets of values, the first set of values is $N_1$, $M_1$, and $K_1$, and the second set of values is $N_2$, $M_2$, and $K_2$, where $N_1 \le N_2$, $M_1 \le M_2$, $K_1 \le K_2$, and $N_1 \times M_1 < N_2 \times M_2$. The first set of values is used for constructing a candidate list for the current block of a first size, the second set of values is used for constructing a candidate list for the current block of a second size, and the first size is less than the second size. The first size and the second size here can represent multiple sizes respectively, for example, the first size can include 4×4, 4×8, 8×8, etc., and the second size can include 16×8, 16×16, 8×16, etc. In the example, different values of N, M and K are used for current blocks of different sizes. When the size of the current block is relatively small, relatively small values are used to construct the TMRL mode candidate list. When the size of the current block is relatively large, relatively large values are used to construct the TMRL mode candidate list. Therefore, a better balance can be achieved between the complexity of the operation and the performance.

In an example of the embodiment, performing prediction on the template region for the current block according to each of the N×M combinations includes the following. When the current block is located at the left boundary of the picture, prediction on the upper template region for the current block is performed according to each of the N×M combinations, and no prediction is performed on the left template region for the current block. In this embodiment, the operation can be simplified and the time required for the operation can be reduced without affecting the performance.

In an example of the disclosure, performing prediction on the template region of the current block according to each of the N×M combinations includes: performing prediction in the following manner according to each of the N×M combinations. An initial prediction value of the template region is calculated according to a reconstructed value of an extended reference line in the combination and an intra prediction mode in the combination, where the reconstructed value of the extended reference line is an original reconstructed value of the extended reference line or a filtered reconstructed value of the extended reference line. 4-tap filtering or 6-tap filtering is performed on the initial prediction value of the template region, and the filtering result is used as the prediction value of the template region obtained by prediction based on the combination.

In the embodiment, to predict the template region for the current block, the reconstructed value of the extended reference line may not be filtered, and the original reconstructed value of the extended reference line is used for calculation. A filter with relatively short taps (such as a 4-tap filter) may be used to reduce the complexity of calculation and speed up the calculation.

In an example of the embodiment, performing prediction on the template region for the current block according to each of the N×M combinations and calculating the differences between the reconstructed value of the template region and the prediction values obtained by prediction include the following. Prediction on the entire template region for the current block is performed according to each of K combinations to obtain corresponding K differences, where the K differences form a difference set, and the maximum difference in the difference set is denoted as $D_{max}$. For each of the remaining combinations, prediction on the template region on a side of the current block is firstly performed according to the combination, and difference $D_1$ between a reconstructed value of the template region on the side of the current block and a prediction value of the template region on the side of the current block is calculated. If $D_1 \ge D_{max}$, the prediction based on the combination is completed. If $D_1 < D_{max}$, prediction on the template region on another side of the current block is performed according to the combination, and difference $D_2$ between a reconstructed value of the entire template region for the current block and a prediction value of the entire template region for the current block is calculated. If $D_2 < D_{max}$, $D_2$ is added to the difference set, $D_{max}$ is deleted from the difference set and maximum difference $D_{max}$ in the difference set is updated. If $D_2 \ge D_{max}$, the prediction based on the combination is completed. After the prediction based on the N×M combinations is completed, K combinations corresponding to K differences in the difference set are taken as the K combinations with the lowest differences.

In one example, the differences in the difference set can be arranged in ascending order, and when $D_2$ is added to the difference set, the position where $D_2$ is inserted should make the differences in the difference set still arranged in ascending order. However, in other examples, the K differences in the difference set can also be sorted after the prediction based on all the N×M combinations is completed.

In the example, the combinations can be sorted without performing, based on all the combinations, prediction and difference calculation on the entire template region, which can reduce the complexity of the operation and speed up the operation.

In an example of the embodiment, the K combinations corresponding to the differences are filled into the TMRL mode candidate list for the current block in ascending order of the differences as follows. Starting from the first position of the candidate list, the K combinations corresponding to the differences are filled into the candidate list in ascending order of the differences. The TMRL mode candidate list in the example is only filled with combinations of extended reference lines and intra prediction modes. The combinations of the reference line with an index of 0 and intra prediction modes are indicated by other traditional modes, such as MPMs.

In an example of the embodiment, starting from the i-th position of the candidate list, K combinations corresponding to the differences are filled into the candidate list in ascending order of the differences. The position(s) before the i-th position in the candidate list is filled with a combination(s) of the reference line with an index of 0 and one or more intra prediction modes, where $i \geq 2$. The TMRL mode candidate list in the example is not only filled with combinations of extended reference lines and intra prediction modes, but also a combination(s) of the reference line with an index of 0 and an intra prediction mode(s). In this case, when the combination selected for the current block is a combination of the reference line with an index of 0 and an intra prediction mode, the combination can also be represented by the TMRL mode index. In this case, the TMRL mode index can still be used.

Figures 9, 10:
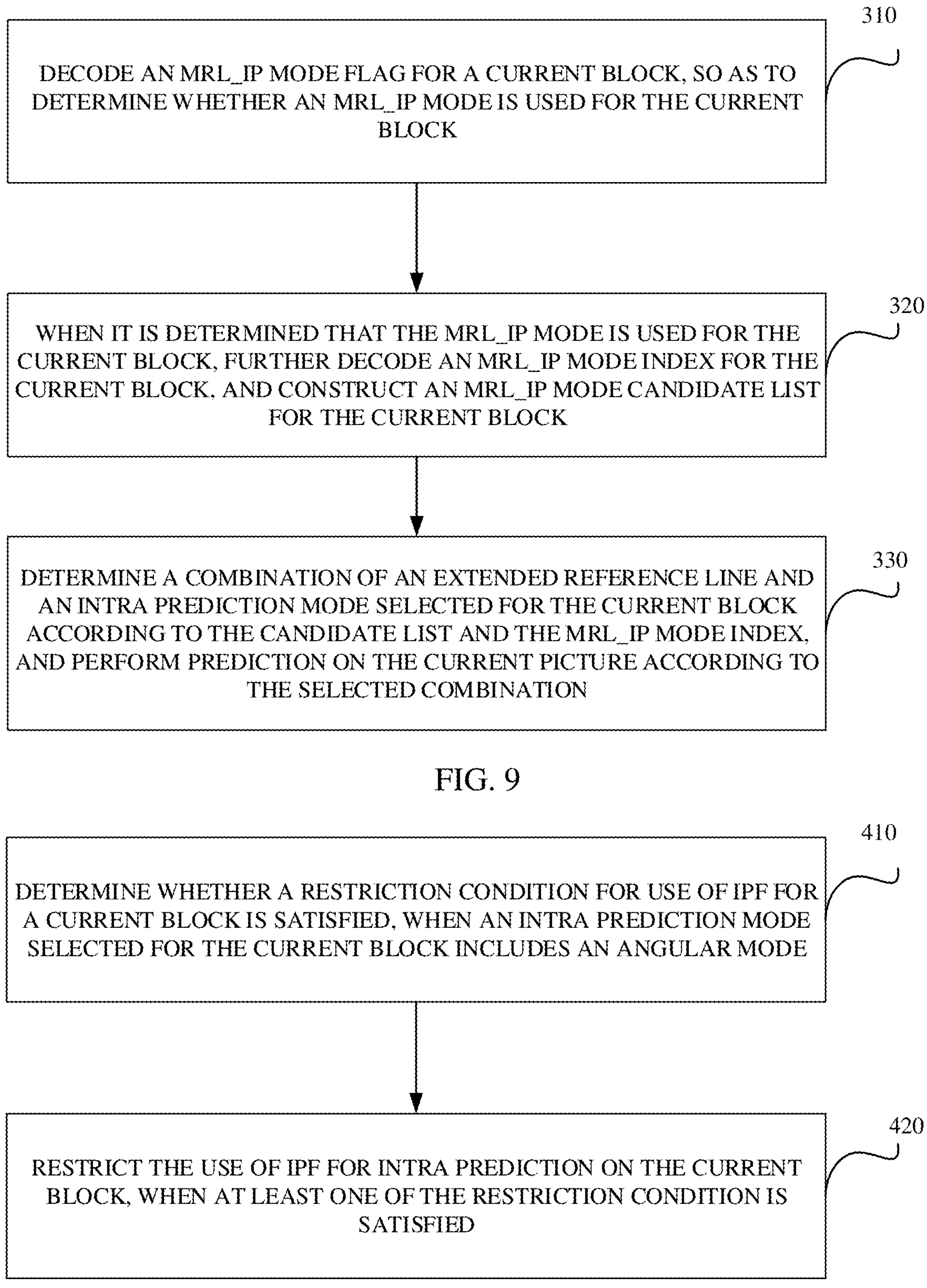
FIG. 9 is a flow chart of a video decoding method according to an embodiment of the present disclosure.
FIG. 10 is a flow chart of an intra prediction fusion (IPF) method according to an embodiment of the present disclosure.

An embodiment provides a TMRL mode-related video decoding method. The method is applied to a decoder and includes the following as illustrated in FIG. 9.

Step 310, a TMRL mode flag for the current block is decoded, so as to determine whether a TMRL mode is used for the current block.

Step 320, when it is determined that the TMRL mode is used for the current block, a TMRL mode index for the current block is further decoded, and a TMRL mode candidate list for the current block is constructed, where the candidate list is filled with combinations of candidate extended reference lines and candidate intra prediction modes for the current block.

Step 330, a combination of an extended reference line and an intra prediction mode selected for the current block is determined according to the candidate list and the TMRL mode index, and prediction on the current picture is performed according to the selected combination. The TMRL mode index is used to indicate the position of the selected combination of an extended reference line and an intra prediction mode in the candidate list.

In the present embodiment, after it is determined that the TMRL mode is used for the current block by decoding the TMRL mode flag, the combinations of extended reference lines and intra prediction modes are filled into the TMRL mode candidate list, the combination selected for the current block is determined according to the TMRL mode index obtained by decoding and the candidate list, and prediction on the current block is performed based on the combination selected. That is, the TMRL mode index can indicate both the extended reference line and the intra prediction mode selected for the current block, and there is no need to use two indexes to respectively indicate the extended reference line and the intra prediction mode, thereby reducing cost for coding.

In an example of the embodiment, before decoding the TMRL mode flag for the current block, the method further includes the following. When all conditions for allowing use of the TMRL mode for the current block are met, the TMRL mode flag for the current block is decoded, where the conditions for allowing use of the TMRL mode include any one or more of the following: the current block is a block in a luma picture; MRL is allowed for the current block; the current block is not located at the upper boundary of the CTU; TIMD is not used for the current block.

In the example, when one of the above conditions is met, the TMRL mode is not allowed to be used, and the decoding for the TMRL mode flag and the TMRL mode index can be skipped. However, this is not necessarily the case in other embodiments. For example, when the TMRL mode is encoded and decoded before TIMD, the use of TIMD for the current block cannot be used as a condition for not allowing use of the TMRL mode. For another example, in the future, when the hardware can support obtaining reference lines located outside the boundary of the CTU, the current block being located at the upper boundary of the CTU will no longer be a condition for not allowing use of the TMRL mode, and so on.

In an example of the embodiment, the method further includes the following. In the case where it is determined, through decoding, that MRL is allowed for the current block, the current block is not located at the upper boundary of the CTU, and TIMD is used for the current block, an MRL index for the current block is decoded, where the MRL index is used to indicate the position of a reference line selected for the current block in an MRL index list. In the example, in the case where TIMD is used for the current block, the TMRL mode is not allowed, but MRL is still allowed, and thus the reference line selected for the current block can still be determined by decoding the MRL index for the current block, and then prediction on the current block can be performed according to the selected reference line in conjunction with the TIMD mode selected for the current block.

In an example of the embodiment, when it is determined according to the TMRL mode flag that the TMRL mode is used for the current block, the method further includes: skipping the decoding for syntax elements of any one or more of the following modes: an MPM mode, an ISP mode, an MTS mode, an LFNST mode, and the TIMD mode. If encoding for one or more of the above modes are skipped at the encoding end in the case where the TMRL mode flag is used for the current block, correspondingly, the decoding end also skips decoding for these modes in the case where the decoding end determines through decoding that the TMRL mode flag is used for the current block.

An embodiment further provides a video decoding method, which specifically involves a decoding process for intra prediction, and also describes an encoding end. In the embodiment, the encoding end constructs a TMRL mode candidate list. When a combination in the candidate list is selected for the current block through mode selection, syntax elements of a TMRL mode are encoded and decoded. Combinations of extended reference lines and intra prediction modes are encoded and decoded.

In the embodiment, according to N predefined extended reference lines and M intra prediction modes, a template is constructed in a reference line with an index of 0, i.e., reference line, reference can be made to the template region 30 illustrated in FIG. 8A. (x, −1), (−1, y) are coordinates of positions relative to the upper left corner (0, 0) of the current block. In the FIG. 5 predefined extended reference lines with indexes of {1, 3, 5, 7, 12} are added.

For constructing the TMRL mode candidate list, SADs between the prediction values of the template obtained based on the N×M combinations and a reconstructed value of the template are calculated, corresponding combinations are sorted in ascending order of SADs, and K combinations with relatively small SADs are filled into the TMRL mode candidate list in ascending order of SADs, where N×M≥2.

The construction of the TMRL mode candidate list is an operation that both the encoder and the decoder need to perform. When encoding conditions such as a combination selected for the current block being in the candidate list are met, the encoding end encodes a TMRL mode flag to indicate the use of the TMRL mode, and also determines a TMRL mode index according to the position of the selected combination in the candidate list. For example, when the selected combination is in the first position, the TMRL mode index is 0, when the selected combination is in the second position, the TMRL mode index is 1, and so on. The TMRL mode index can be encoded using golomb—rice coding, but the present disclosure is not limited to thereto.

The following is illustrated by taking that N=5, M=6, and K=12 as an example. The indexes of 5 predefined extended reference lines are {1, 3, 5, 7, 12}, and 6 intra prediction modes are selected step by step.

The video decoding method of the embodiment includes the following.

Step 1: syntax elements related to the TMRL mode are decoded.

The decoder parses syntax elements related to intra prediction modes, including syntax elements related to a TIMD mode, an MRL mode, and other modes. The TMRL mode proposed in the embodiment can be regarded as an evolution of the MRL mode, and the syntax elements of the TMRL mode can also be regarded as part of the syntax elements of the MRL mode. Certainly, the two modes can also be regarded as two different modes.

In the case where TIMD is used for the current block, the manner for decoding the syntax elements of the MRL mode remains unchanged. In the case where the TIMD mode is not used for the current block, the syntax elements of the TMRL mode need to be decoded. Syntax elements for the current block are decoded as illustrated in the following table:

| | Descriptor |
|---|---|
| coding_unit(x0, y0, cbWidth, cbHeight, cqtDepth, treeType, modeType) { | |
| ... ... | |
| if(pred_mode_plt_flag) | |
| palette_coding(x0, y0, cbWidth, cbHeight, treeType) | |
| else { | |
| if( sps_bdpcm_enabled_flag && | |
| cbWidth <= MaxTsSize && cbHeight <= MaxTsSize ) | |
| intra_bdpcm_luma_flag | ae(v) |
| if( intra_bdpcm_luma_flag ) | |
| intra_bdpcm_luma_dir_flag | ae(v) |
| else { | |
| if( sps_mip_enabled_flag ) | |
| intra_mip_flag | ae(v) |
| if( intra_mip_flag ) { | |
| intra_mip_transposed_flag[x0][y0] | ae(v) |
| intra_mip_mode[x0][y0] | ae(v) |
| } else { | |
| if( sps_timd_enable_flag && cbWidth * cbHeight <= 1024 ) | |
| intra_timd_flag | ae(v) |
| if( sps_mrl_enabled_flag && ( (y0 % CtbSizeY)> 0) && !intra_timd_flag ) | |
| cu_tmrl_flag | ae(v) |
| if(cu_tmrl_flag ) | |
| tmrl_idx | ae(v) |
| if( sps_mrl_enabled_flag && ( (y0 % CtbSizeY) >0) && intra_timd_flag ) | |
| intra_luma_ref_idx | ae(v) |
| if( sps_isp_enabled_flag && intra_luma_ref_idx = = 0 && | |
| ( cbWidth <= MaxTbSizeY && cbHeight <= MaxTbSizeY ) && | |
| ( cbWidth * cbHeight > MinTbSizeY * MinTbSizeY ) && | |
| !cu_act_enabled_flag && !cu_tmrl_flag) | |
| intra_subpartitions_mode_flag | ae(v) |
| if( intra_subpartitions_mode_flag = = 1 ) | |
| intra_subpartitions_split_flag | ae(v) |
| if(!intra_timd_mode &&!cu_tmrl_flag){ | |
| if( intra_luma_ref_idx = = 0 ) | |
| intra_luma_mpm_flag[x0][y0] | ae(v) |
| if( intra_luma_mpm_flag[x0][y0] ) { | |
| if( intra_luma_ref_idx = = 0 ) | |
| intra_luma_not_planar_flag[x0][y0] | ae(v) |
| if( intra_luma_not_planar_flag[x0][y0] ) | |
| intra_luma_mpm_idx[x0][y0] | ae(v) |
| } else | |
| intra_luma_mpm_remainder[x0][y0] | ae(v) |
| } | |
| } | |
| } | |
| } | |
| } | |
| ... ... | |

"cu_tmrl_flag" in the table is the TMRL mode flag. When the value of "cu_tmrl_flag" is equal to 1, it means that the TMRL mode is used for the current block, that is, it is defined that the intra prediction type for the current luma sample is the TMRL mode. When the value of "cu_tmrl_flag" is equal to 0, it means that the TMRL mode is not used for the current block, that is, it is defined that the intra prediction mode type for the current luma sample is not the TMRL mode.

"tmrl idx" in the table is the TMRL mode index, which indicates the position of a combination of an extended reference line and an intra prediction mode selected for the current block in the TMRL mode candidate list. It can also be said that "tmrl_idx" defines the index of the selected combination in the candidate list containing sorted TMRL modes (the index indicating the position of the combination). "tmrl_idx" can be encoded and decoded using the golomb-rice coding, which will not be repeated here.

As can be seen from the above table, before decoding cu_tmrl_flag, whether the following conditions are met is determined first: MRL is allowed for the current block (i.e., whether sps_mrl_enabled_flag is 1); the current block is not located at the upper boundary of the CTU (i.e., whether y0% CtbSizeY)>0); and TIMD is not used for the current block. When these conditions are met, cu_tmrl_flag is decoded. If the other two conditions are met and TIMD is used for the current block, the MRL index intra_luma_ref_idx for the current block is decoded.

The ISP mode flag intra_subpartitions_mode_flag in the table is decoded after the syntax elements related to the TMRL mode. If the TMRL mode is not used for the current block (!cu_tmrl_flag is true), then intra_subpartitions_mode_flag is decoded. Similarly, if the TMRL mode is not used for the current block (!cu_tmrl_flag is true), then MPM-related syntax elements are decoded.

Step 2: the TMRL mode candidate list is constructed, and an extended reference line and an intra prediction mode selected for the current block is determined according to the TMRL mode index and the candidate list. After the parsing stage, before performing prediction on the current block, when the TMRL mode is used for the current block, it is necessary to construct the TMRL mode candidate list, and the extended reference line and the intra prediction mode selected for the current block are determined according to the TMRL mode index and the candidate list.

To construct the TMRL mode candidate list, it is necessary to first determine candidate extended reference lines and candidate intra prediction modes.

Determine Candidate Extended Reference Lines

Candidate extended reference lines are selected from predefined extended reference lines. Which of the predefined extended reference lines can be used is determined according to the position of the current block in the picture. In principle, upper reference lines that can be used for the current block should not exceed the upper boundary of the CTU. In one example, among extended reference lines with indexes of {1, 3, 5, 7, 12}, extended reference lines that do not exceed the boundary of the CTU are added to candidate extended reference lines. In order to obtain better performance of coding or to reduce complexity, more or fewer extended reference lines can be used.

Determine Candidate Intra Prediction Modes

In the embodiment, the TMRL mode is not bound with the MPM (may be bound with the MPM in other embodiments), but an intra prediction mode candidate list is constructed, and intra prediction modes used for combination are selected from the candidate list. The method for deriving the candidate list is as follows.

First, among 67 traditional prediction modes, the planar mode and the DC mode are excluded, or only the planar mode is excluded and the DC mode is retained. The excluded mode(s) is not added to the candidate list, that is, not used as an intra prediction mode for participating in combination in TMRL modes.

In the embodiment, the length of the prediction mode candidate list to be constructed is 6. Non-repeated intra prediction modes are selected in sequence according to intra prediction modes used for prediction blocks at 5 neighbouring positions around the current block to fill the prediction mode candidate list. Then, the extension operation for angular modes is performed on the modes that have been filled into the list. Specifically, the +/−1 operation is performed on the angular modes in sequence, and non-repeated extended angular modes are selected and filled into the prediction mode candidate list in sequence. If the number of modes filled in the candidate list reaches 6, filling is stopped.

The specific process of the +/−1 operation is illustrated in the following table:

| | |
|---|---|
| numCands = modeIdx | Record the total number of prediction modes for 5 neighbouring prediction blocks |
| if(numCands > 0 && !(numCands == 1 && mpm[0] == DC_IDX)){ | If there are more than 0 angular modes, then further attempt to perform the +/−1 operation on angular modes; otherwise, skip the +/−1 operation |
| for(i = 0; i < numCands && modeIdx < MPM_SIZE; i++){ | The loop starts from the first filled mode and continues until all modes are processed or the candidate prediction mode list is filled up |
| if(mpm[i] <= DC_IDX) | If the mode filled is not an angular mode, skip the +/−1 operation |
| continue | |
| mpm[modeIdx] = ((mpm[i] + offset) % mod) + 2 | Obtain "the i-th filled angular mode − 1". If "angular mode − 1" is less than angular mode 2, select an angular mode in the opposite direction of "angular mode − 1". |

-continued

```
if (isInclude(mpm[modeIdx]))
      isInclude(mpm[modeIdx++]) = true       If "angular mode − 1" is not a repeated
                                             mode of any filled angular mode, fill
                                             "angular mode − 1" into the candidate
                                             prediction mode list and update the list
                                             to not include a repeated mode(s)
 if(modeIdx >= MPM_SIZE)                     If the candidate prediction mode list is
                                             filled up, stop filling
      break
  mpm[modeIdx] = ((mpm[i] −1) %              Obtain "the i-th filled angular mode +
          mod) + 2                           1". If "angular mode + 1" is greater
                                             than angular mode 66, select an
                                             angular mode in the opposite direction
                                             of "angular mode + 1"
 if (isInclude(mpm[modeIdx]))
      isInclude(mpm[modeIdx++]) = true       If "angular mode + 1" is not a repeated
                                             mode, fill "angular mode + 1" into the
                                             list and update the list to not include a
                                             repeated mode(s).
 }
}
... ...                                      If the list is not filled up, fill the list
                                             with a default mode(s)
```

The above "angular mode −1" refers to an angular mode obtained by subtracting 1 from an index of a filled angular mode. For example, if the filled angular mode is mode 3, "angular mode −1" is angular mode 2. The above "angular mode +1" refers to an angular mode obtained by adding 1 to an index of a filled angular mode. For example, if the filled angular mode is mode 3, "angular mode −1" is angular mode 4.

If "angular mode −1" is less than angular mode 2, for example, if "angular mode −1" is angular mode 1 (indexes of angular modes are numbered from 2, and angular mode 1 does not exist), then an angular mode in the opposite direction of "angular mode −1" is selected. Assuming that there are 65 angular modes, in this case, the angular mode in the opposite direction is angular mode 66. If "angular mode +1" is greater than angular mode 66, then an angular mode in the opposite direction of "angular mode +1" is selected in a similar way. For example, if a filled angular mode is angular mode 66, then "angular mode +1" does not exist, in this case, the angular mode in the opposite direction of "angular mode +1" is angular mode 2.

Regarding extension on angular modes, the +/−1 operation is performed on angular modes. In other embodiments, the +/−1 operation can be expanded to the operation of "+/−X". Assuming that X=3, the "+/−1", "+/−2", "+/−3" operations can be performed on angular modes until the candidate prediction mode list is filled up.

If the prediction mode candidate list is still not filled up after performing the extension operation on angular modes that have been filled into the list, the prediction mode candidate list is filled with non-repeated modes in a predefined mode set until the prediction mode candidate list is filled up. The mode set includes some angular modes selected according to statistical rules, as follows: mpm_default [ ]={DC_IDX, VER_IDX, HOR_IDX, VER_IDX−4, VER_IDX+4, 14, 22, 42, 58, 10, 26, 38, 62, 6, 30, 34, 66, 2, 48, 52, 16}, where DC_IDX represents the DC mode, VER_IDX represents a vertical mode, HOR_IDX represents a horizontal mode, and the remaining numbers represent angular modes corresponding to the numbers.

In the embodiment, the length of the prediction mode list candidate is 6. For reasons of performance, more angular modes can be tried, i.e., the length is set to a value greater than 6, or for reducing complexity, fewer modes can be tried, i.e., the length is set to a value less than 6.

In the embodiment, for determining candidate intra prediction modes, the planar mode and the DC mode can be excluded, or only the planar mode is excluded. However, if the complexity is not considered, the two modes may not be excluded, that is, the planar mode, the DC mode, and all angular modes may all be used as candidate intra prediction modes to participate in combination with extended reference lines.

Construct the TMRL Mode Candidate List

After determining candidate extended reference lines and candidate intra prediction modes, all combinations of extended reference lines in an extended reference line list and prediction modes in a candidate prediction mode list can be tried one by one, and prediction on a template region in reference line 0 (the template as illustrated in the figure below) is performed based on each of the combinations, as illustrated in FIG. 8A. A difference between a reconstructed value of the template region and a prediction value obtained by prediction based on each combination is calculated, and K combinations corresponding to the lowest differences are filled into the TMRL mode candidate list in ascending order of differences.

In the prediction process of the embodiment, the use of the TMRL mode is restricted when the current block is located in the first line of the CTU. When the current block is located at the left boundary of the picture, the TMRL mode can still be used. In this case, since reference line 0 on the left is already located outside the boundary of the picture, no prediction is performed on the left template, that is, prediction is performed on only the upper template region.

The process of prediction on the template region can be completely consistent with other normal intra angle prediction processes, that is, a reconstructed value of a reference line is first filtered and then used as the initial prediction value of the template region. After prediction on the template region is performed based on the filtered reconstructed value of the reference line and the intra prediction mode in the combination, 4 or 6 tap filtering is performed on the initial prediction result and then the filtered initial prediction result is used as the prediction value obtained through prediction. Considering the complexity of the operation, the filtering on the reconstructed value of the reference line can be omitted, and a filter with a relatively short tap can be used. In the embodiment, for obtaining the prediction value of the template region through prediction, the reconstructed value of the reference line pixel is not filtered, and the initial prediction result is filtered with a 4-tap interpolation filter with a precision of 1/32 at a non-integer angle.

Finally, prediction on the template region is performed based on an angle and a reference line in the current combination and the filter. SADs between prediction values of the template region obtained through prediction and a reconstructed value of the template region are calculated and sorted in ascending order of the SADs, and 12 combinations with the lowest SADs are selected and filled into the TMRL mode candidate list.

A fast algorithm can be used in the sorting process. In the above process, 5 reference lines and 6 prediction modes with a total of 30 combinations need to be tried, but only 12 combinations with the lowest SADs need to be selected. In the embodiment, after prediction based on the first 12 combinations is completed and corresponding SADs are obtained, starting from the 13-th combination, only 12 combinations with the lowest differences (also called cost) need to be retained and used for updating. Starting from the 13-th combination, prediction is performed on only the upper template region and a corresponding SAD is calculated. When the SAD calculated based on the upper template is larger than the highest difference corresponding to a combination among the 12 combinations with the lowest differences, the prediction and difference calculation for the left template region can be skipped. For details, reference can be made to the above embodiment.

Step 3, the combination of an extended reference line and an intra prediction mode selected for the current block is determined according to the constructed TMRL mode candidate list and the TMRL mode index obtained by decoding, and intra prediction is performed on the current block according to the selected combination.

When the TMRL mode is used, refIdx and predModeIntra define the mode used for intra prediction, and are determined according to the TMRL mode index "tmrl_idx" and the TMRL mode candidate list.

For the ECM-4.0 reference software, by means of the method described in the embodiment, and the setting of N=5 (5 extended reference lines are reference lines 1, 3, 5, 7, 12, respectively), M=6 (6 predefined prediction modes, not including the planar mode and the DC mode), and K=12 (12 combinations with small SADs among all the combinations are merely selected), the measurement results under the AI configuration are as follows:

| | All Intra Main 10 Over ECM | | | | |
|---|---|---|---|---|---|
| | Y | U | V | EncT | DecT |
| Class A1 | #VALUE! | #VALUE! | #VALUE! | #DIV/0! | #DIV/0! |
| Class A2 | #VALUE! | #VALUE! | #VALUE! | #DIV/0! | #DIV/0! |
| Class B | −0.07% | −0.07% | −0.02% | 105% | 108% |
| Class C | −0.12% | −0.08% | −0.01% | 105% | 110% |
| Class E | −0.09% | −0.05% | 0.14% | 105% | 111% |
| Overall | #VALUE! | #VALUE! | #VALUE! | #DIV/0! | #DIV/0! |
| Class D | −0.08% | 0.08% | −0.17% | 104% | 113% |
| Class F | #VALUE! | #VALUE! | #VALUE! | #NUM! | #NUM! |
| Class TGM | #VALUE! | #VALUE! | #VALUE! | #DIV/0! | #DIV/0! |

By means of the setting of N=5 (5 extended reference lines are reference lines 1, 3, 5, 7, 12, respectively), M=8 (8 predefined prediction modes), and K=16, the measurement results under the AI configuration are as follows:

| | All Intra Main 10 Over ECM | | | | |
|---|---|---|---|---|---|
| | Y | U | V | EncT | DecT |
| Class A1 | #VALUE! | #VALUE! | #VALUE! | #DIV/0! | #DIV/0! |
| Class A2 | #VALUE! | #VALUE! | #VALUE! | #DIV/0! | #DIV/0! |
| Class B | −0.08% | −0.04% | −0.05% | 105% | 110% |
| Class C | −0.13% | −0.09% | −0.05% | 104% | 110% |
| Class E | −0.11% | 0.10% | −0.08% | 106% | 116% |
| Overall | #VALUE! | #VALUE! | #VALUE! | #DIV/0! | #DIV/0! |
| Class D | −0.08% | 0.18% | −0.02% | 104% | 115% |
| Class F | −0.12% | −0.06% | −0.01% | 111% | 116% |

By means of the setting of N=5 (5 extended reference lines are reference lines 1, 3, 5, 7, 12, respectively), M=12 (12 predefined prediction modes), and K=24, the measurement results under the AI configuration are as follows:

| | All Intra Main 10 Over ECM | | | | |
|---|---|---|---|---|---|
| | Y | U | V | EncT | DecT |
| Class A1 | #VALUE! | #VALUE! | #VALUE! | #DIV/0! | #DIV/0! |
| Class A2 | #VALUE! | #VALUE! | #VALUE! | #DIV/0! | #DIV/0! |
| Class B | −0.08% | −0.04% | −0.07% | 108% | 114% |
| Class C | −0.16% | −0.20% | −0.12% | 106% | 118% |
| Class E | −0.12% | 0.02% | −0.07% | 107% | 115% |
| Overall | #VALUE! | #VALUE! | #VALUE! | #DIV/0! | #DIV/0! |
| Class D | −0.11% | 0.03% | −0.10% | 105% | 117% |
| Class F | −0.13% | −0.10% | −0.10% | #NUM! | #NUM! |

By means of the setting of N=5 (5 extended reference lines are reference lines 1, 3, 5, 7, 12, respectively), M=8 (8 predefined prediction modes, not including the planar mode and the DC mode), and K=16, the measurement results under the AI configuration are as follows:

| | All Intra Main 10 Over ECM | | | | |
|---|---|---|---|---|---|
| | Y | U | V | EncT | DecT |
| Class A1 | #VALUE! | #VALUE! | #VALUE! | #DIV/0! | #DIV/0! |
| Class A2 | #VALUE! | #VALUE! | #VALUE! | #DIV/0! | #DIV/0! |
| Class B | −0.09% | −0.06% | −0.02% | 107% | 112% |
| Class C | −0.17% | −0.06% | −0.13% | 105% | 115% |
| Class E | −0.08% | 0.14% | 0.03% | 106% | 114% |
| Overall | #VALUE! | #VALUE! | #VALUE! | #DIV/0! | #DIV/0! |
| Class D | −0.08% | 0.18% | −0.21% | 104% | 118% |
| Class F | −0.06% | −0.09% | −0.18% | #NUM! | #NUM! |

The meanings of the parameters in the table are as follows.

EncT: encoding time, 10X % means that when the technology for sorting reference lines is integrated, the encoding time is 10X % compared with the encoding time before the integration, which means that the encoding time increases by X %.

DecT: decoding time, 10X % means that when the technology for sorting reference lines is integrated, the decoding time is 10X % compared with the decoding time before the integration, which means that the decoding time increases by X %.

ClassA1 and ClassA2 are test video sequences with a resolution of 3840×2160, ClassB is a test sequence with a resolution of 1920×1080, ClassC is a test sequence with a resolution of 832×480, ClassD is a test sequence with a resolution of 416×240, and ClassE is a test sequence with a resolution of 1280×720; ClassF represents several screen content sequences with different resolutions.

Y, U, and V represent three colour components. The columns where Y, U, and V are located represent Bjøntegaard-Delta rate (BD-rate) indicators of the test results on Y, U, and V. The smaller the value, the better the performance of coding.

All intra represents the test configuration of all intra configuration.

It can be seen that, using the TMRL mode for intra prediction encoding and decoding of this embodiment can significantly improve performance of coding.

In the embodiment, for extended reference lines or prediction modes, a template region of 1 row and 1 column is used, and extended reference lines or prediction modes are sorted and screened in ascending order of SADs. For extended reference lines, if all the extended reference lines (including reference line 1) are sorted, only a template of 1 row and 1 column can be used. However, for the screening of prediction modes, in order to screen out more suitable prediction modes, similar to the TIMD mode, more reference lines can be used to obtain more accurate results. In other embodiments, the manner for determining prediction modes in the TMRL mode candidate list can also be changed.

For example, when a prediction mode candidate list of a length of 6 needs to be constructed, a list of a length greater than 6 can be first constructed according to the same construction and filling methods as in the embodiment, and then 4 rows and 4 columns closest to the current block are used as a template, and prediction on the template is performed using the 5-th reference line and an intra prediction mode in the prediction mode candidate list, and the differences (SADs or SATDs) between prediction values obtained by prediction and a reconstructed value of the template are calculated and sorted in ascending order, and 6 intra prediction modes with small differences are selected as intra prediction modes in the to-be-constructed TMRL mode candidate list of a length of 6. In addition, the length of the TMRL mode candidate list being 6 is only an example, and the length can be adjusted according to the situation.

In the embodiment, 65 angular modes are taken as an example, but in other embodiments, angular modes can be extended to 129 angular modes or more angular modes to achieve better performance. In the case where angular modes are extended to more angular modes, the number of filters for intra prediction also needs to be increased accordingly. For example, when there are 129 angular modes, filtering of a precision of 1/64 is used.

An embodiment further provides an intra prediction fusion (IPF) technology. For IPF, it is allowed to weight prediction results obtained by that an angular mode is used with two neighbouring reference lines to obtain a final prediction result for the current block. The manner of weighting is as follows: $p_{fusion}=w_a \times p_a + w_b \times p_b \cdot p_a$ represents a result obtained by performing prediction on the current block using a reference line with an index of a (reference line a) and the angular mode, $p_b$ represents a result obtained by performing prediction on the current block using a reference line with an index of a+1 (reference line a+1) and the angular mode, $p_{fusion}$ represents a fusion prediction result, $w_a$ represents a weighting factor for $p_a$, $p_b$ represents a weighting factor for $p_b$, $w_a$ is 3/4, and $w_b$ is 1/4.

When IPF is used for the current block, the fusion prediction result is taken as the final prediction result of the current block.

In the embodiment, no flag indicative of whether IPF is used or not (activated or not) is set, but it is default that IPF is activated for an angular mode selected for the current block when the following conditions are satisfied: the angular mode selected for the current block is an angular mode with a non-integer slope; the product of the width and height of the current block is greater than 16; and an ISP mode is not used for the current block.

In other words, IPF is not allowed to be used when at least one of restriction condition(s) is satisfied: the angular mode selected for the current block is an angular mode with an integer slope; the product of the width and height of the current block is less than or equal to 16; or the ISP mode is used for the current block.

When intraPredAngle of an angular mode has a reminder of 0 when divided by 32, the angular mode is an angular mode with an integer slope. The correspondence between intraPredAngle and angular modes can be seen in Table 1 above.

When the current mode satisfies a condition of using IPF, an intra prediction mode selected for the current block may be a DIMD fusion mode (fusing the planar mode and two angular modes) selected through DIMD, or a TIMD fusion mode selected through TIMD. From the perspective of hardware implementation, it is better to minimize fusion. In the case where the DIMD fusion mode is selected, there are already three intra-prediction results for the current block that are to be fused, if IPF is further used, excessive fusion will be caused, which increases the complexity of the prediction phase.

An embodiment of the present disclosure provides an IPF method. The method can be applied to an encoder, and can also be applied to a decoder. As illustrated in FIG. 10, the method includes the following.

Step 410, whether a restriction condition(s) for use of IPF for a current block is satisfied is determined when an intra prediction mode(s) selected for the current block includes an angular mode.

Step 420, the use of IPF for intra prediction on the current block is restricted when at least one of the restriction condition(s) is satisfied.

In this step, restricting the use of IPF for intra prediction on the current block may be that IPF is not allowed, or may be that in the case where the selected intra prediction modes include multiple angular modes that satisfy the use condition for IPF, IPF is only allowed to be performed on some of the angular modes. In an example, the angular mode that satisfies the use condition for IPF refers to an angular mode with a non-integer slope, or an angular mode with an angle that is neither −45°, 0°, 45°, 90°, nor 135°.

In the text, the case that IPF is not allowed when a restriction condition is satisfied is a sufficient condition for not allowing the use of IPF for prediction on the current block. Conversely, the case that IPF is allowed when a restriction condition is not satisfied is a necessary condition for performing prediction on the current block with IPF. However, even if other restriction conditions are met, IPF may still be disallowed.

In an exemplary embodiment of the present disclosure, the restriction condition(s) include a mode quantity restriction condition as follows: the use of IPF will lead to a need to fuse more than N intra prediction modes for prediction on the current block, where N is an integer greater than or equal to 3.

In an example of the embodiment, under a condition of N=3, determining whether the restriction condition(s) for the use of IPF for the current block is satisfied when the intra prediction mode(s) selected for the current block includes an angular mode, and restricting the use of IPF for intra prediction on the current block when at least one of the restriction condition(s) is satisfied, include the following. In a case where the TIMD fusion mode is selected for the current block and two angular modes satisfying the use condition for IPF are used for TIMD fusion, it is determined that the mode quantity restriction condition is satisfied, and IPF is allowed to be performed for merely one of the two angular modes to perform intra prediction on the current block. In a case where the TIMD fusion mode is selected for the current block and merely one of two intra prediction modes used for TIMD fusion is an angular mode satisfying the use condition for the IPF, it is determined that the mode quantity restriction condition is not satisfied, and IPF is allowed to be performed for the angular mode to perform intra prediction on the current block.

In an exemplary embodiment of the present disclosure, the restriction condition(s) includes a mode quantity restriction condition: the use of IPF will lead to a need to fuse more than M angular modes for prediction on the current block, where M is an integer greater than or equal to 2.

In an example of the embodiment, under a condition of M=3, determining whether the restriction condition(s) for the use of IPF for the current block is satisfied when the intra prediction mode(s) selected for the current block includes an angular mode, and restricting the use of IPF for intra prediction on the current block when at least one of the restriction condition(s) is satisfied, include the following. In a case where the TIMD fusion mode is selected for the current block and two angular modes satisfying the use condition for IPF are used for TIMD fusion, it is determined that the mode quantity restriction condition is satisfied, and IPF is allowed to be performed for merely one of the two angular modes to perform intra prediction on the current block. For example, IPF is allowed to be performed for merely an angular mode with a lowest cost or a second lowest cost in the two angular modes. In a case where the TIMD fusion mode is selected for the current block and merely one of two intra prediction modes used for TIMD fusion is an angular mode satisfying the use condition for the IPF, it is determined that the mode quantity restriction condition is not satisfied, and IPF is allowed to be performed for the angular mode to perform intra prediction on the current block.

In an example of the embodiment, under a condition of M=3, determining whether the restriction condition(s) for the use of IPF for the current block is satisfied when the intra prediction mode(s) selected for the current block includes an angular mode, and restricting the use of IPF for intra prediction on the current block when at least one of the restriction condition(s) is satisfied, include the following. In a case where the DIMD fusion mode is selected for the current block and two angular modes satisfying the use condition for IPF are used for DIMD fusion, it is determined that the mode quantity restriction condition is satisfied, and IPF is allowed to be performed for merely one of the two angular modes to perform intra prediction on the current block. For example, IPF is allowed to be performed for merely an angular mode with a highest cost or a second highest cost in the two angular modes. In a case where the DIMD fusion mode is selected for the current block and merely one of two intra prediction modes used for DIMD fusion is an angular mode satisfying the use condition for IPF, it is determined that the mode quantity restriction condition is not satisfied, and IPF is allowed to be performed for the angular mode satisfying the use condition for IPF to perform intra prediction on the current block.

In example of the embodiment, under a condition of M=2, determining whether the restriction condition(s) for the use of IPF for the current block is satisfied when the intra prediction mode(s) selected for the current block includes an angular mode, and restricting the use of IPF for intra prediction on the current block when at least one of the restriction condition(s) is satisfied, include the following. In a case where the TIMD fusion mode is selected for the current block and two angular modes satisfying the use condition for IPF are used for TIMD fusion, it is determined that the mode quantity restriction condition is satisfied, and IPF is not allowed to be performed for intra prediction on the current block. In a case where the TIMD fusion mode is selected for the current block and merely one of two intra prediction modes used for TIMD fusion is an angular mode satisfying the use condition for IPF, it is determined that the mode quantity restriction condition is not satisfied, and IPF is allowed to be performed for the angular mode satisfying the use condition for IPF to perform intra prediction on the current block.

In the above embodiments, allowing to perform IPF for an angular mode to perform intra prediction on the current block includes the following. A weighted sum of two or more prediction results is taken as a final prediction result of the current block, where the two or more prediction results includes: a prediction result obtained by performing prediction on the current block according to a first reference line selected for the current block and the angular mode, and a prediction result obtained by performing prediction on the current block according to a second reference line different from the first reference line and the angular mode. For example, the second reference line may be a reference line adjacent to the first reference line or a reference line with an index of 0.

In an exemplary embodiment of the present disclosure, the restriction condition(s) includes any one or more of the following. Restriction condition 1: the TIMD fusion mode is selected for the current block. Restriction condition 2: the DIMD fusion mode is selected for the current block. Restriction condition 3: MRL is used for the current block. Restriction condition 4: an index of a reference line selected for the current block is greater than or equal to K, where K is an integer greater than or equal to 3. Restriction condition 5: a width of the current block is less than or equal to a set value. Restriction condition 6: a height of the current block is less than or equal to a set value. Restriction condition 7: a product of the width and the height of the current block is less than or equal to a set value. Restriction condition 8: an ISP mode is used for the current block. Restriction condition 9: an angle of an angular mode selected for the current block equals to −45°, 0°, 45°, 90°, or 135°, or an angular mode selected for the current block is an angular mode with an integer slope. Restriction condition 10: a current frame to which the current block belongs is an inter frame. Restriction condition 11: the current picture to which the current block belongs is a chroma picture, that is, IPF is used for merely a luma picture, and not used for a chroma picture. IPF is not allowed to be performed for intra prediction on the current block when at least one of the restriction conditions 1 to 11 is satisfied.

In an example of the embodiment, the restriction condition(s) includes the restriction condition 4 where K=3 or 5 or 7 or 12.

In the above embodiments of the present disclosure, the use of IPF is limited, for example, the number of intra prediction modes used for fusion is limited, the number of angular modes used for fusion is limited, and IPF is restricted from being used together with prediction modes in which multiple modes are fused, such as the TIMD mode and the DIMD mode, so that excessive fusion during prediction can be avoided, where excessive fusion can lead to an unsuitable increase in the complexity of the prediction phase.

In the embodiment, the size of the current block can also be limited, and IPF is used only when the size of the current block exceeds a certain threshold. This is because when the size of the current block is less than a threshold, the current block generally contains more texture, making the performance improvement achieved using fusion prediction limited. In the embodiment, IPF is not allowed when an index of a reference line selected for the current block is greater than or equal to K, that is, IPF is not allowed when an extended reference line selected for the current block is relatively far from the current block, as in this case performance improvement achieved using IPF is limited.

In the embodiment, computational complexity can be reduced by restricting the simultaneous use of IPF and MRL. In the embodiment, IPF is not allowed when the current frame is an inter frame (such as a B-frame or P-frame), which helps reduce the cost of inter-frame coding.

In an exemplary embodiment of the present disclosure, the method further includes the following. Intra prediction is performed on the current block using IPF when none of the restriction condition(s) is satisfied. Intra prediction is performed on the current block using IPF as follows. A weighted sum of a first prediction result and a second prediction result is taken as a final prediction result of the current block when only one intra prediction mode is selected for the current block and the intra prediction mode is an angular mode. The first prediction result is obtained by performing prediction on the current block according to a first reference line selected for the current block and a first angular mode selected for the current block, and the second prediction result is obtained by performing prediction on the current block according to a second reference line and the first angular mode, where the second reference line is a neighbouring line of the first reference line or a reference line with an index of 0.

It may be noted that, the use of IPF for intra prediction on the current block when none of the aforementioned restriction conditions is satisfied does not imply that IPF is only allowed when all the restriction conditions are not satisfied. For instance, when the mode quantity restriction condition is satisfied, IPF can still be performed for a certain angular mode that satisfies the use condition for IPF.

In an example of the embodiment, the weighted sum of the first prediction result and the second prediction result is calculated according to a formula as follows: $p_{fusion}=(w_a p_a+w_b p_b)>>shift$ (formula 1) or $p_{fusion}=(w_a p_a+w_b p_b+offset)>>shift$ (formula 2). $p_a$ is the first prediction result, $p_b$ is the second prediction result, $p_{fusion}$ is the final prediction result of the current block, $w_a$ is a weighting factor for $p_a$, and $w_b$ is a weighting factor for $p_b$. $w_a+w_b=(1<<shift)$, offset=1<<(shift−1), shift>=1, shift and offset are set parameters.

By means of the above algorithms for calculation, the decimal can be avoided, thereby improving the computational efficiency.

In an exemplary embodiment of the present disclosure, the method further includes performing intra prediction on the current block using IPF when none of the restriction condition(s) is satisfied. Performing intra prediction on the current block using IPF includes the following. A weighted sum of three or more prediction results is taken as a final prediction result of the current block when an intra prediction mode selected for the current block is a fusion mode. The three or more prediction results include: multiple prediction results obtained by performing prediction on the current block according to a first reference line selected for the current block and each intra prediction mode in the fusion mode, and one or more prediction results obtained by performing prediction on the current block according to a second reference line and one or more angular modes for which IPF is allowed in the fusion mode, where the second reference line is a neighbouring line of the first reference line or a reference line with an index of 0.

In the above embodiments of the present disclosure, a weight assigned to the first prediction result is greater than a weight assigned to the second prediction result, to calculate the weighted sum of the first prediction result and the second prediction result. For example, when the first reference line is a reference line with an index of 1, and the second reference line is a reference line with an index of 0, a weight of ¾ is assigned to the first prediction result, and a weight of ¼ is assigned to the second prediction result.

In the above embodiments of the present disclosure, the second reference line is adjacent to the first reference line and is closer to the current block than the first reference line, when an index of the first reference line is greater than or equal to K, where K is an integer greater than or equal to 1.

For example, the second reference line may be determined in at least one of the following manners: when the index of the first reference line is 1, it is determined that the index of the second reference line is 0. When the index of the first reference line is 3, it is determined that the index of the second reference line is 2. When the index of the first reference line is 5, it is determined that the index of the second reference line is 4. When the index of the first reference line is 7, it is determined that the index of the second reference line is 6. When the index of the first reference line is 12, it is determined that the index of the second reference line is 11.

When the index of the first reference line is greater than or equal to K, the reference line adjacent to the first reference line and closer to the current block than the first reference line is set as the second reference line, so that the accuracy of prediction on the current block using the second reference line can be increased, thereby improving the accuracy of the prediction result obtained through fusion.

In an exemplary embodiment of the present disclosure, IPF can be used together with the TMRL mode. That is, in a case where an extended reference line and an angular mode in a TMRL mode candidate list is selected for the current block and none of the restriction condition(s) is satisfied, the first prediction result is calculated by performing prediction on the current block according to the extended reference line and the angular mode, the second prediction result is calculated by performing prediction on the current block according to another reference line and the angular mode, and the weighted sum of the first prediction result and the second prediction result is taken as the final prediction result of the current block, where the another reference line is a reference line with an index of 0 or a neighbouring line of the extended reference line.

Figure 11:
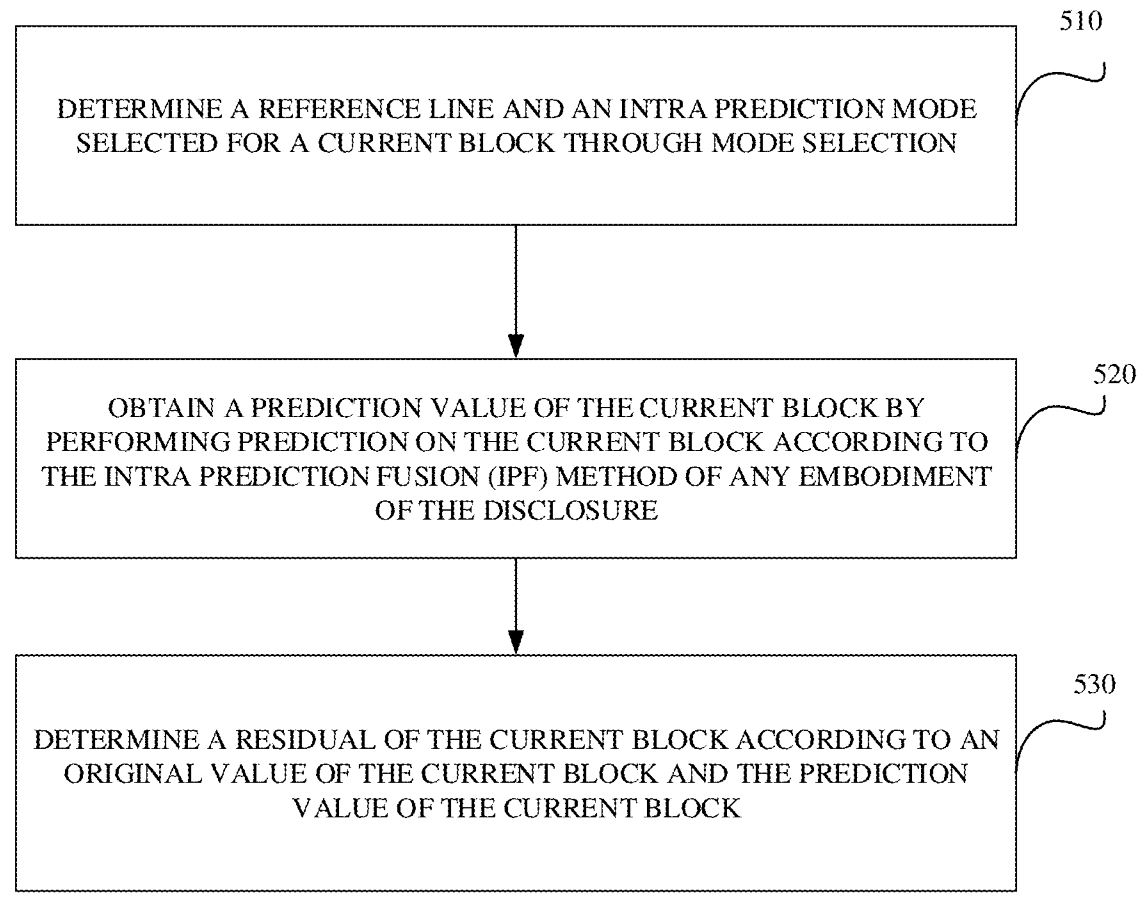
FIG. 11 is a flow chart of a video encoding method according to another embodiment of the present disclosure.

An embodiment of the present disclosure further provides a video encoding method. The method is applied to an encoder, and includes the following as illustrated in FIG. 11.

Step 510, a reference line and an intra prediction mode selected for a current block are determined through mode selection.

Step 520, a prediction value of the current block is obtained by performing prediction on the current block according to the IPF method described in any embodiment of the present disclosure. In this step, for the case that intra prediction on the current block is performed using IPF, the prediction value of the current block is obtained according to the final prediction result of the current block.

Step 530, a residual of the current block is determined according to an original value of the current block and the prediction value of the current block.

In the video encoding method in the present disclosure, prediction on the current block is performed using the IPF method of any embodiment of the present disclosure, and thus various effects achieved by IPF can be achieved.

Figure 12:
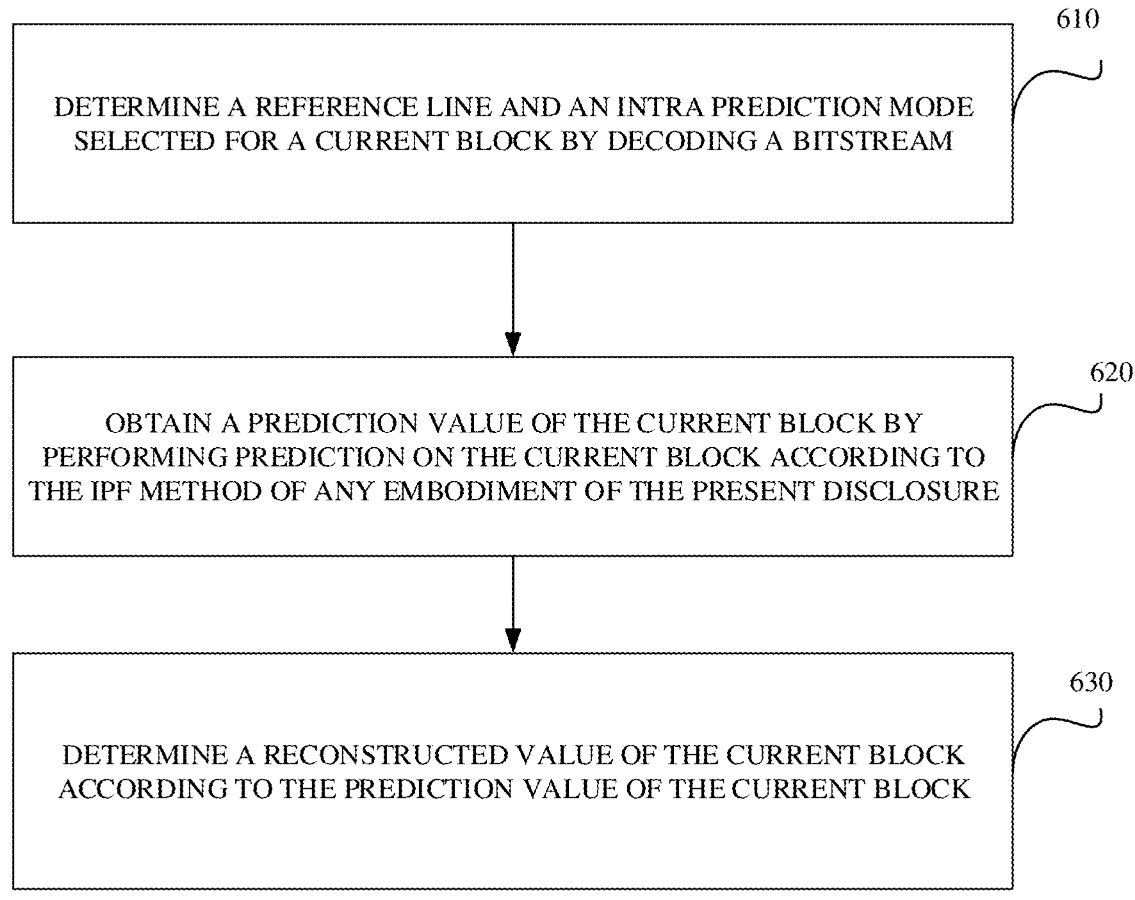
FIG. 12 is a flow chart of a video decoding method according to another embodiment of the present disclosure.

An embodiment of the present disclosure further provides a video decoding method. The method is applied to a decoder, and includes the following as illustrated in FIG. 12.

Step 610, a reference line and an intra prediction mode selected for a current block are determined by decoding a bitstream.

Step 620, a prediction value of the current block is obtained by performing prediction on the current block according to the IPF method described in any embodiment of the present disclosure. In this step, for the case that intra prediction on the current block is performed using IPF, the prediction value of the current block is obtained according to the final prediction result of the current block.

Step 630, a reconstructed value of the current block is determined according to the prediction value of the current block.

In the video decoding method in the present disclosure, prediction on the current block is performed using the IPF method of any embodiment of the present disclosure, and thus various effects achieved by the IPF can be achieved.

The intra prediction method based on the TMRL mode in the above embodiments is a prediction mode in which a candidate list is constructed according to combinations of extended reference lines and intra prediction modes, and the combination of an extended reference line and an intra prediction mode is decoded and encoded. However, for the template-based or sorting-based method, a single reference line is used for prediction. A single reference line usually contains noise, which may affect the accuracy of prediction.

Therefore, an embodiment of the present disclosure provides a method of using IPF based on the TMRL mode. IPF is used based on the TMRL mode, that is, IPF is performed on a selected angular mode, in other words, the final prediction result of the current block is obtained by weighting a result obtained by performing prediction on the current block according to a selected reference line and the angular mode and a result obtained by performing prediction on the current block according to another reference line and the angular mode. The prediction results obtained using different reference lines are fused, so that the accuracy of prediction can be improved.

IPF is used based on the TMRL mode, so that no flag needs to be set to indicate whether IPF is used for the current block, and the encoder and the decoder can perform determination according to agreed conditions.

In an embodiment of the present disclosure, IPF can be used together with the TMRL mode. That is, in a case where an extended reference line and an angular mode in the TMRL mode candidate list is selected for the current block and none of the restriction condition(s) is satisfied, the first prediction result is calculated by performing prediction on the current block according to the extended reference line and the angular mode, the second prediction result is calculated by performing prediction on the current block according to another reference line and the angular mode, and the weighted sum of the first prediction result and the second prediction result is taken as the final prediction result of the current block, where the another reference line is a reference line with an index of 0 or a neighbouring line of the extended reference line.

In the embodiment, the method in the above embodiments can be used to construct the TMRL mode candidate list and to perform encoding and decoding. The difference is that in the embodiment, for generating the prediction value of the current block, a prediction value generated according to a selected angular mode and a selected reference line and a prediction value generated according to the selected angular mode and another reference line is weighted to obtain the final prediction value of the current block.

In the embodiment, there is limitation on IPF based on the TMRL mode. For example, IPF is only performed when a selected reference line is close to the current block. Specifically, fusion is allowed only when the reference line is reference line 1; or reference line 1 or 3; or reference line 1, 3, or 5; or reference line 1, 3, 5, or 7; or reference line 1, 3, 5, 7, or 12. Additionally, the use of IPF may also be restricted when certain angular modes are used for the current block, for example, IPF is not allowed when an angle of an angular mode is a horizontal angle, a vertical angle, −45°, 45°, or 135°. Furthermore, if the size of the current block is less than or equal to a certain value, IPF may also be disallowed as smaller blocks typically contain more texture.

For IPF on the basis of the TMRL mode, a flag can be added to syntax elements of the TMRL mode to indicate whether IPF is used or not.

Figure 13:
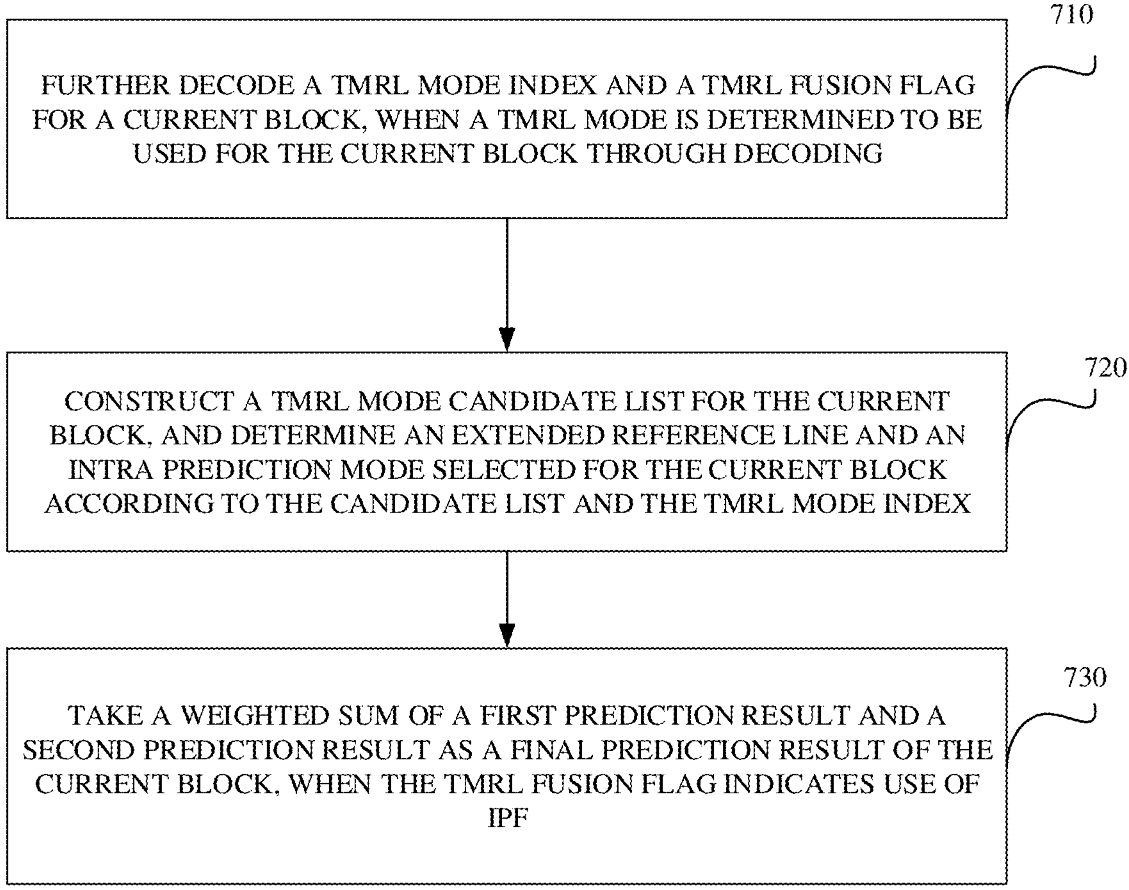
FIG. 13 is a flow chart of a video decoding method according to another embodiment of the present disclosure.

An embodiment of the present disclosure further provides a video decoding method. The method is applied to a decoder, and includes the following as illustrated in FIG. 13.

Step 710, a TMRL mode index and a TMRL fusion flag for a current block are further decoded, when a TMRL mode is determined to be used for the current block through decoding.

Step 720, a TMRL mode candidate list for the current block is constructed, and an extended reference line and an intra prediction mode selected for the current block are determined according to the candidate list and the TMRL mode index. In this step, the method in the above embodiments can be used to construct the candidate list, and determine the extended reference line and the intra prediction mode selected for the current block.

Step 730, a weighted sum of a first prediction result and a second prediction result is taken as a final prediction result of the current block when the TMRL fusion flag indicates use of IPF. In this step, the weighted sum of the first prediction result and the second prediction result can be obtained through formula 1 and formula 2.

The first prediction result is obtained by performing prediction on the current block according to the extended reference line and the intra prediction mode, the second prediction result is obtained by performing prediction on the current block according to another reference line and the intra prediction mode, and the intra prediction mode is an angular mode. Weighting the two prediction results can be performed through the formula in the above embodiments.

In the embodiment, when the TMRL fusion flag indicates no use of IPF, the final prediction result of the current is obtained by performing prediction on the current block according to the extended reference line and the intra prediction mode.

In the embodiment, on the basis of the TMRL mode, the TMRL fusion flag is set to indicate the use of IPF. At the encoding end, the TMRL fusion flag can be encoded according to whether a restriction condition(s) the same as or similar to that in the above embodiments is satisfied. If IPF is determined to be used, the value of the TMRL fusion flag is set to 1. If IPF is determined not to be used, the value of the TMRL fusion flag is set to 0. At the decoding end, the decoding end has no need to evaluate these restriction conditions again, and can determine, according to the TMRM fusion flag, whether IPF is performed on an angular mode selected in case of using the TMRL mode. This approach simplifies the processing at the decoding end and enhances the flexibility of setting the use condition for IPF. Furthermore, using IPF on the basis of the TMRL mode can improve the accuracy of prediction and enhance the performance of video coding.

In an example of the embodiment, the another reference line is a reference line adjacent to the extended reference line and located at an inner side of the extended reference line, or a reference line adjacent to the extended reference line and located at an outer side of the extended reference line, or a reference line with an index of 0. The inner side refers to a side close to the current block, and the outer side refers to a side away from the current block.

In an example of the embodiment, a condition for decoding the TMRL fusion flag can be added. That is, further decoding the TMRL mode index and the TMRL fusion flag for the current block includes the following. Whether a size of the current block satisfies a set condition is determined after decoding the TMRL mode index for the current block, the TMRL fusion flag for the current block is decoded when the set condition is satisfied, and decoding of the TMRL fusion flag for the current block is skipped when the set condition is not satisfied.

The set condition includes any one or more of following conditions: a width of the current block is greater than a set value; a height of the current block is greater than a set value; a product of the width and the height of the current block is greater than a set value; or a current frame to which the current block belongs is not an inter frame, that is, a fusion mode is not allowed for intra blocks in B-frames and P-frames.

Because smaller blocks typically contain more texture, the improvement achieved using IPF is limited. Therefore, in the embodiment, the condition that the size of the current block is greater than a set value is taken as a condition for determining the decoding of the TMRL fusion flag. When the size of the current block is not greater than the set value, the TMRL fusion flag may not be encoded or decoded to enhance coding efficiency.

In an example of the present disclosure, the TMRL mode candidate list for the current block is constructed as follows. N×M combinations of extended reference lines and intra prediction modes are constructed according to N extended reference lines and M intra prediction modes for the current block, where N≥1, M≥1, and N×M≥2. Prediction on a template region for the current block is performed according to each of the N×M combinations, and differences between a reconstructed value of the template region and prediction values obtained by prediction are calculated. K combinations corresponding to the differences are filled into the TMRL mode candidate list for the current block in ascending order of the differences, where 1≤K≤N×M. The M intra prediction modes are selected from angular modes other than angular modes with angles of −45°, 0°, 45°, 90°, or 135°.

In the embodiment, to construct the TMRL mode candidate list, the M intra prediction modes for participating in combination are limited to other angular modes other than certain angular modes with specific angles. This approach facilitates the combination of the TMRL mode and IPF, so as to improve accuracy of prediction.

An embodiment of the disclosure further provides a video decoding method. For parsing CU-level syntax elements, it is necessary to additionally decode tmrl_fusion_flag, which is the TMRL fusion flag.

An example is illustrated in the following table.

| | Descriptor |
|---|---|
| coding_unit(x0, y0, cbWidth, cbHeight, cqtDepth, treeType, modeType) { | |
| ... ... // Omit some previous syntax elements | |
| if( sps_mrl_enabled_flag && (y0 % CtbSizeY) > 0) | |
| cu_tmrl_flag | ae(v) |
| if(cu_tmrl_flag ){ | |
| tmrl_idx | ae(v) |
| tmrl_fusion_flag | ae(v) |
| } | |
| ... ...// Omit some subsequent syntax elements | |

sps_mrl_enabled_flag in the above table is a sequence flag, where the value of sps_mrl_enabled_flag being 1 indicates that MRL can be used for the current sequence, and the value of sps_mrl_enabled_flag being 0 indicates that MRL is not used for the current sequence. (y0% CtbSizeY) >0 indicates that the CU is not located in a first line of the CTU. The value of tmrl_fusion_flag being 1 indicates that a fusion mode will be used for subsequent TMRL modes, otherwise, no fusion mode will be used.

In another embodiment, whether to decode tmrl_fusion_flag may further depend on the size of the current coding block. For example, as illustrated in the following table, when the coding block satisfies cbWidth>N and cbHeight>M, tmrl_fusion_flag is decoded.

| | Descriptor |
|---|---|
| coding_unit(x0, y0, cb Width, cbHeight, cqtDepth, treeType, modeType) { | |
| ... ... // Omit some previous syntax elements | |
| if( sps_mrl_enabled_flag && (y0 % CtbSizeY) > 0) | |

-continued

| | Descriptor |
|---|---|
| cu_tmrl_flag | ae(v) |
| if(cu_tmrl_flag ){ | |
| tmrl_idx | ae(v) |
| if(cbWidth > N && cbHeight > M) | |
| tmrl_fusion_flag | ae(v) |
| } | |
| ... ...// Omit some subsequent syntax elements | |

In another embodiment, for example, as illustrated in the following table, when the coding block satisfies cbWidth*cbHeight>L, tmrl_fusion_flag is decoded.

| | Descriptor |
|---|---|
| coding_unit (x0, y0, cbWidth, cbHeight, cqtDepth, treeType, modeType) { | |
| ... ... // Omit some previous syntax elements | |
| if( sps_mrl_enabled_flag && (y0 % CtbSizeY) >0) ) | |
| cu_tmrl_flag | ae(v) |
| if(cu_tmrl_flag ){ | |
| tmrl_idx | ae(v) |
| if(cbWidth *cbHeight >L) | |
| tmrl_fusion_flag | ae(v) |
| } | |
| ... ...// Omit some subsequent syntax elements | |

M, N, and L in the table are set dimension values and are all positive integers. M may be equal to N.

In the embodiment, for constructing the TMRL mode candidate list according to template-based sorting, an exhaustive traversal of N×M combinations of N available reference lines and M available intra prediction modes is performed. Prediction values for the template region are generated, and differences between the prediction values and a reconstructed value of the template region are calculated. The top K combinations are selected in ascending order of the differences, forming the candidate list of {reference row, prediction mode} combinations. The difference may be, for example, the sum of absolute differences (SAD). The embodiment may limit the use of IPF to only certain modes. For constructing the candidate list, one or more of the following intra prediction modes may be excluded: the planar mode, the DC mode, an angular mode with a horizontal angle, an angular mode with a vertical angle, an angular mode with a −45-degree angle, an angular mode with a 45-degree angle, and an angular mode with a 135-degree angle.

The fusion during the prediction phase needs to be based on the value of tmrl_fusion_flag. When the value of tmrl_fusion_flag is 1, the selected intra prediction mode and the selected reference line generate prediction signal $p_a$, the selected intra prediction mode and reference line 0 generate prediction signal $p_b$, and the fusion of $p_a$ and $p_b$ generates the final prediction signal. Otherwise, $p_a$ is directly used as the final prediction signal.

Figure 18:
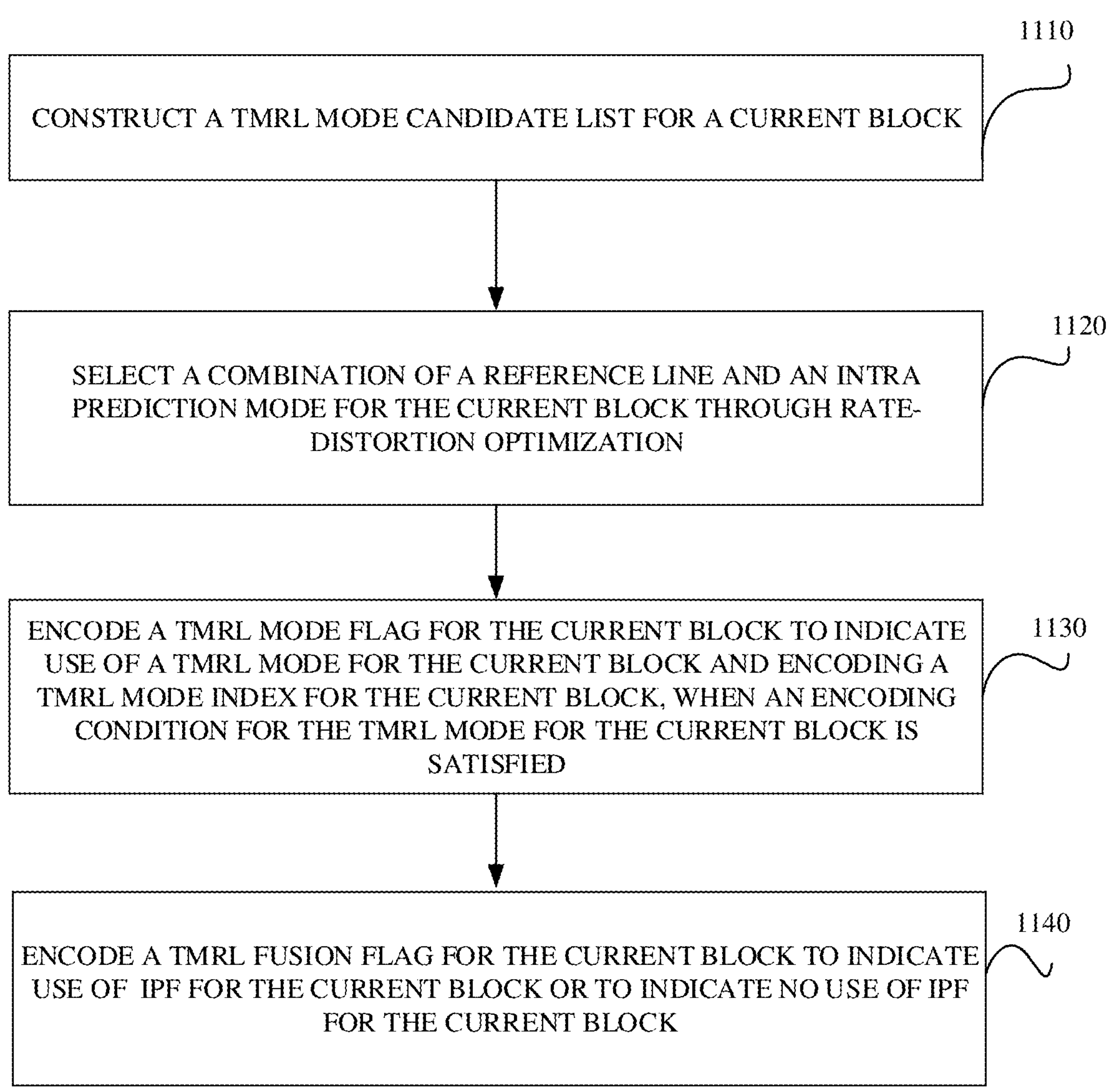
FIG. 18 is a flow chart of a video encoding method according to another embodiment of the present disclosure.

Correspondingly, embodiments of the present disclosure further provide a video encoding method. The method is applied to an encoder and includes the following as illustrated in FIG. 18.

Step 1110, a TMRL mode candidate list for a current block is constructed, where the candidate list is filled with combinations of candidate extended reference lines and candidate intra prediction modes for the current block.

Step 1120, a combination of a reference line and an intra prediction mode for the current block is selected through rate-distortion optimization.

Step 1130, when an encoding condition for the TMRL mode for the current block is satisfied, a TMRL mode flag for the current block is encoded to indicate use of a TMRL mode for the current block and a TMRL mode index for the current block is encoded to indicate a position of the selected combination in the candidate list.

Step 1140, a TMRL fusion flag for the current block is encoded to indicate use of IPF for the current block or to indicate no use of IPF for the current block. The encoding condition at least includes that: the selected combination is in the candidate list.

The part of the video encoding method in the embodiment that is unrelated to fusion can be the same as those in the previously described embodiment of the video encoding method using TMRL without fusion. For example, the setting of the encoding condition in step 1130 can be the same, and so on.

In an example of the embodiment, encoding the TMRL fusion flag for the current block to indicate the use of IPF for the current block or no use of IPF for the current block includes the following. In a case where a combination containing an angular mode in the candidate list is selected for the current block, the TMRL fusion flag for the current block is encoded to indicate no use of the IPF when at least one of set restriction condition(s) is satisfied, and the TMRL fusion flag for the current block is encoded to indicate the use of IPF when none of the set restriction condition(s) is satisfied.

The set restriction condition(s) further includes any one or more of following restriction conditions: a TIMD fusion mode is selected for the current block; a DIMD mode is selected for the current block; an index of the reference line selected for the current block is greater than or equal to K, where K is an integer greater than or equal to 3; a width of the current block is less than or equal to a set value; a height of the current block is less than or equal to a set value; a product of the width and the height of the current block is less than or equal to a set value; an ISP mode is used for the current block; an angle of the angular mode selected for the current block equals to −45°, 0°, 45°, 90°, or 135°, or the angular mode selected for the current block is an angular mode with an integer slope; a current frame to which the current block belongs is an inter frame; or a current picture to which the current block belongs is a chroma picture.

In an example of the embodiment, for constructing the TMRL mode candidate list for the current block, intra prediction modes for participating in combination do not include angular modes with angles of −45°, 0°, 45°, 90°, or 135°.

At the encoder side, when a combination in the TMRL mode candidate list is selected for the current block and IPF is used for the current block, prediction on the current block is performed based on this combination using IPF. The prediction results obtained based on the combination and obtained through an angular mode in the combination and another reference line are weighted to obtain the prediction value of the current block, so that the reconstructed value of the current block can be determined.

In order to use IPF based on TMRL, a fusion prediction mode, obtained from a combination of an extended reference line and an angular mode, can also be included as a combination in the candidate list to construct the TMRL mode candidate list.

Figure 14:
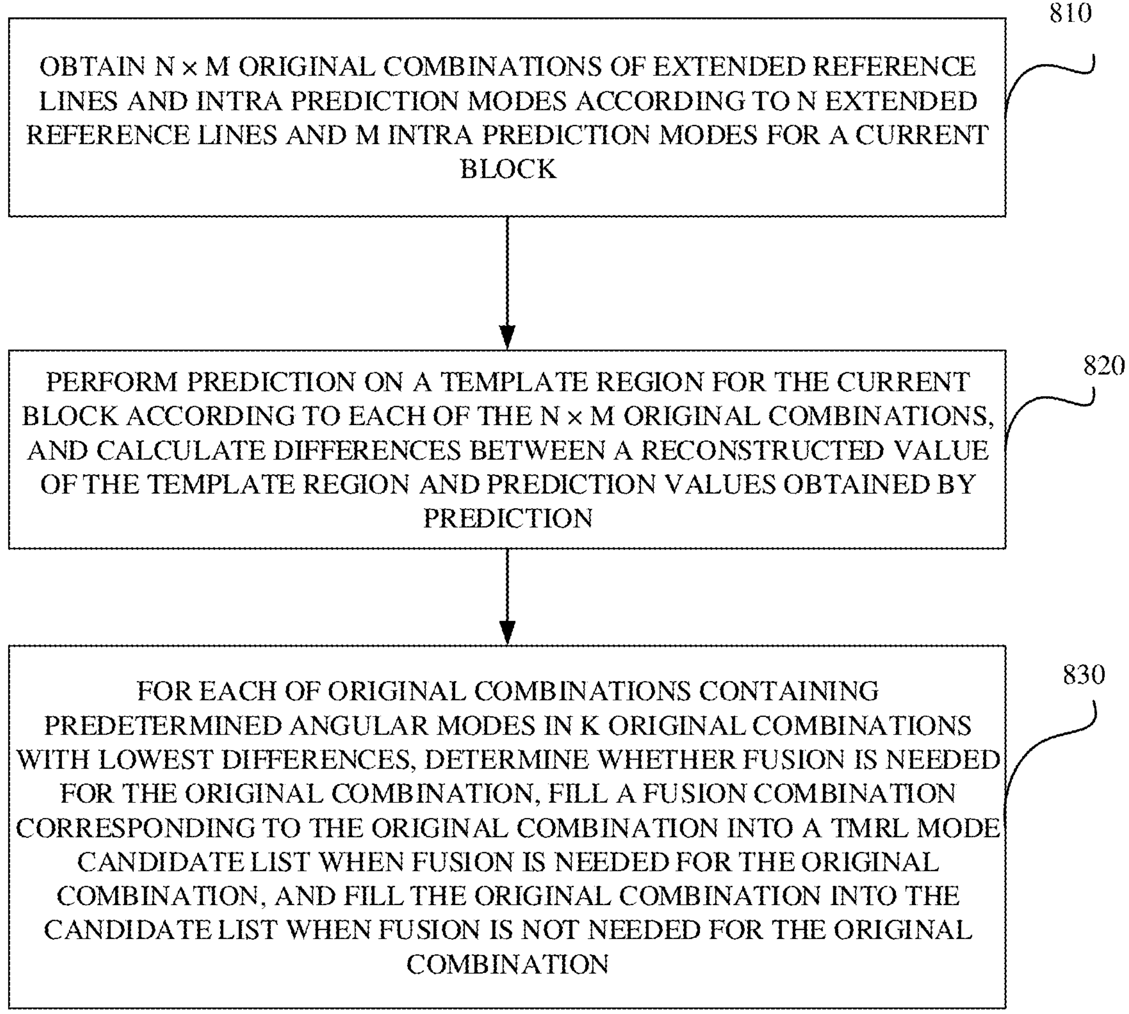
FIGS. 14-16 are flow charts illustrating methods for constructing a template-based MRL (TMRL) mode candidate list according to three embodiments of the present disclosure.

An embodiment of the present disclosure provides a method for constructing an MRL mode candidate list. The method can be applied to an encoder, and can also be applied to a decoder. As illustrated in FIG. 14, the method includes the following.

Step 810, N×M original combinations of extended reference lines and angular modes are obtained according to N extended reference lines and M intra prediction modes for a current block.

Step 820, prediction on a template region for the current block is performed according to each of the N×M original combinations, and differences between a reconstructed value of the template region and prediction values obtained by prediction are calculated.

Step 830, for each of original combinations containing predetermined angular modes in K original combinations with lowest differences, whether fusion is needed for the original combination is determined, a fusion combination corresponding to the original combination is filled into a TMRL mode candidate list when fusion is needed for the original combination, and the original combination is filled into the candidate list when fusion is not needed for the original combination, where K, N, and M are set positive integers, and 1≤K≤N×M.

In the embodiment, for each of the original combinations containing the predetermined angular modes in the K original combinations with lowest differences, determining whether fusion is needed for the original combination and filling the fusion combination corresponding to the original combination into the TMRL mode candidate list when fusion is needed for the original combination includes the following. Prediction on the template region for the current block is performed according to the fusion combination corresponding to the original combination, a difference between a reconstructed value of the template region and a prediction value obtained by prediction is calculated, and it is determined that fusion is needed when a difference corresponding to the original combination is greater than a difference corresponding to the fusion combination, and that fusion is not needed when the difference corresponding to the original combination is less than or equal to the difference corresponding to the fusion combination. For performing prediction on the current block according to the fusion combination, a weighted sum of a first prediction result and a second prediction result is taken as a prediction value of the current block, where the first prediction result is obtained by performing prediction on the current block according to an extended reference line and an angular mode in the original combination, the second prediction result is obtained by performing prediction on the current block according to a second reference line and the angular mode in the original combination, and the second reference line is a neighbouring line of the first reference line or a reference line with an index of 0. The predetermined angular modes include all angular modes, or include angular modes other than angular modes with an integer slope.

In the embodiment, the weighted sum of the first prediction result and the second prediction result can be calculated according to formula 1 or formula 2.

In the embodiment, K combinations are selected to be included in the candidate list through sorting non-fusion modes. Then, whether fusion is needed for a reference line in each of the K combinations is further determined. The determination manner is based on a difference between a prediction signal generated in the case of a fusion mode for the reference line in the currently selected combination and the reconstructed signal and a difference between a prediction signal generated in the case of a non-fusion mode for the reference line in the currently selected combination and the reconstructed signal. If the difference in the case of the fusion mode is smaller, fusion is needed for the combination, otherwise, fusion is not needed for the combination. In the embodiment, it only needs to predict the template region according to 5×M+K combinations and calculate differences for 5×M+K combinations.

Figure 15:
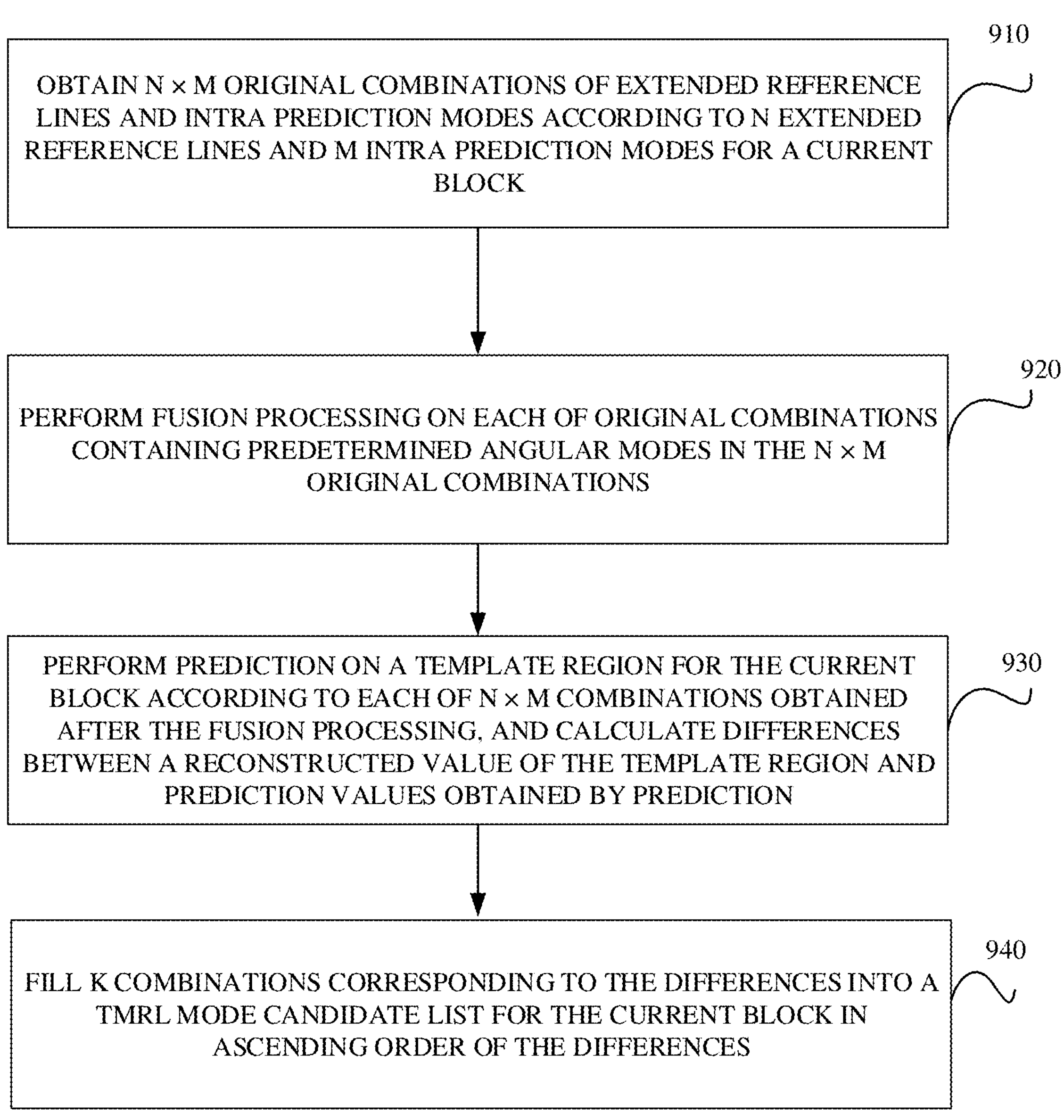

Another embodiment of the present disclosure provides a method for constructing an MRL mode candidate list. The method can be applied to an encoder, and can also be applied to a decoder. As illustrated in FIG. 15, the method includes the following.

Step 910, N×M original combinations of extended reference lines and intra prediction modes are obtained according to N extended reference lines and M intra prediction modes for a current block.

Step 920, fusion processing is performed on the N×M original combinations, where the fusion processing includes: for each of original combinations containing predetermined angular modes, replacing the original combination with a corresponding fusion combination when a set condition is satisfied.

Step 930, prediction on a template region for the current block is performed according to each of N×M combinations obtained after the fusion processing, and differences between a reconstructed value of the template region and prediction values obtained by prediction are calculated.

Step 940, K combinations corresponding to the differences are filled into a TMRL mode candidate list for the current block in ascending order of the differences, where K, N, and M are set positive integers, and 1≤K≤N×M. For each original combination, performing prediction on the current block according to a fusion combination corresponding to the original combination includes taking a weighted sum of a first prediction result and a second prediction result as a prediction value of the current block, where the first prediction result is obtained by performing prediction on the current block according to an extended reference line and an angular mode in the original combination, the second prediction result is obtained by performing prediction on the current block according to a second reference line and the angular mode in the original combination, and the second reference line is a neighboring line of the first reference line or a reference line with an index of 0.

In an example of the embodiment, the set condition includes any one or more of conditions as follows: a size of the current block is greater than N×M, where N and M are set positive integers; and an intra prediction mode selected for the current block is an angular mode with a non-integer slope, where the predetermined angular modes include all angular modes, or include angular modes other than angular modes with an integer slope.

In the embodiment, the weighted sum of the first prediction result and the second prediction result can be calculated according to formula 1 or formula 2.

In the embodiment, it is not needed to sort fusion modes for reference lines and non-fusion modes for reference lines through sorting difference costs for the template. When one or more of the following conditions are satisfied, fusion modes for reference lines are used to participate in sorting for the template and generate a list of combinations {reference line, prediction mode}, otherwise, no fusion mode is used. The following conditions include that: the size of the current block is larger than N×M; the current intra prediction mode is not a planar mode, a DC mode, an angular mode with a horizontal angle, an angular mode with a vertical angle, an angular mode with a −45-degree angle, an angular mode with a 45-degree angle, or an angular mode with a 135-degree angle mode.

In the prediction phase, in the case where TMRL is used for the current block, a selected reference line and prediction mode are determined according to tmrl_idex obtained through decoding and a candidate list generated according to template-based sorting, and whether to use a neighbouring reference line to generate a fusion prediction result is determined according to the same conditions. That is, IPF is performed on a selected angular mode when one or more of the following conditions are satisfied: the size of the current block is larger than N×M; the current intra prediction mode is not the planar mode, the DC mode, the angular mode with a horizontal angle, the angular mode with a vertical angle, the angular mode with a −45-degree angle, the angular mode with a 45-degree angle, or the angular mode with a 135-degree angle mode.

Figure 16:
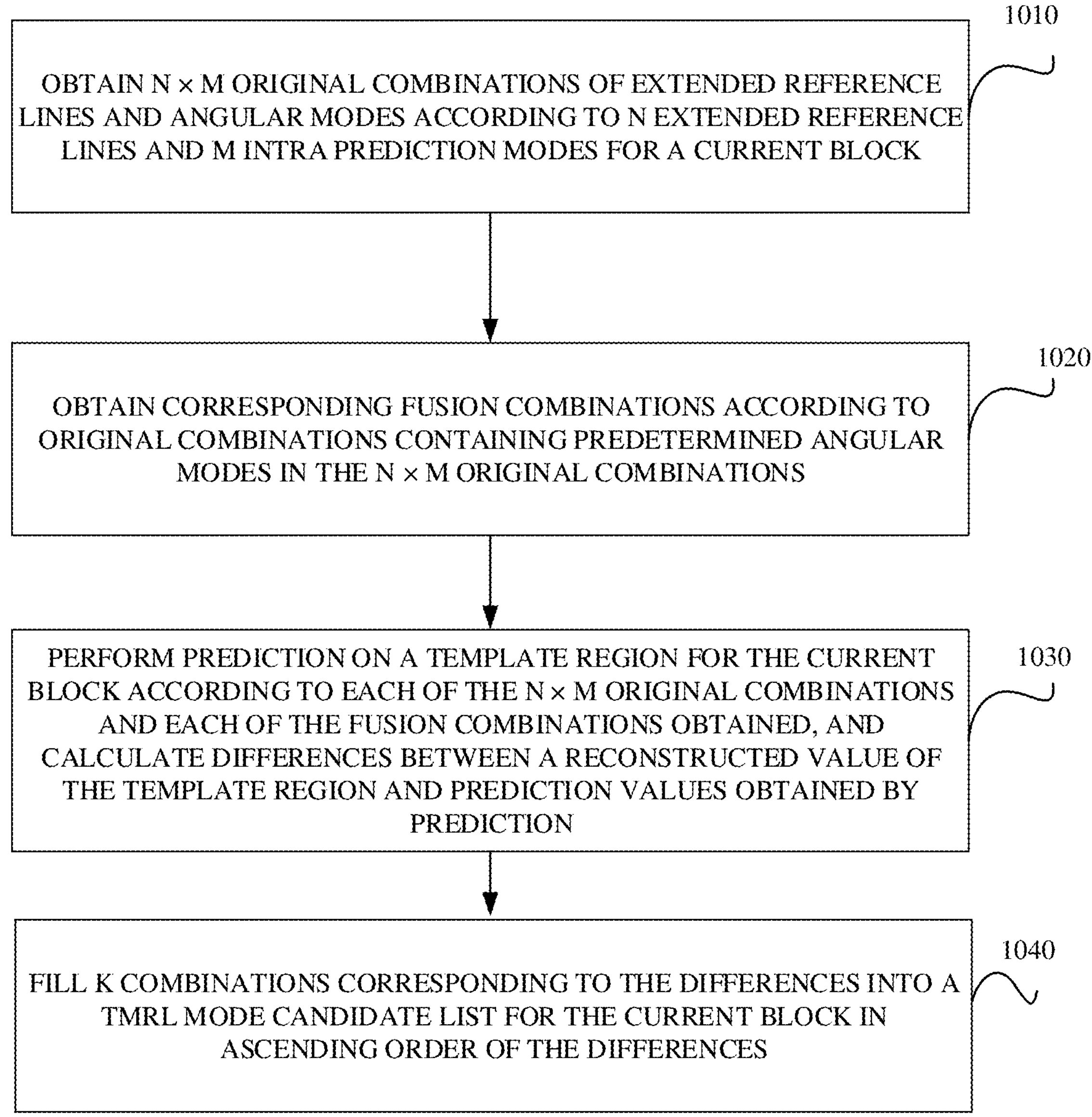

Another embodiment of the present disclosure provides a method for constructing an MRL mode candidate lists. The method can be applied to an encoder, and can also be applied to a decoder. As illustrated in FIG. 16, the method includes the following.

Step 1010, N×M original combinations of extended reference lines and angular modes are obtained according to N extended reference lines and M intra prediction modes for a current block.

Step 1020, corresponding fusion combinations are obtained according to original combinations containing predetermined angular modes in the N×M original combinations.

Step 1030, prediction on a template region for the current block is performed according to each of the N×M original combinations and each of the fusion combinations obtained, and differences between a reconstructed value of the template region and prediction values obtained by prediction are calculated.

Step 1040, K combinations corresponding to the differences are filled into a TMRL mode candidate list for the current block in ascending order of the differences, where K, N, and M are set positive integers, and 1≤K≤N×M.

In the embodiment, obtaining the corresponding fusion combinations according to the original combinations containing the predetermined angular modes in the N×M original combinations include the following. For each one of the original combinations containing the predetermined angular modes, a fusion combination is obtained according to the original combination. For performing prediction on the current block according to the fusion combination, a weighted sum of a first prediction result and a second prediction result is taken as a prediction value of the current block, where the first prediction result is obtained by performing prediction on the current block according to an extended reference line and an angular mode in the original combination, the second prediction result is obtained by performing prediction on the current block according to a second reference line and the angular mode in the original combination, and the second reference line is a neighbouring line of the first reference line or a reference line with an index of 0. The predetermined angular modes include all angular modes, or include angular modes other than angular modes with an integer slope.

In the embodiment, when the intra prediction modes for participating in combination are all angular modes, it needs to predict the template region according to 5×M×2 combinations and calculate differences for the 5×M×2 combinations.

In the embodiment, the weighted sum of the first prediction result and the second prediction result can be calculated according to formula 1 or formula 2.

In the above embodiments of the present disclosure, taking reference line with indexes of {1, 3, 5, 7, 12} as reference lines for participating in combination as an example, a fusion combination corresponding to an original combination may be as follows, for example. When the original combination consists of a reference line with an index of 1 and an angular mode, a corresponding fusion combination may be a combination of reference lines with indexes of 1 and 2 and the angular mode. For performing prediction on the current block based on the fusion combination, a prediction result obtained according to the reference line with an index of 1 and the angular mode and a prediction result obtained according to the reference line with an index of 2 and the angular mode are weighted together to obtain the final prediction result of the current block. In another example, if a neighbouring reference line located at the inner side is selected as the second reference line, the corresponding fusion combination may be a combination of reference lines with indexes of 0 and 1 and the angular mode.

In the case where the method for constructing a TMRL mode candidate list in the above embodiments is applied for video encoding and video decoding, if a fusion combination in the candidate list is selected for the current block, fusion prediction is performed on the current block according to a prediction manner of the fusion combination. If an original combination in the candidate list is selected for the current block, prediction is performed on the current block according to a prediction manner of the original combination.

An embodiment of the present disclosure further provides a bitstream, where the bitstream is generated by the video encoding method of any embodiment of the present disclosure.

Figure 17:
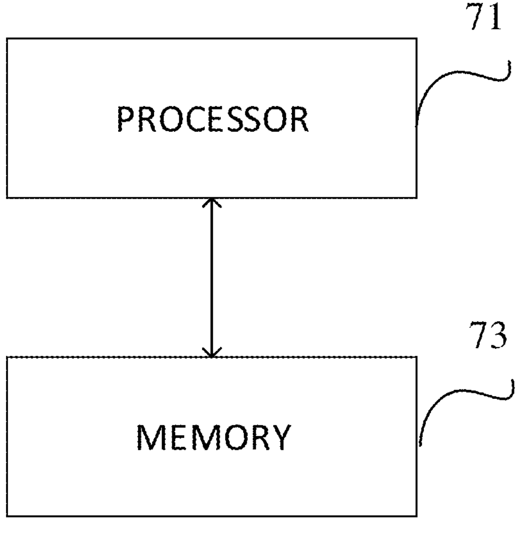
FIG. 17 is a schematic diagram of an apparatus for constructing a TMRL candidate list according to an embodiment of the present disclosure.

An embodiment of the present disclosure further provides an apparatus for constructing an MRL mode candidate list. As illustrated in FIG. 17, the apparatus includes a processor 71 and a memory 73 storing a computer program, where the processor 71, when executing the computer program, can implement the method for constructing an MRL mode candidate list as described in any embodiment of the present disclosure.

An embodiment of the present disclosure further provides an IPF apparatus. The apparatus includes a processor and a memory storing a computer program, where the processor, when executing the computer program, can implement the IPF method of any embodiment of the present disclosure.

An embodiment of the present disclosure further provides a video decoding apparatus. The apparatus includes a processor and a memory storing a computer program, where the processor, when executing the computer program, can implement the video decoding method as described in any embodiment of the present disclosure.

An embodiment of the present disclosure further provides a video encoding apparatus. The apparatus includes a processor and a memory storing a computer program, where the processor, when executing the computer program, can implement the video encoding method as described in any embodiment of the present disclosure.

An embodiment of the present disclosure further provides a video encoding and decoding system, which includes the video encoding apparatus described in any embodiment of the present disclosure and the video decoding apparatus described in any embodiment of the present disclosure.

An embodiment of the present disclosure further provides a non-transitory computer-readable storage medium, where the computer-readable storage medium stores a computer program. The computer program, when executed by a processor, implements an IPF method as described in any embodiment of the present disclosure, a method for constructing an MRL mode candidate list as described in any embodiment of the present disclosure, or implements a video decoding method as described in any embodiment of the present disclosure, or implements a video encoding method as described in any embodiment of the present disclosure.

The processor of the above-mentioned embodiments of the present disclosure may be a general-purpose processor, including a central processing unit (CPU), a network processor (NP for short), a microprocessor, etc., or other conventional processors, etc. The processor may also be a digital signal processor (DSP), an application-specific integrated circuit (ASIC), a field programmable gate array (FPGA), discrete logic or other programmable logic devices, discrete gate or transistor logic devices, discrete hardware components, or other equivalent integrated or discrete logic circuits, or a combination of the above devices. That is, the processor of the above-mentioned embodiments may be any processing device or device combination that can implement various methods, steps, and logic block diagrams disclosed in the embodiments of the present disclosure. If the embodiments of the present disclosure are partially implemented in software, the instructions for the software may be stored in a suitable non-volatile computer-readable storage medium, and one or more processors in hardware may be used to execute the instructions to implement the methods of the embodiments of the present disclosure. The term "processor" used herein may refer to the above-mentioned structure or any other structure suitable for implementing the technology described herein.

In one or more of the above exemplary embodiments, the functions described may be implemented in hardware, software, firmware, or any combination thereof. If implemented in software, the functions as one or more instructions or codes may be stored in a computer-readable medium or transmitted via a computer-readable medium, and executed by a hardware-based processing unit. The computer-readable medium may include a tangible medium such as a data storage medium, or any communication medium that facilitates a computer program being transmitted from one place to another according to a communication protocol for example. In this way, the computer-readable medium may be generally a non-transitory tangible computer-readable storage medium or a communication medium such as a signal or carrier wave. A data storage medium may be any available medium that can be accessed by one or more computers or one or more processors to retrieve instructions, codes, and/or data structures for implementing the technology described in the present disclosure. A computer program product may include a computer-readable medium.

By way of example and not limitation, such computer-readable storage media may include a random access memory (RAM), a read only memory (ROM), an electrically erasable programmable read only memory (EEPROM), a compact disk ROM (CD-ROM) or other optical disk storage devices, magnetic disk storage devices or other magnetic storage devices, a flash memory, or any other medium that can be used to store desired program codes in the form of instructions or data structures and can be accessed by a computer. Moreover, any connection may also be referred to as a computer-readable medium. For example, if instructions are transmitted from a website, server, or other remote source using a coaxial cable, a fiber optic cable, a twisted pair, a digital subscriber line (DSL), or wireless technology such as infrared, radio, and microwaves, then the coaxial cable, the fiber optic cable, the twisted pair, the DSL, or the wireless technology such as infrared, radio, and microwaves are included in the definition of medium. However, it may be understood that the computer-readable storage medium and data storage medium do not include connection, carrier, signal, or other transitory media, but are directed to a non-transitory tangible storage medium. As used herein, disks and optical disks include CDs, laser optical disks, optical disks, digital versatile disks (DVDs), floppy disks, or Blu-ray disks, etc., where disks typically reproduce data magnetically, and optical disks use lasers to reproduce data optically. Combinations of the above shall also be included within the scope of the computer-readable medium.

In some aspects, the functionality described herein may be provided within dedicated hardware and/or software modules configured for encoding and decoding, or incorporated into a combined codec. Also, the techniques may be fully implemented in one or more circuits or logic elements.

The technical solutions of the embodiments of the present disclosure can be implemented in a wide variety of devices or equipment, including wireless mobile phones, integrated circuits (ICs) or a group of ICs (e.g., chipsets). Various components, modules, or units are described in the embodiments of the present disclosure to emphasize the functional aspects of the devices configured to perform the described techniques, but they do not necessarily need to be implemented by different hardware units. Instead, as described above, in the encoder and decoder, various units can be combined in a hardware unit or provided by a collection of interoperable hardware units (including one or more processors as described above) in combination with suitable software and/or firmware.

The following numbered clauses, describing aspects of the disclosure, are part of the description.

1. An intra prediction fusion (IPF) method, comprising:
   determining whether a restriction condition for use of IPF for a current block is satisfied, when an intra prediction mode selected for the current block comprises an angular mode; and restricting the use of IPF for intra prediction on the current block, when at least one of the restriction condition is satisfied.

2. The method of clause 1, wherein the restriction condition comprises a mode quantity restriction condition: the use of IPF leading to a need to fuse more than N intra prediction modes for prediction on the current block, wherein N is an integer greater than or equal to 3.

3. The method of clause 2, wherein under a condition of N=3, determining whether the restriction condition for the use of IPF for the current block is satisfied when the intra prediction mode selected for the current block comprises an angular mode, and restricting the use of IPF for intra prediction on the current block when at least one of the restriction condition is satisfied, comprise:

in a case where a template-based intra mode derivation (TIMD) fusion mode is selected for the current block and two angular modes satisfying a use condition for IPF are used for TIMD fusion, determining that the mode quantity restriction condition is satisfied, and allowing to perform IPF for merely one of the two angular modes to perform intra prediction on the current block; and in a case where the TIMD fusion mode is selected for the current block and merely one of two intra prediction modes used for TIMD fusion is an angular mode satisfying the use condition for IPF, determining that the mode quantity restriction condition is not satisfied, and allowing to perform IPF for the angular mode to perform intra prediction on the current block.

4. The method of clause 1, wherein the restriction condition comprises a mode quantity restriction condition: the use of IPF leading to a need to fuse more than M angular modes for prediction on the current block, wherein M is an integer greater than or equal to 2.

5. The method of clause 4, wherein under a condition of M=3, determining whether the restriction condition for the use of IPF for the current block is satisfied when the intra prediction mode selected for the current block comprises an angular mode, and restricting the use of IPF for intra prediction on the current block when at least one of the restriction condition is satisfied, comprise:

in a case where a TIMD fusion mode is selected for the current block and two angular modes satisfying a use condition for IPF are used for TIMD fusion, determining that the mode quantity restriction condition is satisfied, and allowing to perform IPF for merely one of the two angular modes to perform intra prediction on the current block; and in a case where the TIMD fusion mode is selected for the current block and merely one of two intra prediction modes used for TIMD fusion is an angular mode satisfying the use condition for IPF, determining that the mode quantity restriction condition is not satisfied, and allowing to perform IPF for the angular mode to perform intra prediction on the current block.

6. The method of clause 3 or 5, wherein allowing to perform IPF for merely one of the two angular modes comprises: allowing to perform IPF for merely an angular mode with a lowest cost or a second lowest cost in the two angular modes.

7. The method of clause 4, wherein under a condition of M=3, determining whether the restriction condition for the use of IPF for the current block is satisfied when the intra prediction mode selected for the current block comprises an angular mode, and restricting the use of IPF for intra prediction on the current block when at least one of the restriction condition is satisfied, comprise:

in a case where a decoder-side intra mode derivation (DIMD) fusion mode is selected for the current block and two angular modes satisfying a use condition for IPF are used for DIMD fusion, determining that the mode quantity restriction condition is satisfied, and allowing to perform IPF for merely one of the two angular modes to perform intra prediction on the current block; and in a case where the DIMD fusion mode is selected for the current block and merely one of the two angular modes used for DIMD fusion is an angular mode satisfying the use condition for IPF, determining that the mode quantity restriction condition is not satisfied, and allowing to perform IPF for the angular mode satisfying the use condition for IPF to perform intra prediction on the current block.

8. The method of clause 4, wherein under a condition of M=2, determining whether the restriction condition for the use of IPF for the current block is satisfied when the intra prediction mode selected for the current block comprises an angular mode, and restricting the use of IPF for intra prediction on the current block when at least one of the restriction condition is satisfied, comprise:

in a case where a TIMD fusion mode is selected for the current block and two angular modes are used for TIMD fusion, determining that the mode quantity restriction condition is satisfied, and disallowing to perform IPF for intra prediction on the current block; and in a case where the TIMD fusion mode is selected for the current block and merely one of two intra prediction modes used for TIMD fusion is an angular mode satisfying a use condition for IPF, determining that the mode quantity restriction condition is not satisfied, and allowing to perform IPF for the angular mode satisfying the use condition for IPF to perform intra prediction on the current block.

9. The method of clause 3, 5, 7 or 8, wherein the angular mode satisfying the use condition for IPF is an angular mode with a non-integer slope.

10. The method of clause 3, 5, 7 or 8, wherein allowing to perform IPF for an angular mode to perform intra prediction on the current block, comprises: taking a weighted sum of two or more prediction results as a final prediction result of the current block, wherein the two or more prediction results comprise: a prediction result obtained by performing prediction on the current block according to a first reference line selected for the current block and the angular mode, and a prediction result obtained by performing prediction on the current block according to a second reference line different from the first reference line and the angular mode.

11. The method of clause 1, wherein, the restriction condition comprises any one or more of:

restriction condition 1: a TIMD fusion mode is selected for the current block;

restriction condition 2: a DIMD fusion mode is selected for the current block;

restriction condition 3: multiple reference line (MRL) is used for the current block;

restriction condition 4: an index of a reference line selected for the current block is greater than or equal to K, wherein K is an integer greater than or equal to 3;

restriction condition 5: a width of the current block is less than or equal to a set value;

restriction condition 6: a height of the current block is less than or equal to a set value;

restriction condition 7: a product of the width and the height of the current block is less than or equal to a set value;

restriction condition 8: an intra sub-partitions (ISP) mode is used for the current block;

restriction condition 9: an angle of an angular mode selected for the current block is equal to −45°, 0°, 45°, 90°, or 135°, or an angular mode selected for the current block is an angular mode with an integer slope;

restriction condition 10: a current frame to which the current block belongs is an inter frame; and restriction condition 11: a current picture to which the current block belongs is not a luma picture;

wherein IPF is not allowed for intra prediction on the current block when at least one of the restriction conditions 1 to 11 is satisfied.

12. The method of clause 11, wherein, the restriction condition comprises the restriction condition 4, wherein K=3 or 5 or 7 or 12.

13. The method of clause 1, further comprising:

performing intra prediction on the current block using IPF when the restriction condition is not satisfied;

wherein performing intra prediction on the current block using IPF, comprises:

taking a weighted sum of a first prediction result and a second prediction result as a final prediction result of the current block when only one intra prediction mode is selected for the current block and the intra prediction mode is an angular mode, wherein the first prediction result is obtained by performing prediction on the current block according to a first reference line selected for the current block and a first angular mode selected for the current block, and the second prediction result is obtained by performing prediction on the current block according to a second reference line and the first angular mode, wherein the second reference line is a neighbouring line of the first reference line or a reference line with an index of 0.

14. The method of clause 1, further comprising:

performing intra prediction on the current block using IPF when the restriction condition is not satisfied;

wherein performing intra prediction on the current block using IPF, comprises:

taking a weighted sum of three or more prediction results as a final prediction result of the current block when the intra prediction mode selected for the current block is a fusion mode, wherein the three or more prediction results comprise: multiple prediction results obtained by performing prediction on the current block according to a first reference line selected for the current block and each intra prediction mode in the fusion mode, and one or more prediction results obtained by performing prediction on the current block according to a second reference line and one or more angular modes for which IPF is allowed in the fusion mode, wherein the second reference line is a neighbouring line of the first reference line or a reference line with an index of 0.

15. The method of clause 13 or 14, wherein the second reference line is adjacent to the first reference line and is closer to the current block than the first reference line, when an index of the first reference line is greater than or equal to K, wherein K is an integer greater than or equal to 1.

16. The method according to clause 13 or 14, wherein a weight assigned to the first prediction result is greater than a weight assigned to the second prediction result, to calculate the weighted sum of the first prediction result and the second prediction result.

17. The method according to clause 13, wherein the weighted sum of the first prediction result and the second prediction result is calculated according to a formula as follows:

$$p_{fusion} = (w_a p_a + w_b p_b) \gg \text{shift}$$

or $$p_{fusion} = (w_a p_a + w_b p_b + \text{offset}) \gg \text{shift}$$

wherein $p_a$ is the first prediction result, $p_b$ is the second prediction result, $p_{fusion}$ is the final prediction result of the current block, $w_a$ is a weighting factor for $p_a$, and $w_b$ is a weighting factor for $p_b$; and wherein $w_a+w_b=(1<<\text{shift})$, $\text{offset}=1<<(\text{shift}-1)$, $\text{shift}>=1$, shift and offset are set parameters.

18. The method of clause 13, wherein determining whether the restriction condition for the use of IPF for the current block is satisfied when the intra prediction mode selected for the current block comprises an angular mode, and performing intra prediction on the current block using IPF when the restriction condition is not satisfied, comprise:

in a case where an extended reference line and an angular mode in a template-based multiple reference line (TMRL) mode candidate list is selected for the current block and the restriction condition is not satisfied, calculating the first prediction result by performing prediction on the current block according to the extended reference line and the angular mode and calculating the second prediction result by performing prediction on the current block according to another reference line and the angular mode, and taking the weighted sum of the first prediction result and the second prediction result as the final prediction result of the current block, wherein the another reference line is a reference line with an index of 0 or a neighbouring line of the extended reference line.

19. A video decoding method, comprising:

determining a reference line and an intra prediction mode selected for a current block by decoding a bitstream;

obtaining a prediction value of the current block by performing prediction on the current block according to the intra prediction fusion (IPF) method of any one of clauses 1 to 18; and determining a reconstructed value of the current block according to the prediction value of the current block.

20. A video encoding method, comprising:

determining a reference line and an intra prediction mode selected for a current block through mode selection;

obtaining a prediction value of the current block by performing prediction on the current block according to the intra prediction fusion (IPF) method of any one of clauses 1 to 18; and determining a residual of the current block according to an original value of the current block and the prediction value of the current block.

21. A video decoding method, comprising:

further decoding a template-based multiple reference line (TMRL) mode index and a TMRL fusion flag for a current block, when a TMRL mode is determined to be used for the current block through decoding;

constructing a TMRL mode candidate list for the current block, and determining an extended reference line and an intra prediction mode selected for the current block according to the candidate list and the TMRL mode index; and taking a weighted sum of a first prediction result and a second prediction result as a final prediction result of the current block, when the TMRL fusion flag indicates use of intra prediction fusion (IPF);

wherein the first prediction result is obtained by performing prediction on the current block according to the extended reference line and the intra prediction mode, the second prediction result is obtained by performing prediction on the current block according to another reference line and the intra prediction mode, and the intra prediction mode is an angular mode.

22. The method of clause 21, wherein the another reference line is a reference line adjacent to the extended reference line and located at an inner side of the extended reference line, or a reference line adjacent to the extended reference line and located at an outer side of the extended reference line, or a reference line with an index of 0.

23. The method of clause 21, further comprising:

obtaining the final prediction result of the current block by performing prediction on the current block according to the extended reference line and the intra prediction mode, when the TMRL fusion flag indicates no use of the IPF.

24. The method of clause 21, wherein further decoding the TMRL mode index and the TMRL fusion flag for the current block comprises: determining whether a size of the current block satisfies a set condition after decoding the TMRL mode index for the current block, decoding the TMRL fusion flag for the current block when the set condition is satisfied, and skipping decoding of the TMRL fusion flag for the current block when the set condition is not satisfied;

wherein the set condition comprises any one or more of following conditions:

a width of the current block is greater than a set value;

a height of the current block is greater than a set value;

a product of the width and the height of the current block is greater than a set value; or a current frame to which the current block belongs is not an inter frame.

25. The method of clause 21, wherein constructing the TMRL mode candidate list for the current block comprises:

obtaining N×M combinations of extended reference lines and intra prediction modes according to N extended reference lines and M intra prediction modes for the current block, wherein N≥1, M≥1, and N×M≥2;

performing prediction on a template region for the current block according to each of the N×M combinations, and calculating differences between a reconstructed value of the template region and prediction values obtained by prediction; and filling K combinations corresponding to the differences into the TMRL mode candidate list for the current block in ascending order of the differences, wherein 1≤K≤N×M;

wherein the M intra prediction modes are selected from angular modes other than angular modes with angles of −45°, 0°, 45°, 90°, or 135°.

26. The method of clause 21, wherein the weighted sum of the first prediction result and the second prediction result is calculated according to a formula as follows:

$$p_{fusion} = (w_a p_a + w_b p_b) \gg \text{shift}$$

or $$p_{fusion} = (w_a p_a + w_b p_b + \text{offset}) \gg \text{shift}$$

wherein $p_a$ is the first prediction result, $p_b$ is the second prediction result, $p_{fusion}$ is the final prediction result of the current block, $w_a$ is a weighting factor for $p_a$, and $w_b$ is a weighting factor for $p_b$; and wherein $w_a+w_b=(1<<\text{shift})$, offset=1<<(shift−1), shift>=1, shift and offset are set parameters.

27. A video encoding method, comprising:

constructing a template-based multiple reference line (TMRL) mode candidate list for a current block, wherein the candidate list is filled with combinations of candidate extended reference lines and candidate intra prediction modes for the current block;

selecting a combination of a reference line and an intra prediction mode for the current block through rate-distortion optimization;

encoding a TMRL mode flag for the current block to indicate use of a TMRL mode for the current block and encoding a TMRL mode index for the current block to indicate a position of the selected combination in the candidate list, when an encoding condition for the TMRL mode for the current block is satisfied; and encoding a TMRL fusion flag for the current block to indicate use of intra prediction fusion (IPF) for the current block or to indicate no use of IPF for the current block;

wherein the encoding condition at least comprises that: the selected combination is in the candidate list.

28. The method of clause 27, wherein:

encoding the TMRL fusion flag for the current block to indicate the use of IPF for the current block or no use of IPF for the current block comprises: in a case where a combination containing an angular mode in the candidate list is selected for the current block, encoding the TMRL fusion flag for the current block to indicate no use of the IPF when at least one of a set restriction condition is satisfied, and encoding the TMRL fusion flag for the current block to indicate the use of IPF when the set restriction condition is not satisfied; wherein the set restriction condition further comprises any one or more of following restriction conditions:

a template-based intra mode derivation (TIMD) fusion mode is selected for the current block;

a decoder-side intra mode derivation (DIMD) mode is selected for the current block;

an index of the reference line selected for the current block is greater than or equal to K, wherein K is an integer greater than or equal to 3;

a width of the current block is less than or equal to a set value;

a height of the current block is less than or equal to a set value;

a product of the width and the height of the current block is less than or equal to a set value;

an intra sub-block partitions (ISP) mode is used for the current block;

an angle of the angular mode selected for the current block equals to −45°, 0°, 45°, 90°, or 135°, or the angular mode selected for the current block is an angular mode with an integer slope;

a current frame to which the current block belongs is an inter frame; or a current picture to which the current block belongs is a chroma picture.

29. The method of clause 27, wherein for constructing the TMRL mode candidate list for the current block, intra prediction modes for participating in combination do not comprise angular modes with angles of −45°, 0°, 45°, 90°, and 135°.

30. A method for constructing a multiple reference line (MRL) mode candidate list, comprising:

obtaining N×M original combinations of extended reference lines and angular modes according to N extended reference lines and M intra prediction modes for a current block;

obtaining corresponding fusion combinations according to original combinations containing predetermined angular modes in the N×M original combinations;

performing prediction on a template region for the current block according to each of the N×M original combinations and each of the fusion combinations obtained, and calculating differences between a reconstructed value of the template region and prediction values obtained by prediction; and filling K combinations corresponding to the differences into a template-based multiple reference line (TMRL) mode candidate list for the current block in ascending order of the differences, wherein K, N, and M are set positive integers, and 1≤K≤N×M.

31. The method of clause 30, wherein obtaining the corresponding fusion combinations according to the original combinations containing the predetermined angular modes in the N×M original combinations, comprises:

for each one of the original combinations containing the predetermined angular modes, obtaining a fusion combination according to the original combination; and for performing prediction on the current block according to the fusion combination, taking a weighted sum of a first prediction result and a second prediction result as a prediction value of the current block, wherein the first prediction result is obtained by performing prediction on the current block according to an extended reference line and an angular mode in the original combination, the second prediction result is obtained by performing prediction on the current block according to a second reference line and the angular mode in the original combination, and the second reference line is a neighbouring line of the first reference line or a reference line with an index of 0;

wherein the predetermined angular modes comprise all angular modes, or comprise angular modes other than angular modes with an integer slope.

32. The method of clause 30, wherein the weighted sum of the first prediction result and the second prediction result is calculated according to a formula as follows:

$$p_{fusion} = (w_a p_a + w_b p_b) \gg \text{shift}$$

or $$p_{fusion} = (w_a p_a + w_b p_b + \text{offset}) \gg \text{shift}$$

wherein $p_a$ is the first prediction result, $p_b$ is the second prediction result, $p_{fusion}$ is the final prediction result of the current block, $w_a$ is a weighting factor for $p_a$, and $w_b$ is a weighting factor for $p_b$; and wherein $w_a+w_b=(1<<\text{shift})$, $\text{offset}=1<<(\text{shift}-1)$, $\text{shift}>=1$, shift and offset are set parameters.

33. A method for constructing a multiple reference line (MRL) mode candidate list, comprising:

obtaining N×M original combinations of extended reference lines and intra prediction modes according to N extended reference lines and M intra prediction modes for a current block;

performing prediction on a template region for the current block according to each of the N×M original combinations, and calculating differences between a reconstructed value of the template region and prediction values obtained by prediction; and for each of original combinations containing predetermined angular modes in K original combinations with lowest differences, determining whether fusion is needed for the original combination, filling a fusion combination corresponding to the original combination into a template-based multiple reference line (TMRL) mode candidate list when fusion is needed for the original combination, and filling the original combination into the candidate list when fusion is not needed for the original combination, wherein K, N, and M are set positive integers, and 1≤K≤N×M.

34. The method of clause 33, wherein for each of the original combinations containing the predetermined angular modes in the K original combinations with lowest differences, determining whether fusion is needed for the original combination, and filling the fusion combination corresponding to the original combination into the TMRL mode candidate list when fusion is needed for the original combination, comprise:

performing prediction on the template region for the current block according to the fusion combination corresponding to the original combination, calculating a difference between a reconstructed value of the template region and a prediction value obtained by prediction, determining that fusion is needed when a difference corresponding to the original combination is greater than the difference corresponding to the fusion combination, and determining that fusion is not needed when the difference corresponding to the original combination is less than or equal to the difference corresponding to the fusion combination;

wherein performing prediction on the current block according to the fusion combination comprises taking a weighted sum of a first prediction result and a second prediction result as a prediction value of the current block, wherein the first prediction result is obtained by performing prediction on the current block according to an extended reference line and an angular mode in the original combination, the second prediction result is obtained by performing prediction on the current block according to a second reference line and the angular mode in the original combination, and the second reference line is a neighbouring line of the first reference line or a reference line with an index of 0;

wherein the predetermined angular modes comprise all angular modes, or comprise angular modes other than angular modes with an integer slope.

35. The method of clause 33, wherein the weighted sum of the first prediction result and the second prediction result is calculated according to a formula as follows:

$$p_{fusion} = (w_a p_a + w_b p_b) \gg \text{shift}$$

or $$p_{fusion} = (w_a p_a + w_b p_b + \text{offset}) \gg \text{shift}$$

wherein $p_a$ is the first prediction result, $p_b$ is the second prediction result, $p_{fusion}$ is a final prediction result of the current block, $w_a$ is a weighting factor for $p_a$, and $w_b$ is a weighting factor for $p_b$; and wherein $w_a+w_b=(1<<\text{shift})$, offset=1<<(shift−1), shift>=1, shift and offset are set parameters.

36. A method for constructing a multiple reference line (MRL) mode candidate list, comprising:

obtaining N×M original combinations of extended reference lines and intra prediction modes according to N extended reference lines and M intra prediction modes for a current block;

performing fusion processing on the N×M original combinations, wherein the fusion processing comprises: for each of original combinations containing predetermined angular modes, replacing the original combination with a corresponding fusion combination when a set condition is satisfied;

performing prediction on a template region for the current block according to each of N×M combinations obtained after the fusion processing, and calculating differences between a reconstructed value of the template region and prediction values obtained by prediction; and filling K combinations corresponding to the differences into a template-based multiple reference line (TMRL) mode candidate list for the current block in ascending order of the differences;

wherein K, N, and M are set positive integers, and 1≤K≤N×M; and wherein for each original combination, performing prediction on the current block according to a fusion combination corresponding to the original combination comprises taking a weighted sum of a first prediction result and a second prediction result as a prediction value of the current block, wherein the first prediction result is obtained by performing prediction on the current block according to an extended reference line and an angular mode in the original combination, the second prediction result is obtained by performing prediction on the current block according to a second reference line and the angular mode in the original combination, and the second reference line is a neighboring line of the first reference line or a reference line with an index of 0.

37. The method of clause 36, wherein the set condition comprises any one or more of conditions as follows:

a size of the current block is greater than N×M, wherein N and M are set positive integers; or an intra prediction mode selected for the current block is an angular mode with a non-integer slope;

wherein the predetermined angular modes comprise all angular modes, or comprise angular modes other than angular modes with an integer slope.

38. The method of clause 36, wherein the weighted sum of the first prediction result and the second prediction result is calculated according to a formula as follows:

$$p_{fusion} = (w_a p_a + w_b p_b) \gg \text{shift}$$

or $$p_{fusion} = (w_a p_a + w_b p_b + \text{offset}) \gg \text{shift}$$

wherein $p_a$ is the first prediction result, $p_b$ is the second prediction result, $p_{fusion}$ is a final prediction result of the current block, $w_a$ is a weighting factor for $p_a$, and $w_b$ is a weighting factor for $p_b$; and wherein $w_a+w_b=(1<<\text{shift})$, offset=1<<(shift−1), shift>=1, shift and offset are set parameters.

39. A bitstream, wherein the bitstream is generated by the video encoding method of any one of clauses 20 and 27 to 29.

40. An intra prediction fusion (IPF) apparatus, comprising a processor and a memory storing a computer program, wherein the processor, when executing the computer program, is able to implement the IPF method of any one of clauses 1 to 18.

41. An apparatus for constructing a multiple reference line (MRL) mode candidate list, comprising a processor and a memory storing a computer program, wherein the processor, when executing the computer program, is able to implement the method for constructing an MRL mode candidate list of any one of clauses 30 to 38.

42. A video decoding apparatus, comprising a processor and a memory storing a computer program, wherein the processor, when executing the computer program, is able to implement the video decoding method of any one of clauses 19 and 21 to 26.

43. A video encoding apparatus, comprising a processor and a memory storing a computer program, wherein the processor, when executing the computer program, is able to implement the video encoding method of any one of clauses 20 and 27 to 29.

44. A video encoding and decoding system, comprising the video encoding apparatus of clause 36 and the video decoding apparatus of clause 35.

45. A non-transitory computer-readable storage medium, configured to store a computer program, wherein the computer program, when executed by a processor, is able to implement the intra prediction fusion (IPF) method of any one of clauses 1 to 18, or implement the video decoding method of any one of clauses 19 and 21 to 26, or implement the video encoding method of any one of clauses 20 and 27 to 29, or implement the method for constructing a multiple reference line (MRL) mode candidate list of any one of clauses 30 to 38.

What is claimed is:

1. An intra prediction fusion (IPF) method, the method being applied to a decoder and comprising:

determining whether a restriction condition for use of IPF for a current block is satisfied, when an intra prediction mode selected for the current block comprises an angular mode;

restricting the use of IPF for intra prediction on the current block, when at least one of the restriction condition is satisfied; and performing intra prediction on the current block using IPF when the restriction condition is not satisfied;

wherein performing intra prediction on the current block using IPF, comprises:

taking a weighted sum of a first prediction result and a second prediction result as a final prediction result of the current block when only one intra prediction mode is selected for the current block and the intra prediction mode is an angular mode; wherein the first prediction result is obtained by performing prediction on the current block according to a first reference line selected for the current block and a first angular mode selected for the current block, and the second prediction result is obtained by performing prediction on the current block according to a second reference line and the first angular mode, wherein the second reference line is a neighbouring line of the first reference line or a reference line with an index of 0.

2. The method of claim 1, wherein the restriction condition comprises a mode quantity restriction condition: the use of IPF leading to a need to fuse more than M angular modes for prediction on the current block, wherein M is an integer greater than or equal to 2.

3. The method of claim 2, wherein under a condition of M=2, determining whether the restriction condition for the use of IPF for the current block is satisfied when the intra prediction mode selected for the current block comprises an angular mode, and restricting the use of IPF for intra prediction on the current block when at least one of the restriction condition is satisfied, comprise:

in a case where a template-based intra mode derivation (TIMD) fusion mode is selected for the current block and two angular modes are used for TIMD fusion, determining that the mode quantity restriction condition is satisfied, and disallowing to perform IPF for intra prediction on the current block; and in a case where the TIMD fusion mode is selected for the current block and merely one of two intra prediction modes used for TIMD fusion is an angular mode satisfying a use condition for IPF, determining that the mode quantity restriction condition is not satisfied, and allowing to perform IPF for the angular mode satisfying the use condition for IPF to perform intra prediction on the current block.

4. The method of claim 1, wherein, the restriction condition comprises any one or more of:

restriction condition 1: a TIMD fusion mode is selected for the current block;

restriction condition 2: a decoder-side intra mode derivation (DIMD) fusion mode is selected for the current block;

restriction condition 3: multiple reference line (MRL) is used for the current block;

restriction condition 4: an index of a reference line selected for the current block is greater than or equal to K, wherein K is an integer greater than or equal to 3;

restriction condition 5: a width of the current block is less than or equal to a set value;

restriction condition 6: a height of the current block is less than or equal to a set value;

restriction condition 7: a product of the width and the height of the current block is less than or equal to a set value;

restriction condition 8: an intra sub-partitions (ISP) mode is used for the current block;

restriction condition 9: an angle of an angular mode selected for the current block is equal to −45°, 0°, 45°, 90°, or 135°, or an angular mode selected for the current block is an angular mode with an integer slope;

restriction condition 10: a current frame to which the current block belongs is an inter frame; and restriction condition 11: a current picture to which the current block belongs is not a luma picture; wherein wherein IPF is not allowed for intra prediction on the current block when at least one of the restriction conditions 1 to 11 is satisfied.

5. The method of claim 4, wherein, the restriction condition comprises the restriction condition 4, wherein K=3 or 5 or 7 or 12.

6. The method of claim 1, wherein the second reference line is adjacent to the first reference line and is closer to the current block than the first reference line, when an index of the first reference line is greater than or equal to K, wherein K is an integer greater than or equal to 1.

7. The method according to claim 1, wherein a weight assigned to the first prediction result is greater than a weight assigned to the second prediction result, to calculate the weighted sum of the first prediction result and the second prediction result.

8. The method of claim 1, wherein determining whether the restriction condition for the use of IPF for the current block is satisfied when the intra prediction mode selected for the current block comprises an angular mode, and performing intra prediction on the current block using IPF when the restriction condition is not satisfied, comprise:

in a case where an extended reference line and an angular mode in a template-based multiple reference line (TMRL) mode candidate list is selected for the current block and the restriction condition is not satisfied, calculating the first prediction result by performing prediction on the current block according to the extended reference line and the angular mode and calculating the second prediction result by performing prediction on the current block according to another reference line and the angular mode, and taking the weighted sum of the first prediction result and the second prediction result as the final prediction result of the current block, wherein the another reference line is a reference line with an index of 0 or a neighbouring line of the extended reference line.

9. An intra prediction fusion (IPF) method, the method being applied to an encoder and comprising:

determining whether a restriction condition for use of IPF for a current block is satisfied, when an intra prediction mode selected for the current block comprises an angular mode;

restricting the use of IPF for intra prediction on the current block, when at least one of the restriction condition is satisfied;

performing intra prediction on the current block using IPF when the restriction condition is not satisfied;

wherein performing intra prediction on the current block using IPF, comprises:

taking a weighted sum of a first prediction result and a second prediction result as a final prediction result of the current block when only one intra prediction mode is selected for the current block and the intra prediction mode is an angular mode; wherein the first prediction result is obtained by performing prediction on the current block according to a first reference line selected for the current block and a first angular mode selected for the current block, and the second prediction result is obtained by performing prediction on the current block according to a second reference line and the first angular mode, wherein the second reference line is a neighbouring line of the first reference line or a reference line with an index of 0.

10. The method of claim 9, wherein the restriction condition comprises a mode quantity restriction condition: the use of IPF leading to a need to fuse more than M angular modes for prediction on the current block, wherein M is an integer greater than or equal to 2.

11. The method of claim 10, wherein under a condition of M=2, determining whether the restriction condition for the use of IPF for the current block is satisfied when the intra prediction mode selected for the current block comprises an angular mode, and restricting the use of IPF for intra prediction on the current block when at least one of the restriction condition is satisfied, comprise:

in a case where a template-based intra mode derivation (TIMD) fusion mode is selected for the current block and two angular modes are used for TIMD fusion, determining that the mode quantity restriction condition is satisfied, and disallowing to perform IPF for intra prediction on the current block; and in a case where the TIMD fusion mode is selected for the current block and merely one of two intra prediction modes used for TIMD fusion is an angular mode satisfying a use condition for IPF, determining that the mode quantity restriction condition is not satisfied, and allowing to perform IPF for the angular mode satisfying the use condition for IPF to perform intra prediction on the current block.

12. The method of claim 9, wherein, the restriction condition comprises any one or more of:

restriction condition 1: a TIMD fusion mode is selected for the current block;

restriction condition 2: a decoder-side intra mode derivation (DIMD) fusion mode is selected for the current block;

restriction condition 3: multiple reference line (MRL) is used for the current block;

restriction condition 4: an index of a reference line selected for the current block is greater than or equal to K, wherein K is an integer greater than or equal to 3;

restriction condition 5: a width of the current block is less than or equal to a set value;

restriction condition 6: a height of the current block is less than or equal to a set value;

restriction condition 7: a product of the width and the height of the current block is less than or equal to a set value;

restriction condition 8: an intra sub-partitions (ISP) mode is used for the current block;

restriction condition 9: an angle of an angular mode selected for the current block is equal to −45°, 0°, 45°, 90°, or 135°, or an angular mode selected for the current block is an angular mode with an integer slope;

restriction condition 10: a current frame to which the current block belongs is an inter frame; and restriction condition 11: a current picture to which the current block belongs is not a luma picture; wherein wherein IPF is not allowed for intra prediction on the current block when at least one of the restriction conditions 1 to 11 is satisfied.

13. The method of claim 9, wherein the second reference line is adjacent to the first reference line and is closer to the current block than the first reference line, when an index of the first reference line is greater than or equal to K, wherein K is an integer greater than or equal to 1.

14. The method according to claim 9, wherein a weight assigned to the first prediction result is greater than a weight assigned to the second prediction result, to calculate the weighted sum of the first prediction result and the second prediction result.

15. The method of claim 9, wherein determining whether the restriction condition for the use of IPF for the current block is satisfied when the intra prediction mode selected for the current block comprises an angular mode, and performing intra prediction on the current block using IPF when the restriction condition is not satisfied, comprise:

in a case where an extended reference line and an angular mode in a template-based multiple reference line (TMRL) mode candidate list is selected for the current block and the restriction condition is not satisfied, calculating the first prediction result by performing prediction on the current block according to the extended reference line and the angular mode and calculating the second prediction result by performing prediction on the current block according to another reference line and the angular mode, and taking the weighted sum of the first prediction result and the second prediction result as the final prediction result of the current block, wherein the another reference line is a reference line with an index of 0 or a neighbouring line of the extended reference line.

16. A non-transitory computer-readable storage medium storing a computer program and a bitstream, wherein when processed by one or more processors, the computer program causes the one or more processors to implement the method of claim 9 to generate the bitstream.

* * * * *